(12) United States Patent
Yamamoto et al.

(10) Patent No.: US 7,227,698 B2
(45) Date of Patent: Jun. 5, 2007

(54) OPTICAL UNIT, AND IMAGE TAKING APPARATUS PROVIDED THEREWITH

(75) Inventors: Yasushi Yamamoto, Kishiwada (JP); Hiroyuki Matsumoto, Wakayama (JP); Atsuo Masui, Sakai (JP)

(73) Assignee: Konica Minolta Photo Imaging, Inc., Tokyo (JP)

( * ) Notice: Subject to any disclaimer, the term of this patent is extended or adjusted under 35 U.S.C. 154(b) by 0 days.

(21) Appl. No.: 11/451,230

(22) Filed: Jun. 12, 2006

(65) Prior Publication Data

US 2007/0002460 A1    Jan. 4, 2007

(30) Foreign Application Priority Data

Jun. 17, 2005  (JP) .............................. 2005-177281

(51) Int. Cl.
 *G02B 15/14* (2006.01)
(52) U.S. Cl. ...................... 359/687; 359/683; 359/684; 359/685; 359/713; 359/714; 359/715; 359/726; 359/740; 359/774

(58) Field of Classification Search ................ 359/676, 359/683–687, 713–715, 740, 774, 726
See application file for complete search history.

(56) References Cited

U.S. PATENT DOCUMENTS 5,285,317 A * 2/1994 Uzawa ....................... 359/687

FOREIGN PATENT DOCUMENTS

| JP | 2001-117000 A | 4/2001 |
| JP | 2001-107622 A | 4/2002 |

* cited by examiner

*Primary Examiner*—Evelyn A. Lester
(74) *Attorney, Agent, or Firm*—Sidley Austin LLP

(57) ABSTRACT

A plurality of lens units in an optical unit has at least: from the object side toward the image side, a first lens unit having a positive optical power, a second lens unit having a negative optical power, a third lens unit having a positive optical power, and a fourth lens unit having a positive optical power. When at least the first lens unit moves from the image side to the object side in zooming from the wide-angle end position to the telephoto end position, at least one gap between the lens units varies. Predetermined conditional formulae are satisfied.

9 Claims, 24 Drawing Sheets

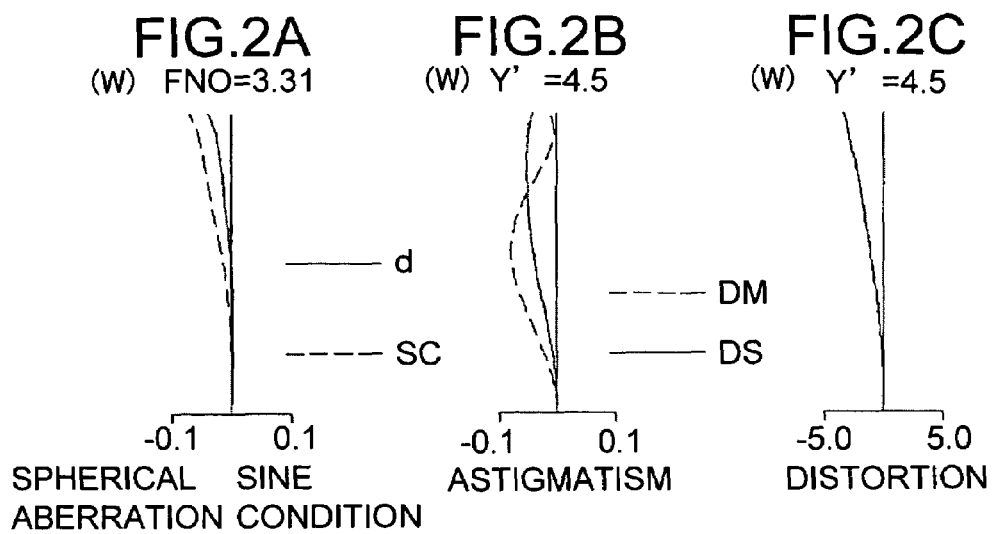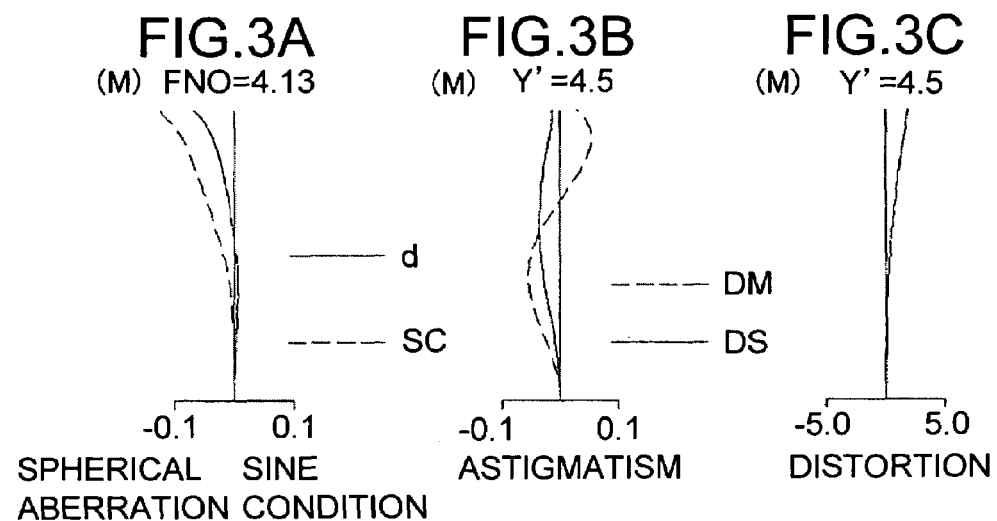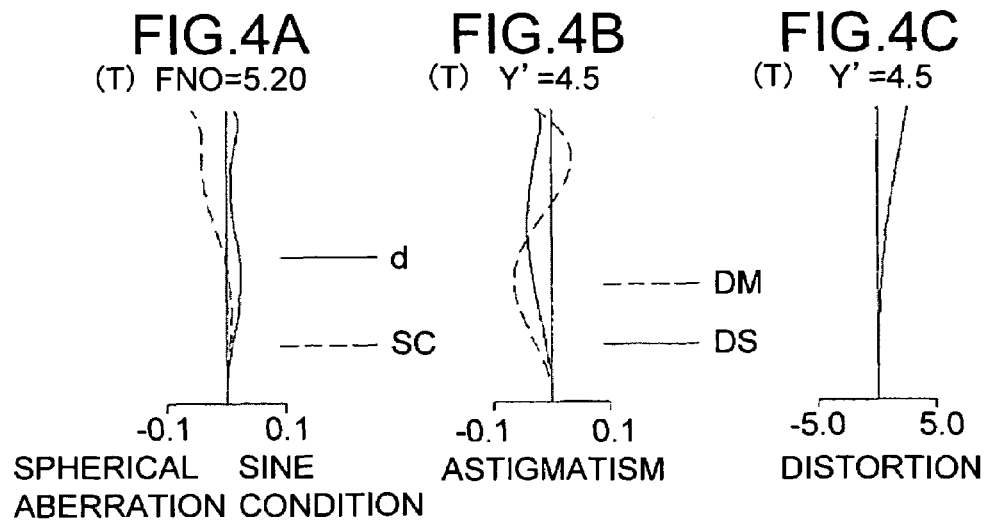

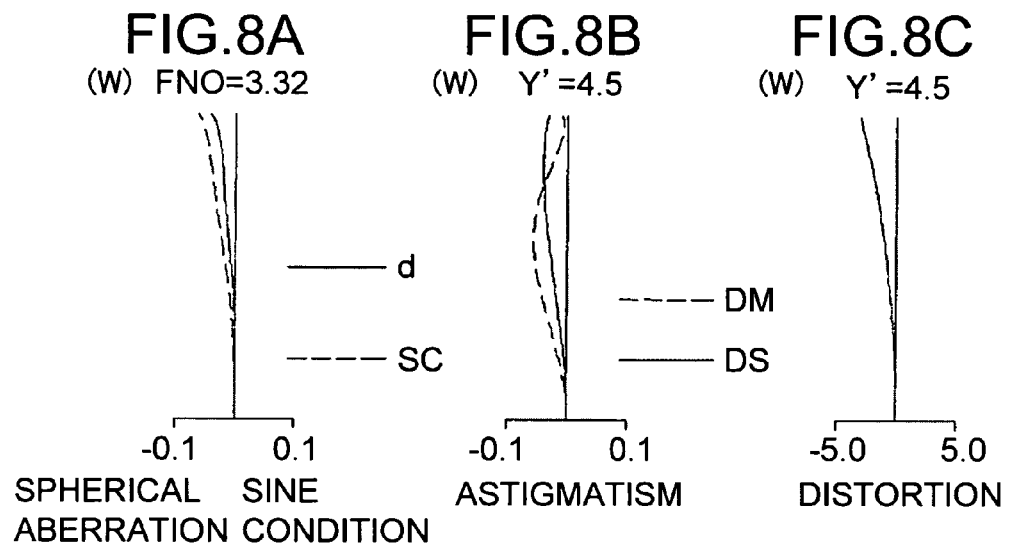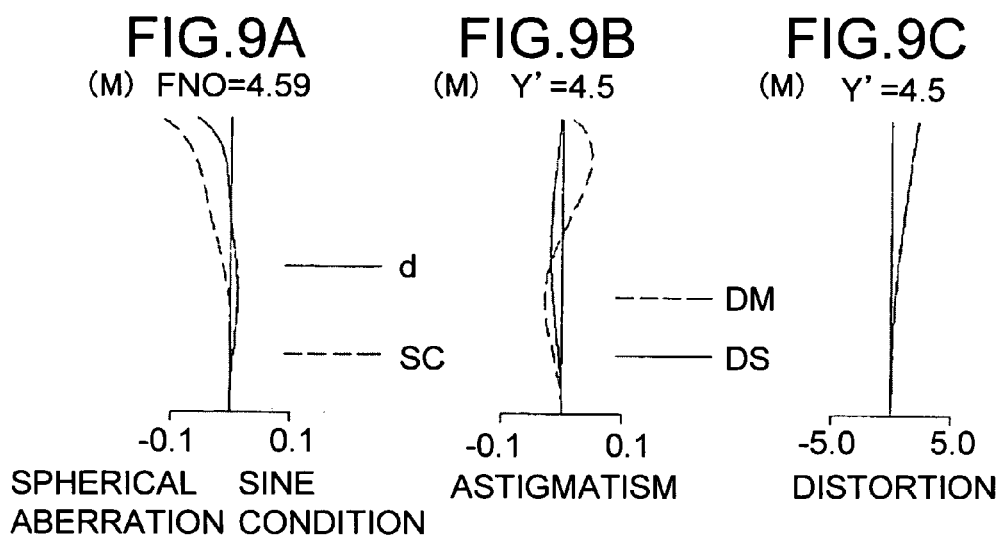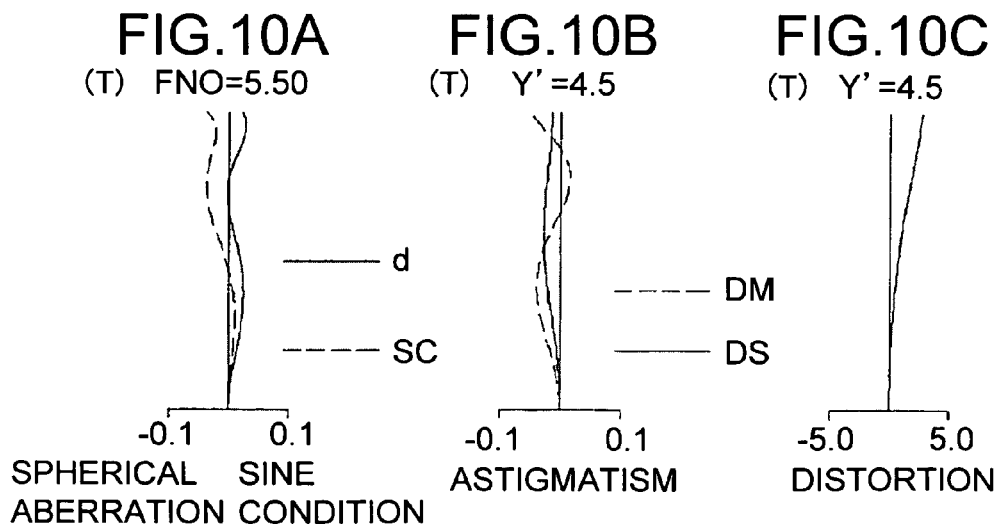

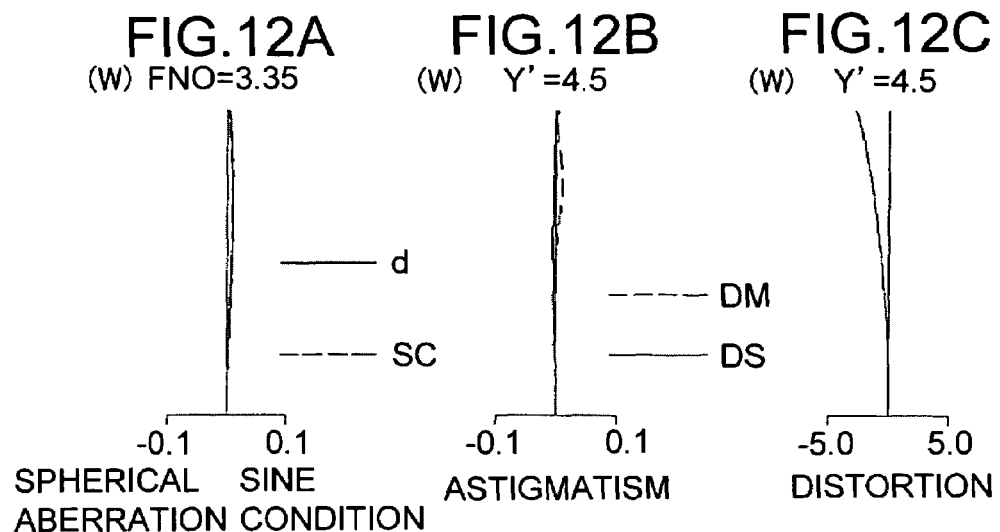
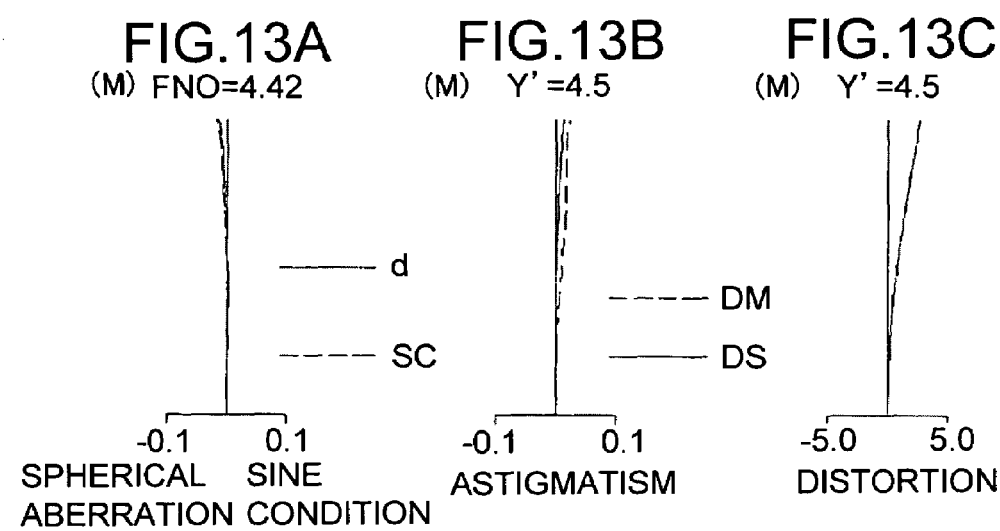
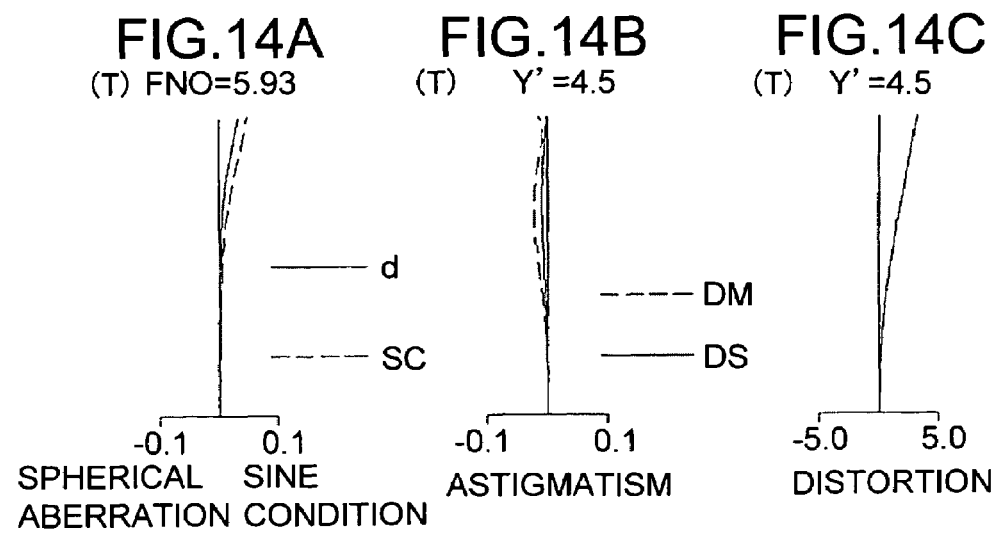

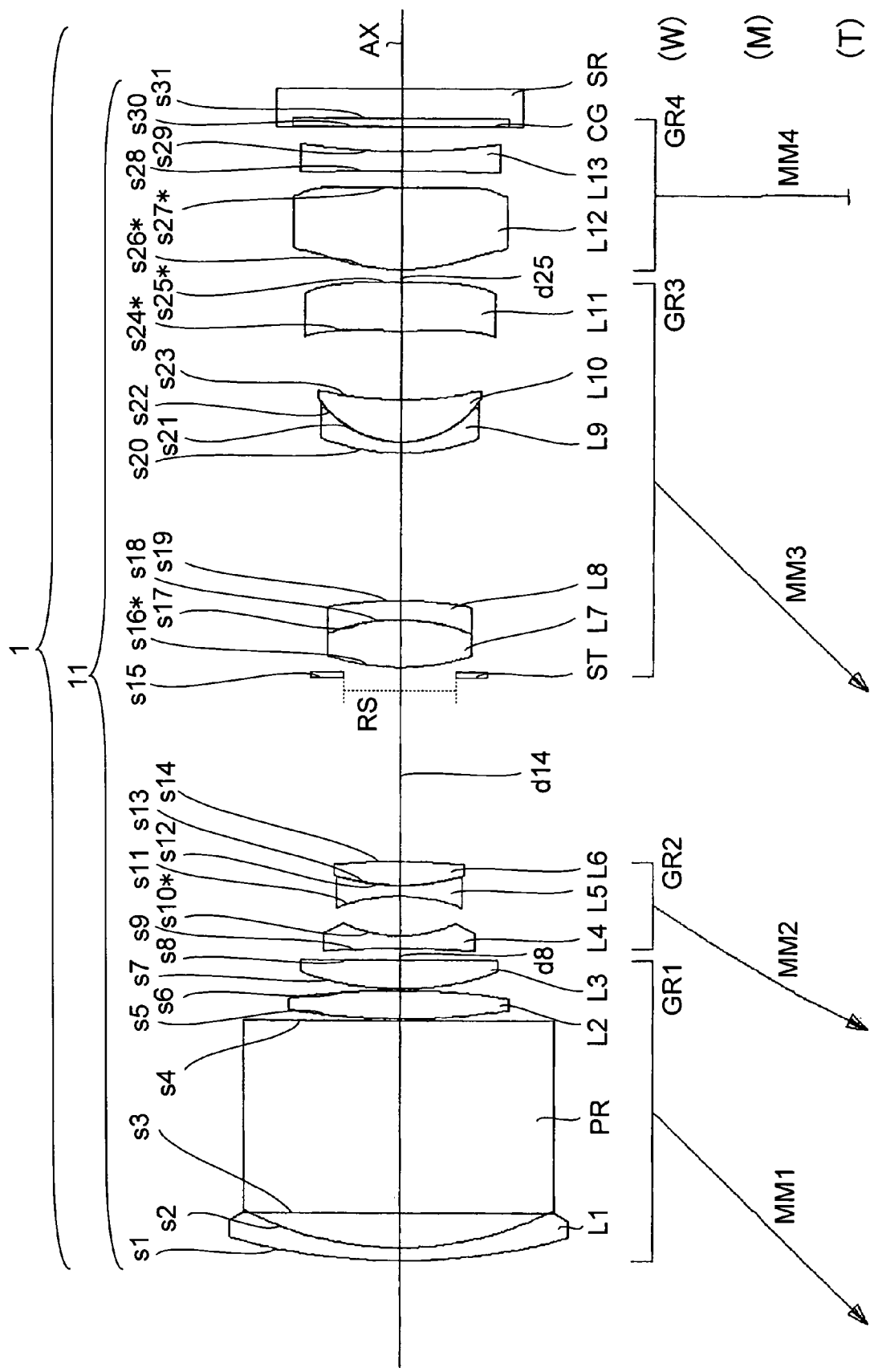

FIG.16A
(W) FNO=3.19

SPHERICAL SINE ABERRATION CONDITION
— d
---- SC
-0.1  0.1

FIG.16B
(W) Y'=4.5

ASTIGMATISM
---- DM
— DS
-0.1  0.1

FIG.16C
(W) Y'=4.5

DISTORTION
-5.0  5.0

FIG.17A
(M) FNO=4.69

SPHERICAL SINE ABERRATION CONDITION
— d
---- SC
-0.1  0.1

FIG.17B
(M) Y'=4.5

ASTIGMATISM
---- DM
— DS
-0.1  0.1

FIG.17C
(M) Y'=4.5

DISTORTION
-5.0  5.0

FIG.18A
(T) FNO=5.78

SPHERICAL SINE ABERRATION CONDITION
— d
---- SC
-0.1  0.1

FIG.18B
(T) Y'=4.5

ASTIGMATISM
---- DM
— DS
-0.1  0.1

FIG.18C
(T) Y'=4.5

DISTORTION
-5.0  5.0

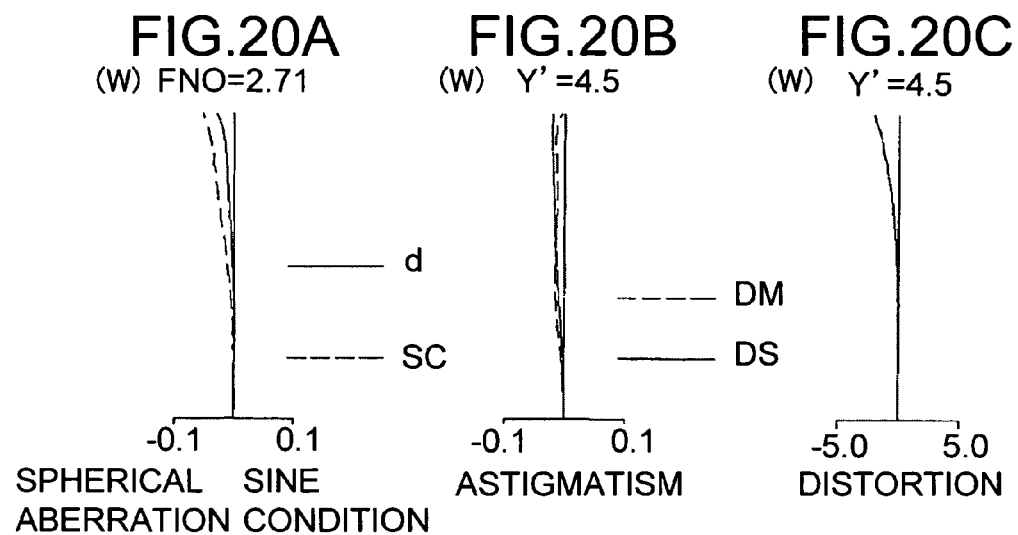
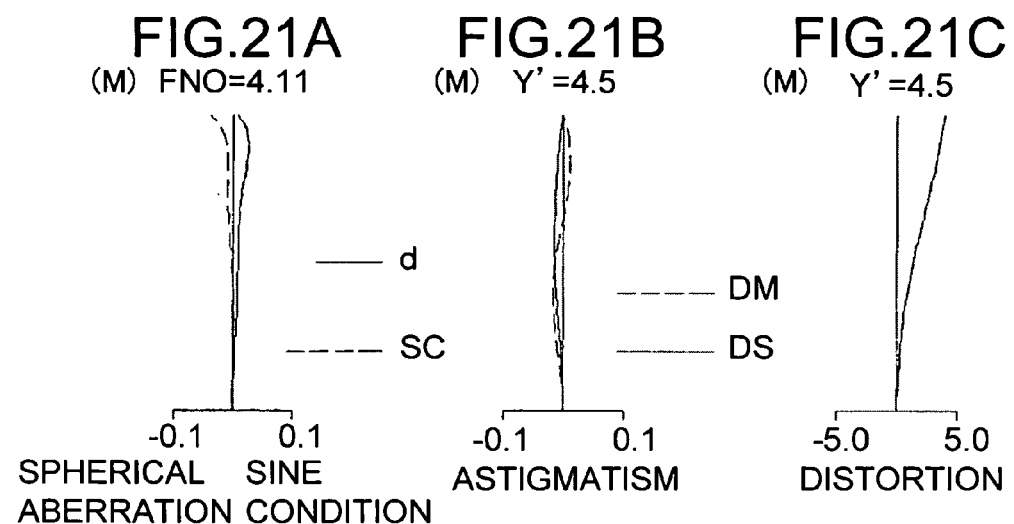
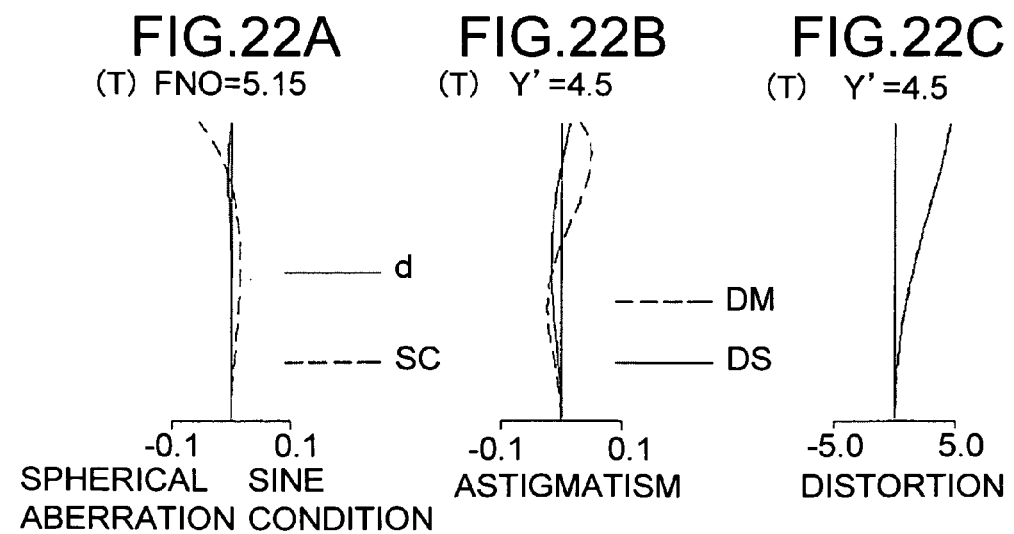

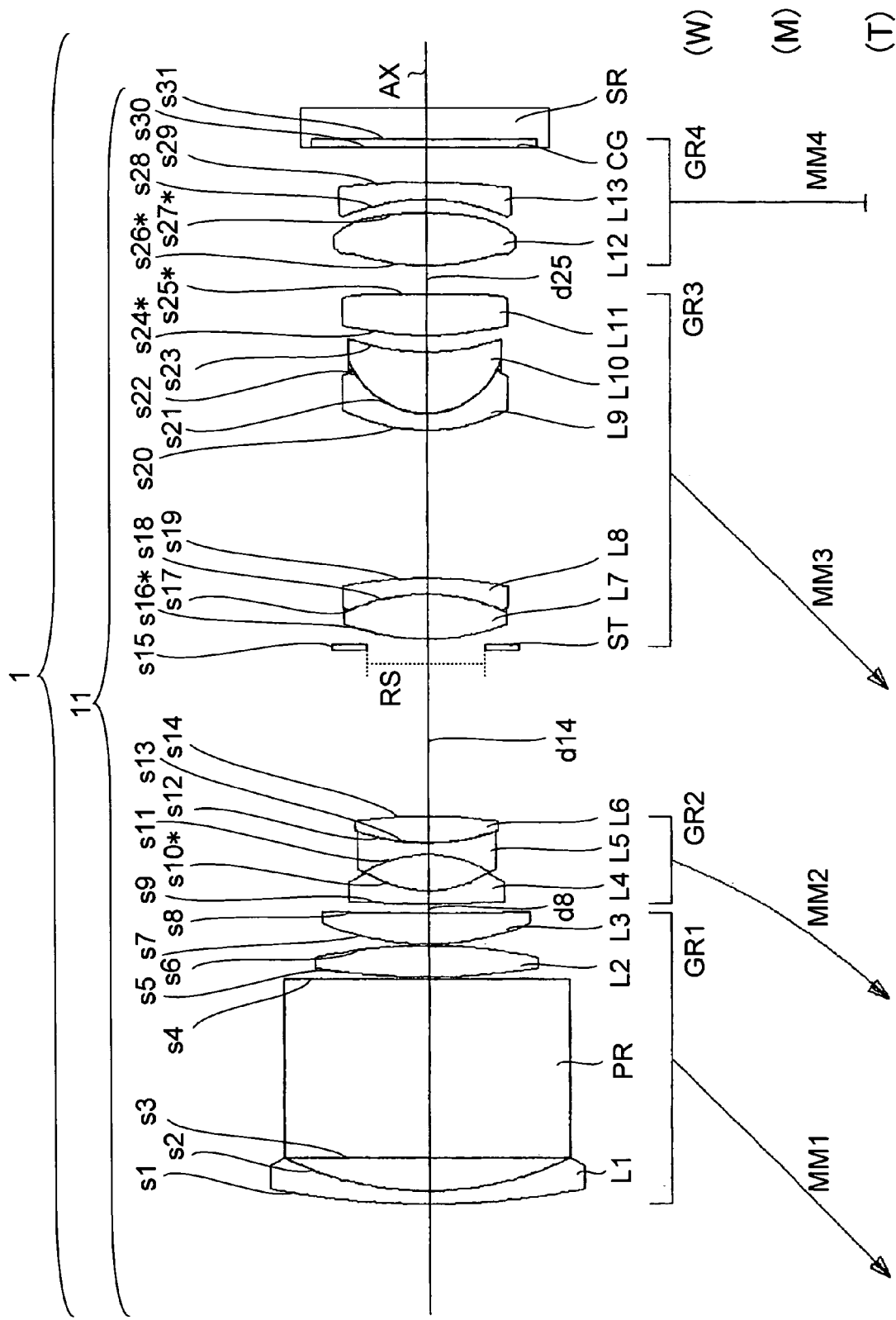

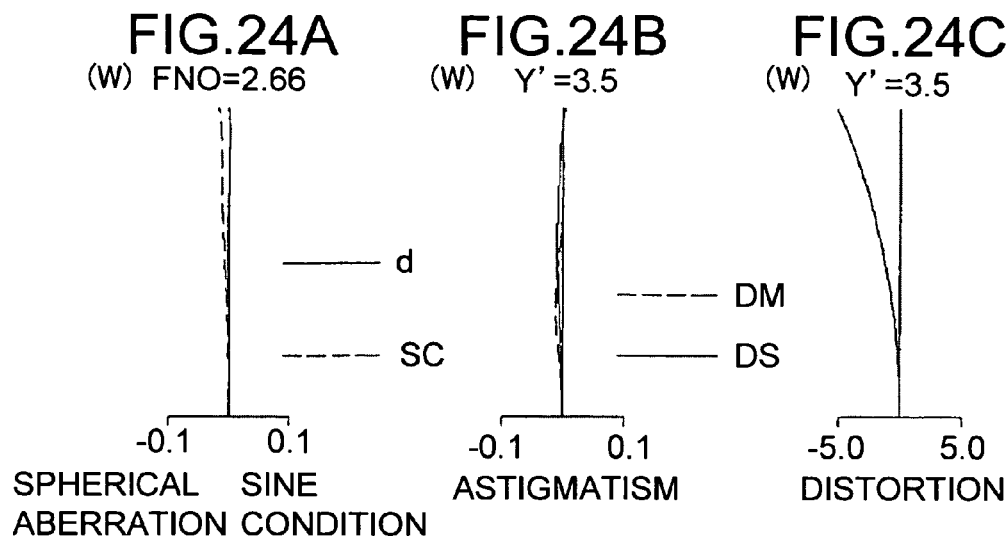
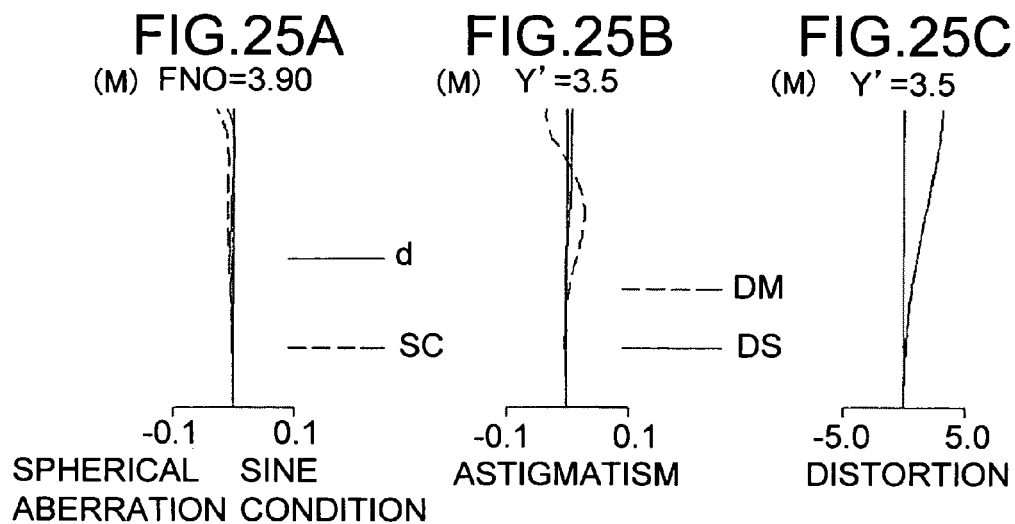
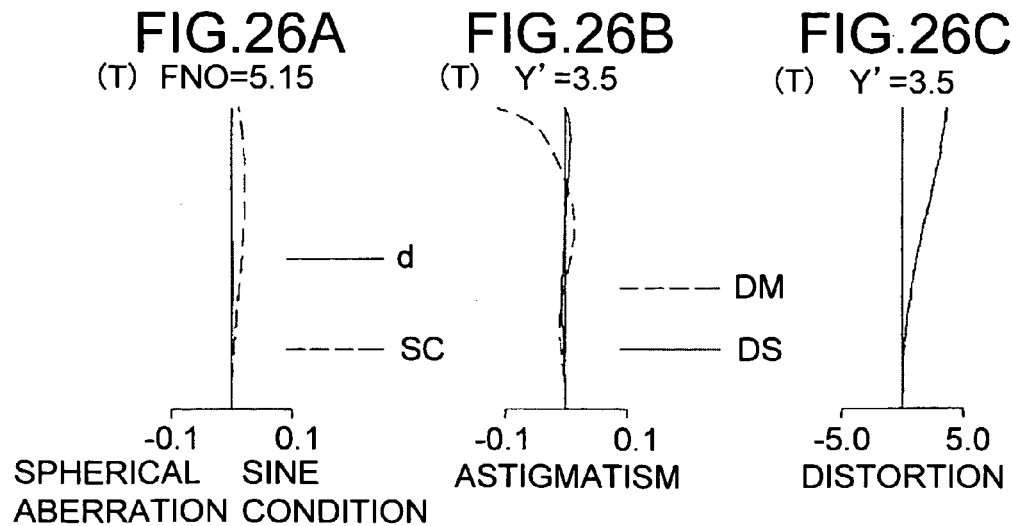

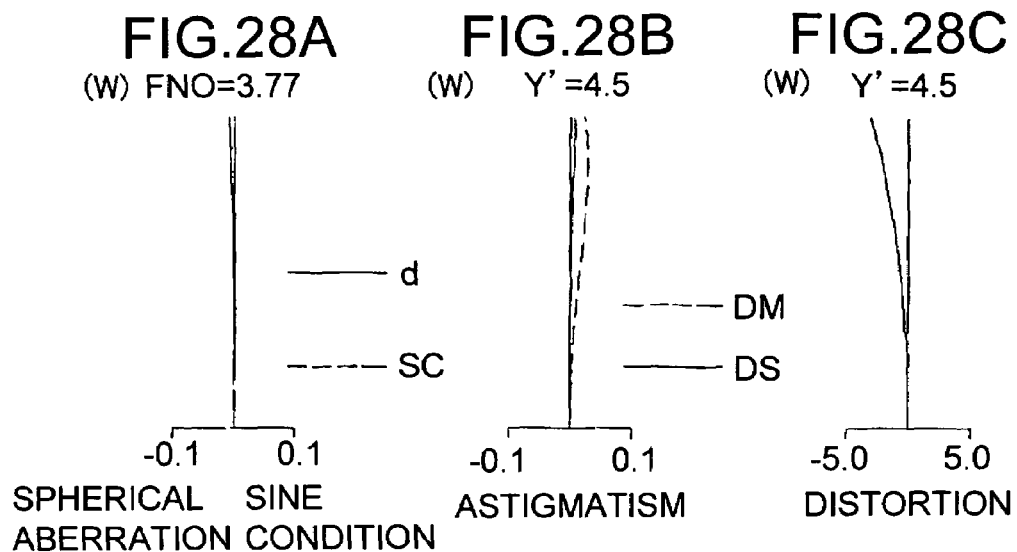

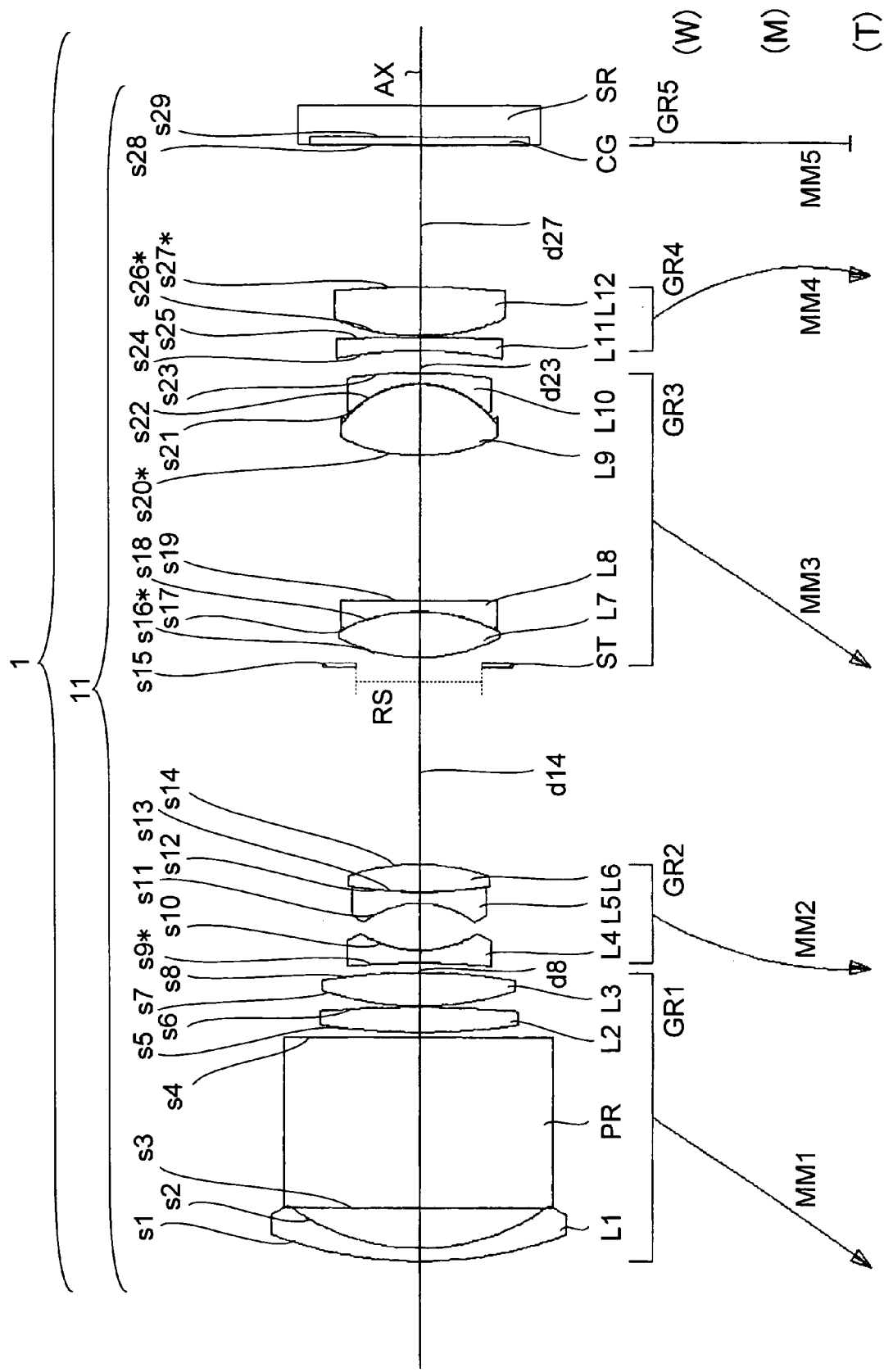

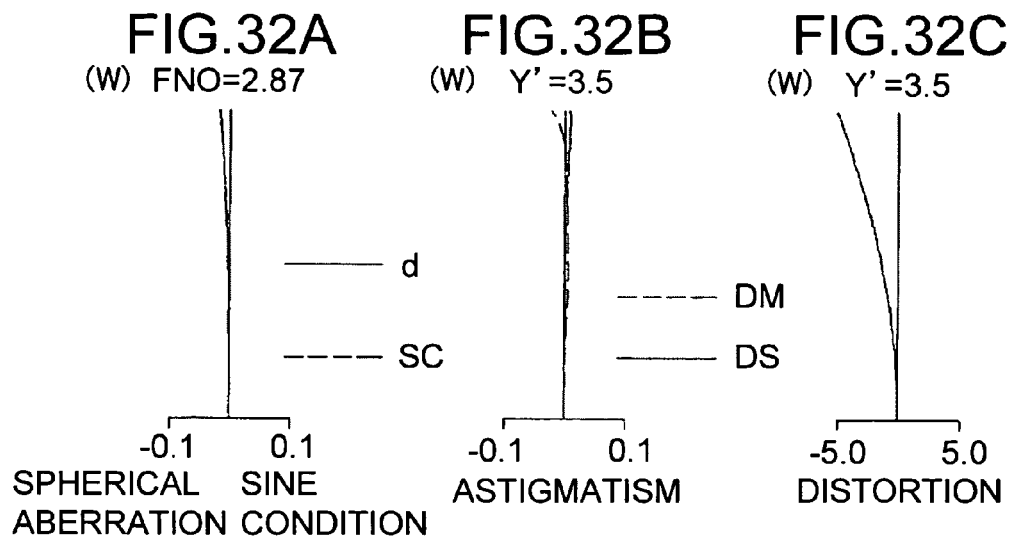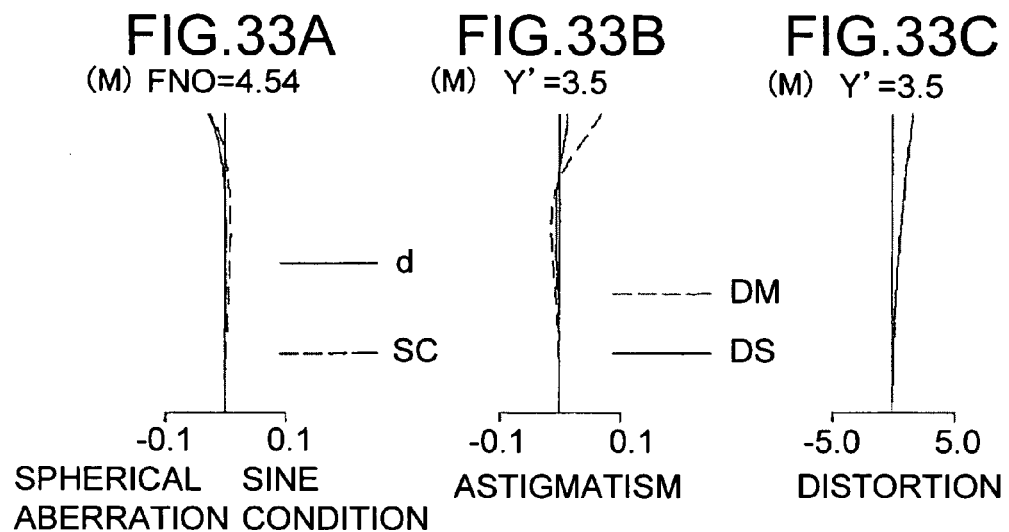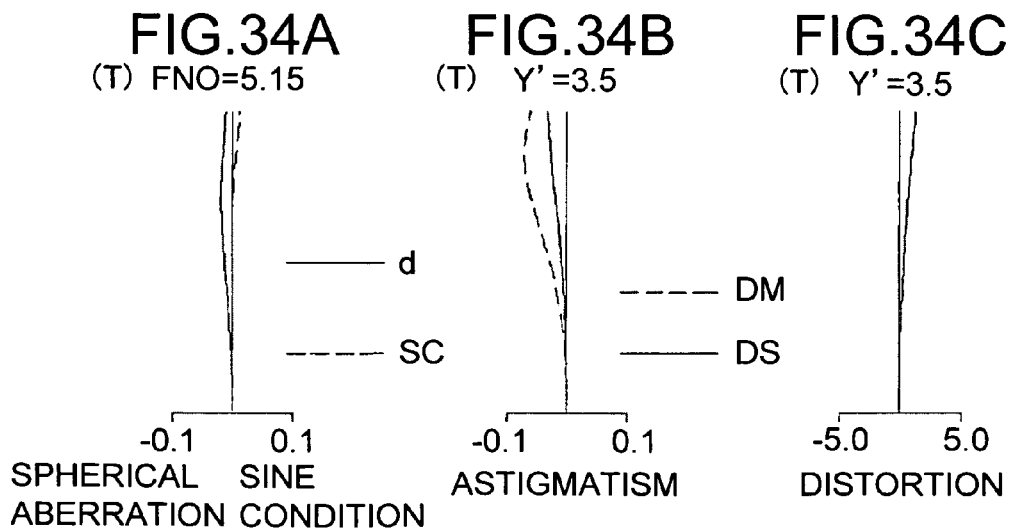

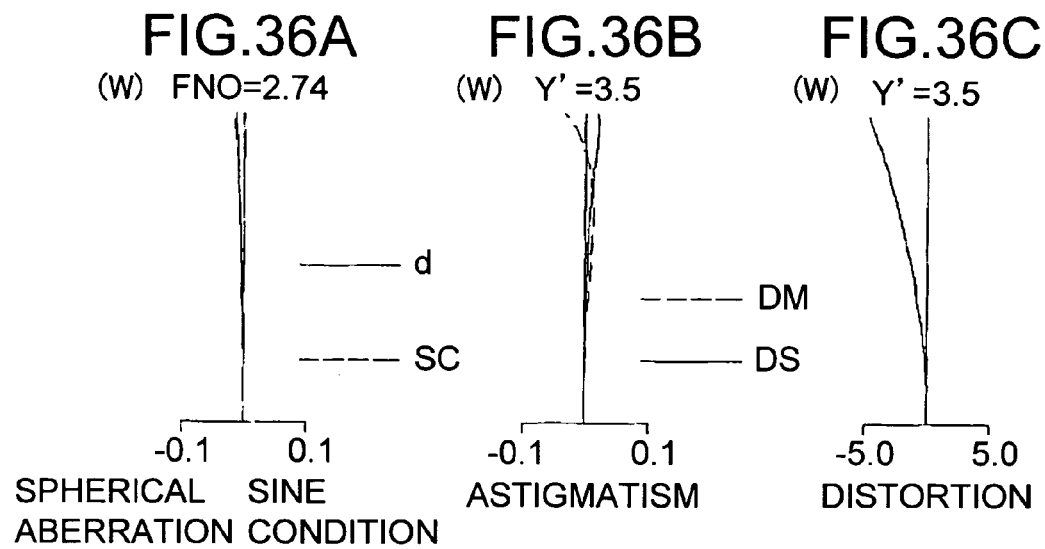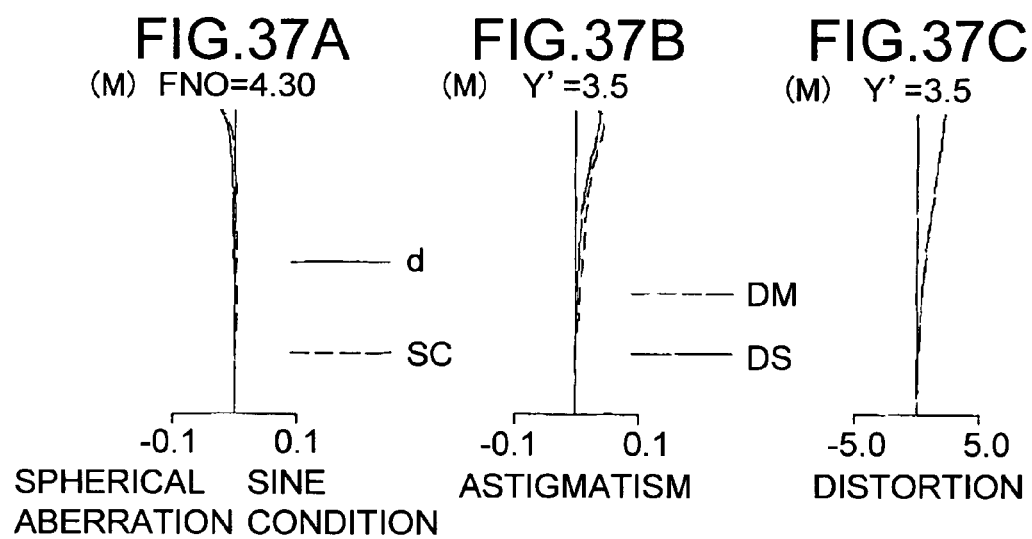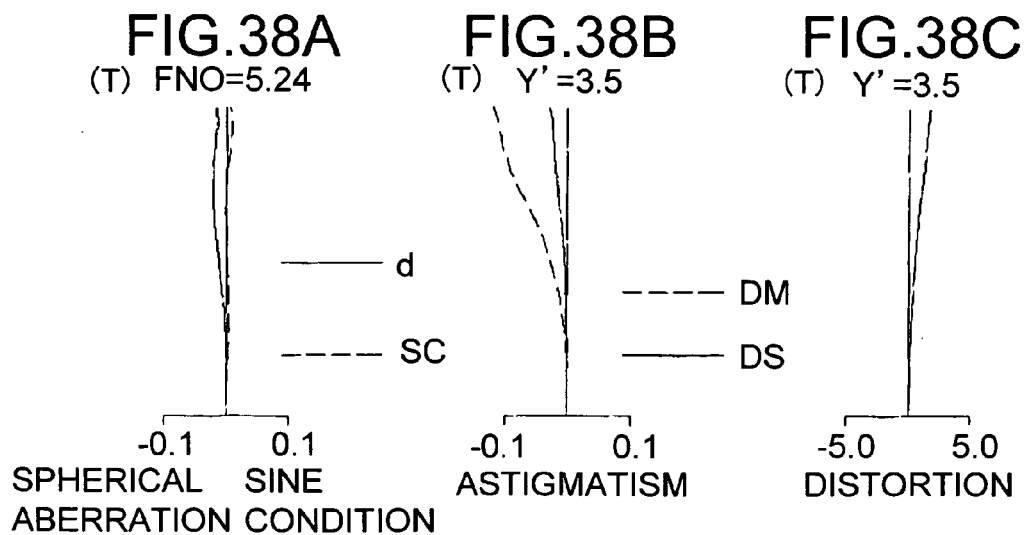

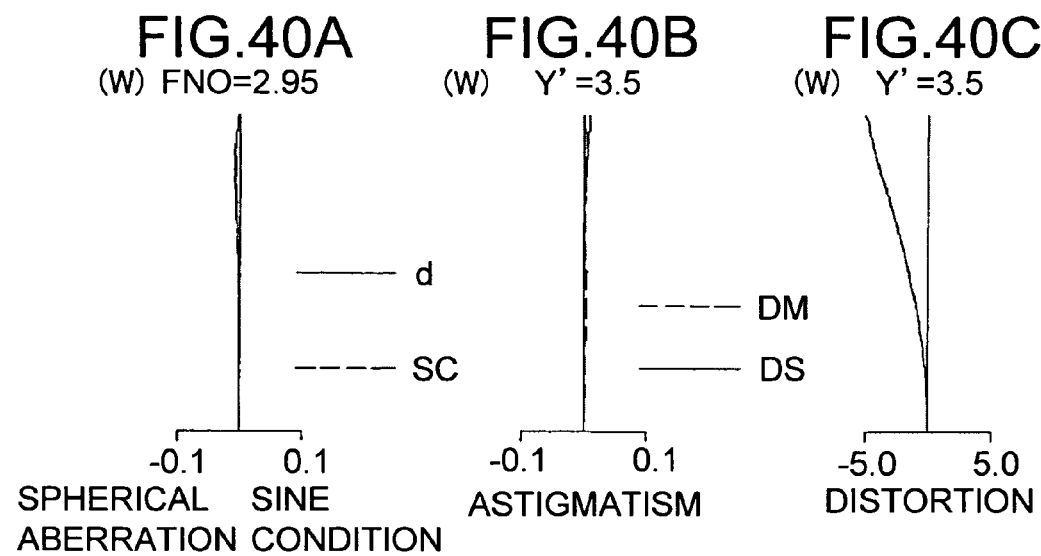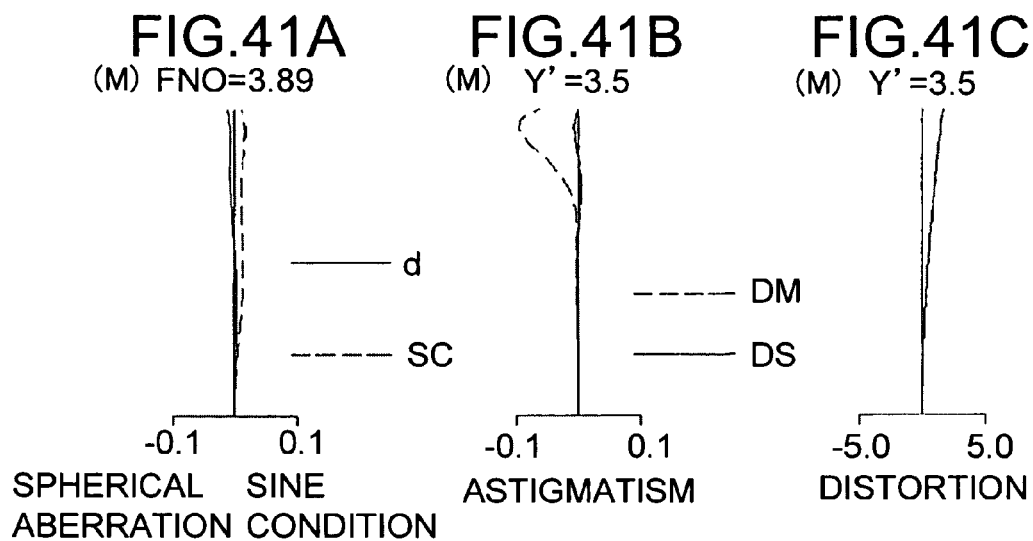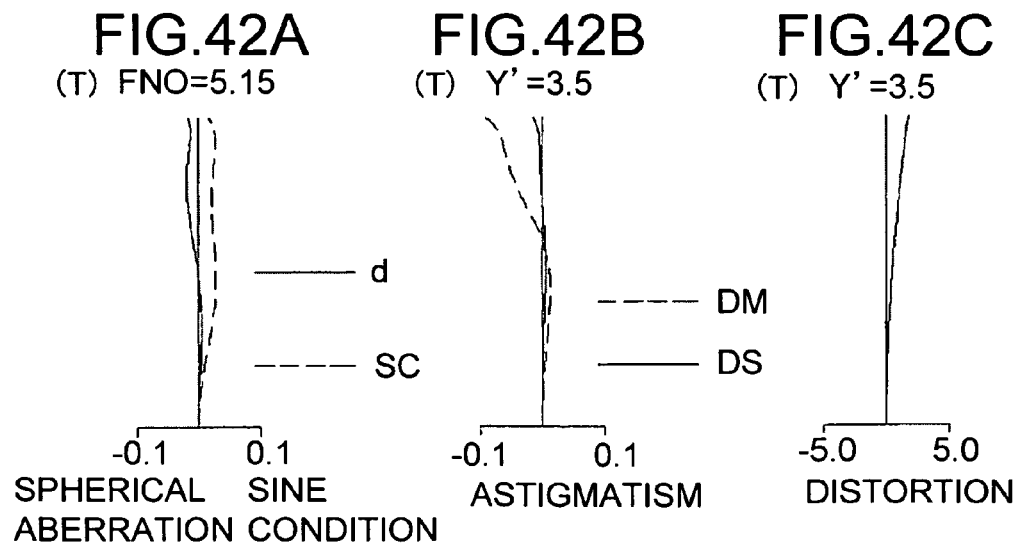

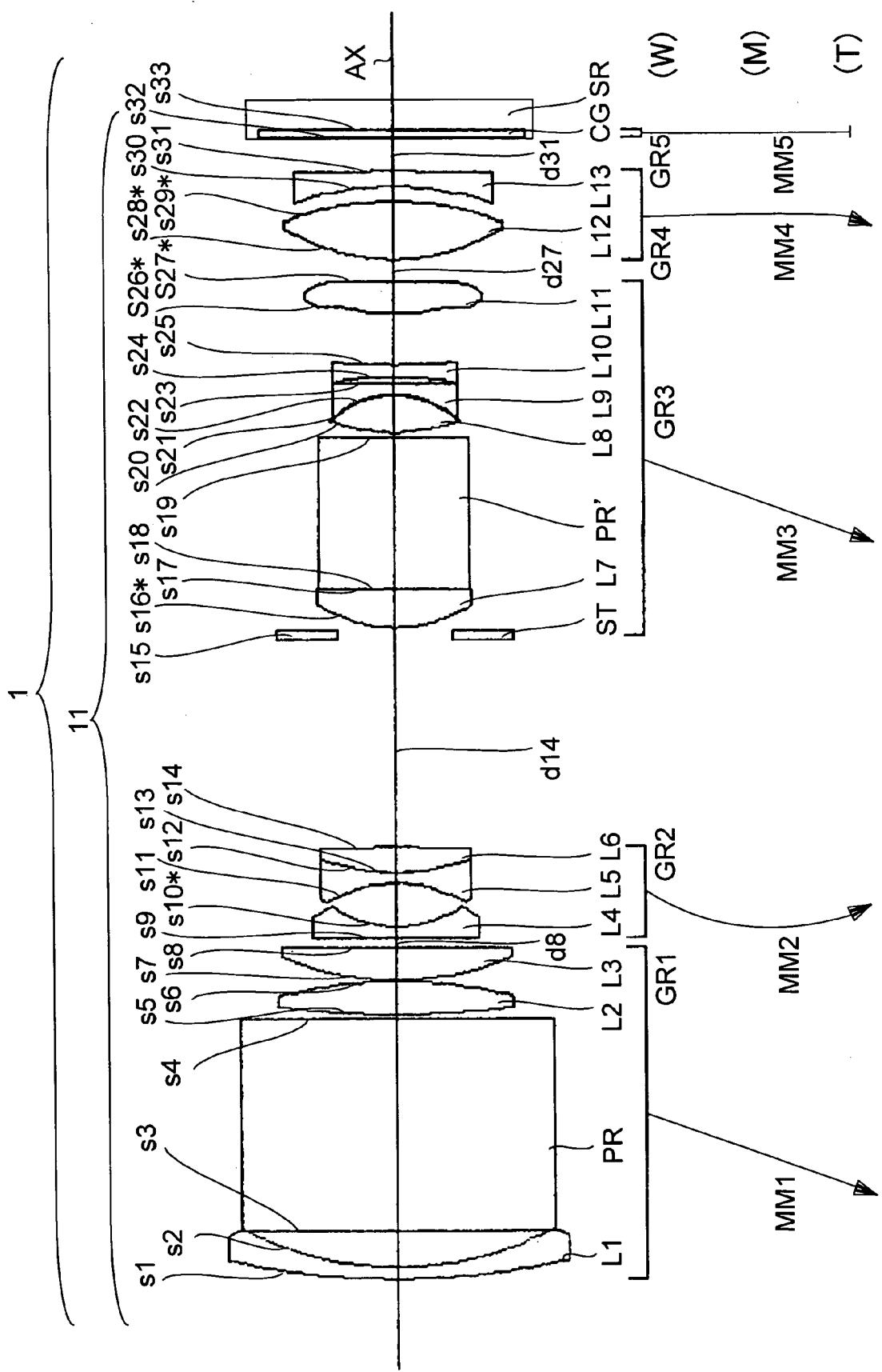

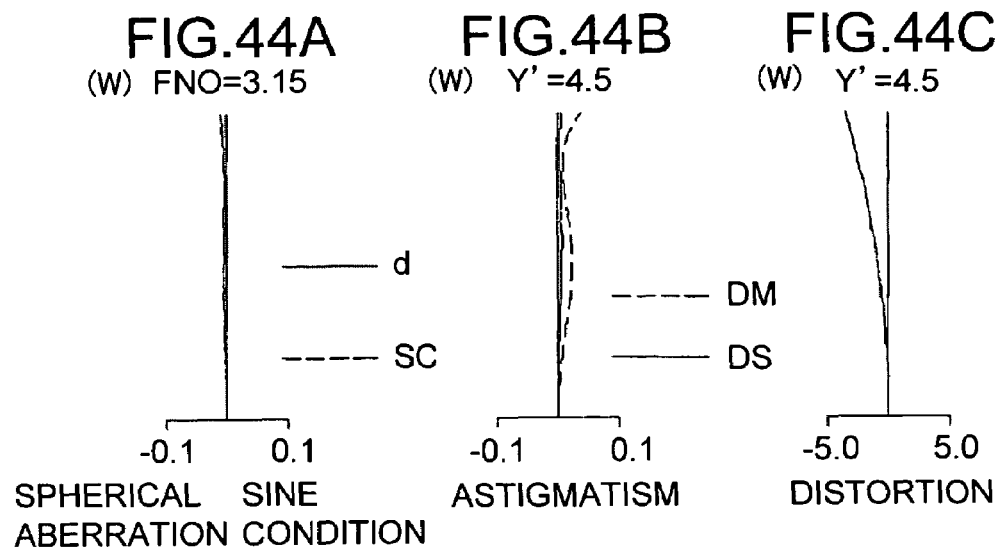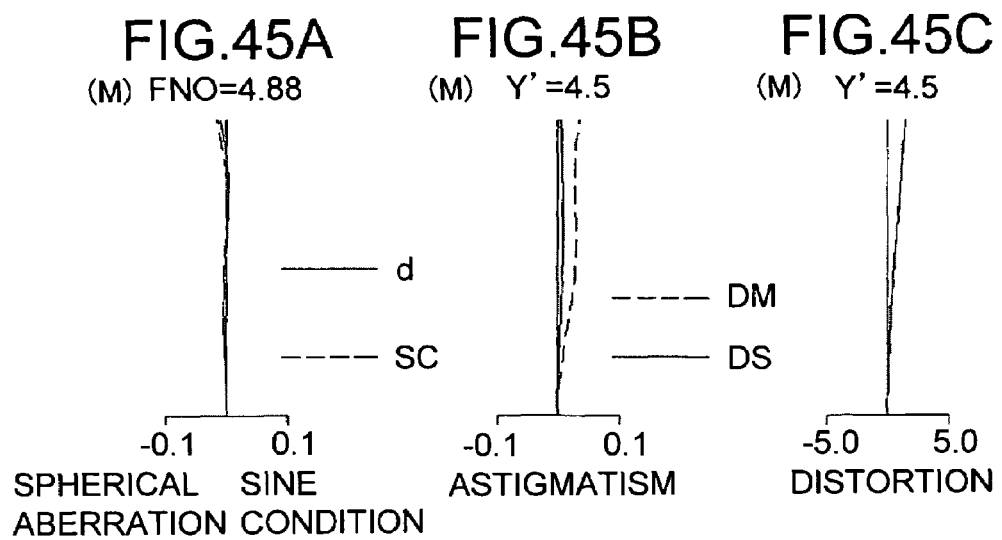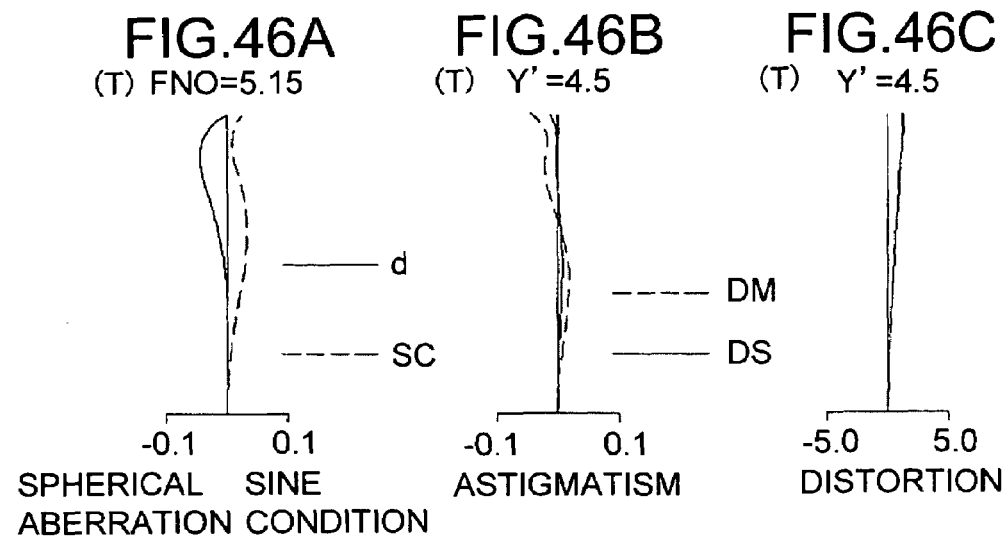

OPTICAL UNIT, AND IMAGE TAKING APPARATUS PROVIDED THEREWITH

This application is based on Japanese Patent Application No. 2005-177281 filed on Jun. 17, 2005, the contents of which are hereby incorporated by reference.

BACKGROUND OF THE INVENTION

1. Field of the Invention

The present invention relates to an optical unit including a lens optical system (variable magnification optical system or the like), and to an image taking apparatus provided with this optical unit.

2. Description of the Prior Art

In recent years, following widespread use of personal computers, digital cameras (image taking apparatuses) capable of easily taking in an image have been widespread. Thus, as is the case with cameras using a silver halide film (silver halide film cameras), there has been a demand imposed on such digital cameras for downsizing and performance enhancement (for example, high magnification variation function and high aberration correction function).

For example, image taking apparatuses (digital cameras or the like) as shown in patent publications 1 and 2 below have an zooming optical system (variable magnification optical system) including a plurality of lens units with optical power arrangement of positive, negative, positive, and positive as viewed from the object side toward the image side, and is capable of performing photographing from the wide-angle end position to the telephoto end position.

[Patent publication 1] JP-A-2002-107622 (see claim 1 and the like)
Disclosure date: Apr. 10, 2002
[Patent publication 2] JP-A-2001-117000 (see FIG. 5 and the like)
Disclosure date: Apr. 27, 2001

However, these image taking apparatuses capable of zooming suffer from problems below.

The image taking apparatus disclosed in the patent publication 1 performs zooming while a first lens unit (lens unit closest to the object side) is immobilized. Thus, this raises the need for receiving light of a relatively wide angle of view in zooming (in photographing at the wide-angle end position in particular), which leads to a problem of an upsized diameter of a lens element included in the first lens unit (front lens or the like). Therefore, such an image taking apparatus fails to satisfy recent demand for downsizing imposed on an image taking apparatus.

The image taking apparatus disclosed in the patent publication 2, different from the image taking apparatus disclosed in the patent publication 1, performs zooming while the first lens unit is movable. Thus, the diameter of the front lens element is relatively downsized. However, this image taking apparatus disclosed in the patent publication 2 assumes a zooming ratio of approximately 3×, thus failing to satisfy recent demand for function enhancement imposed on the image taking apparatus.

In addition to the problems described above, an image sensor mounted in the image taking apparatus provides higher performance in various points including the number of pixels. Thus, not only compactness and high magnification variation but also high aberration correction function has been increasingly demanded in the photographing optical system.

SUMMARY OF THE INVENTION

In view of such current condition, the present invention has been made, and it is an object of the invention to provide a compact optical unit that provides an extremely large magnification variation ratio as well as high performance, and an image taking apparatus provided with such an optical unit.

To achieve the object described above, according to one aspect of the invention, an optical unit includes: a variable magnification optical system having a plurality of lens units, and an image sensor for receiving light that has traveled via the variable magnification optical system. The plurality of lens units has at least: from the object side toward the image side, a first lens unit having a positive optical power, a second lens unit having a negative optical power, a third lens unit having a positive optical power, and a fourth lens unit having a positive optical power. In a case of magnification variation from the wide-angle end position to the telephoto end position, at least the first lens unit moves from the image side to the object side to thereby change at least one gap between the lens units. Conditional formula (1) below is satisfied:

$$3 < TL3/Y' < 8 \qquad \text{Conditional formula (1),}$$

where

TL3 represents an axial thickness of the third lens unit; and

Y' represents a height from an optical axis on an image surface of the image sensor (maximum image height).

According to another aspect of the invention, an image-taking apparatus including the optical unit described above becomes compact and provides high performance.

The objects described above, other objects, and characteristics of the invention will be more clear by the description of preferred embodiments given below and also by referring to the accompanying drawings.

BRIEF DESCRIPTION OF THE DRAWINGS

FIG. 2A is a spherical aberration diagram of the variable magnification optical system (Example 1) at the wide-angle end position (W);

FIG. 2B is an astigmatism diagram of the variable magnification optical system (Example 1) at the wide-angle end position (W);

FIG. 2C is a distortion diagram of the variable magnification optical system (Example 1) at the wide-angle end position (W);

FIG. 3A is a spherical aberration diagram of the variable magnification optical system (Example 1) at the middle focal length position (M);

FIG. 3B is an astigmatism diagram of the variable magnification optical system (Example 1) at the middle focal length position (M);

FIG. 3C is a distortion diagram of the variable magnification optical system (Example 1) at the middle focal length position (M);

FIG. 4A is a spherical aberration diagram of the variable magnification optical system (Example 1) at the telephoto end position (T);

FIG. 4B is an astigmatism diagram of the variable magnification optical system (Example 1) at the telephoto end position (T);

FIG. 4C is a distortion diagram of the variable magnification optical system (Example 1) at the telephoto end position (T);

FIG. 8A is a spherical aberration diagram of the variable magnification optical system (Example 2) at the wide-angle end position (W);

FIG. 8B is an astigmatism diagram of the variable magnification optical system (Example 2) at the wide-angle end position (W);

FIG. 8C is a distortion diagram of the variable magnification optical system (Example 2) at the wide-angle end position (W);

FIG. 9A is a spherical aberration diagram of the variable magnification optical system (Example 2) at the middle focal length position (M);

FIG. 9B is an astigmatism diagram of the variable magnification optical system (Example 2) at the middle focal length position (M);

FIG. 9C is a distortion diagram of the variable magnification optical system (Example 2) at the middle focal length position (M);

FIG. 10A is a spherical aberration diagram of a variable magnification optical system (Example 2) at the telephoto end position (T);

FIG. 10B is an astigmatism diagram of the variable magnification optical system (Example 2) at the telephoto end position (T);

FIG. 10C is a distortion diagram of the variable magnification optical system (Example 2) at the telephoto end position (T);

FIG. 12A is a spherical aberration diagram of the variable magnification optical system (Example 3) at the wide-angle end position (W);

FIG. 12B is an astigmatism diagram of the variable magnification optical system (Example 3) at the wide-angle end position (W);

FIG. 12C is a distortion diagram of the variable magnification optical system (Example 3) at the wide-angle end position (W);

FIG. 13A is a spherical aberration diagram of the variable magnification optical system (Example 3) at the middle focal length position (M);

FIG. 13B is an astigmatism diagram of the variable magnification optical system (Example 3) at the middle focal length position (M);

FIG. 13C is a distortion diagram of the variable magnification optical system (Example 3) at the middle focal length position (M);

FIG. 14A is a spherical aberration diagram of a variable magnification optical system (Example 3) at the telephoto end position (T);

FIG. 14B is an astigmatism diagram of the variable magnification optical system (Example 3) at the telephoto end position (T);

FIG. 14C is a distortion diagram of the variable magnification optical system (Example 3) at the telephoto end position (T);

FIG. 15 is a lens construction diagram of an optical unit including a variable magnification optical system of Example 4;

FIG. 16A is a spherical aberration diagram of the variable magnification optical system (Example 4) at the wide-angle end position (W);

FIG. 16B is an astigmatism diagram of the variable magnification optical system (Example 4) at the wide-angle end position (W);

FIG. 16C is a distortion diagram of the variable magnification optical system (Example 4) at the wide-angle end position (W);

FIG. 17A is a spherical aberration diagram of the variable magnification optical system (Example 4) at the middle focal length position (M);

FIG. 17B is an astigmatism diagram of the variable magnification optical system (Example 4) at the middle focal length position (M);

FIG. 17C is a distortion diagram of the variable magnification optical system (Example 4) at the middle focal length position (M);

FIG. 18A is a spherical aberration diagram of the variable magnification optical system (Example 4) at the telephoto end position (T);

FIG. 18B is an astigmatism diagram of the variable magnification optical system (Example 4) at the telephoto end (T);

FIG. 18C is a distortion diagram of the variable magnification optical system (Example 4) at the telephoto end position (T);

FIG. 20A is a spherical aberration diagram of a variable magnification optical system (Example 5) at the wide-angle end position (W);

FIG. 20B is an astigmatism diagram of the variable magnification optical system (Example 5) at the wide-angle end position (W);

FIG. 20C is a distortion diagram of the variable magnification optical system (Example 5) at the wide-angle end position (W);

FIG. 21A is a spherical aberration diagram of the variable magnification optical system (Example 5) at the middle focal length position (M);

FIG. 21B is an astigmatism diagram of the variable magnification optical system (Example 5) at the middle focal length position (M);

FIG. 21C is a distortion diagram of the variable magnification optical system (Example 5) at the middle focal length position (M);

FIG. 22A is a spherical aberration diagram of the variable magnification optical system (Example 5) at the telephoto end position (T);

FIG. 22B is an astigmatism diagram of the variable magnification optical system (Example 5) at the telephoto end position (T);

FIG. 22C is a distortion diagram of the variable magnification optical system (Example 5) at the telephoto end position (T);

FIG. 23 is a lens construction diagram of an optical unit including a variable magnification optical system of Example 6;

FIG. 24A is a spherical aberration diagram of the variable magnification optical system (Example 6) at the wide-angle end position (W);

FIG. 24B is an astigmatism diagram of the variable magnification optical system (Example 6) at the wide-angle end position (W);

FIG. 24C is a distortion diagram of the variable magnification optical system (Example 6) at the wide-angle end position (W);

FIG. 25A is a spherical aberration diagram of the variable magnification optical system (Example 6) at the middle focal length position (M);

FIG. 25B is an astigmatism diagram of the variable magnification optical system (Example 6) at the middle focal length position (M);

FIG. 25C is a distortion diagram of the variable magnification optical system (Example 6) at the middle focal length position (M);

FIG. 26A is a spherical aberration diagram of the variable magnification optical system (Example 6) at the telephoto end position (T);

FIG. 26B is an astigmatism diagram of the variable magnification optical system (Example 6) at the telephoto end position (T);

FIG. 26C is a distortion diagram of the variable magnification optical system (Example 6) at the telephoto end position (T);

FIG. 28A is a spherical aberration diagram of the variable magnification optical system (Example 7) at the wide-angle end position (W);

FIG. 28B is an astigmatism diagram of the variable magnification optical system (Example 7) at the wide-angle end position (W);

FIG. 28C is a distortion diagram of the variable magnification optical system (Example 7) at the wide-angle end position (W);

FIG. 29A is a spherical aberration diagram of the variable magnification optical system (Example 7) at the middle focal length position (M);

FIG. 29B is an astigmatism diagram of the variable magnification optical system (Example 7) at the middle focal length position (M);

FIG. 29C is a distortion diagram of the variable magnification optical system (Example 7) at the middle focal length position (M);

FIG. 30A is a spherical aberration diagram of the variable magnification optical system (Example 7) at the telephoto end position (T);

FIG. 30B is an astigmatism diagram of the variable magnification optical system (Example 7) at the telephoto end position (T);

FIG. 30C is a distortion diagram of the variable magnification optical system (Example 7) at the telephoto end position (T);

FIG. 31 is a lens construction diagram of an optical unit including a variable magnification optical system of Example 8;

FIG. 32A is a spherical aberration diagram of the variable magnification optical system (Example 8) at the wide-angle end position (W);

FIG. 32B is an astigmatism diagram of the variable magnification optical system (Example 8) at the wide-angle end position (W);

FIG. 32C is a distortion diagram of the variable magnification optical system (Example 8) at the wide-angle end position (W);

FIG. 33A is a spherical aberration diagram of the variable magnification optical system (Example 8) at the middle focal length position (M);

FIG. 33B is an astigmatism diagram of the variable magnification optical system (Example 8) at the middle focal length position (M);

FIG. 33C is a distortion diagram of the variable magnification optical system (Example 8) at the middle focal length position (M);

FIG. 34A is a spherical aberration diagram of the variable magnification optical system (Example 8) at the telephoto end position (T);

FIG. 34B is an astigmatism diagram of the variable magnification optical system (Example 8) at the telephoto end position (T);

FIG. 34C is a distortion diagram of the variable magnification optical system (Example 8) at the telephoto end position (T);

FIG. 36A is a spherical aberration diagram of the variable magnification optical system (Example 9) at the wide-angle end position (W);

FIG. 36B is an astigmatism diagram of the variable magnification optical system (Example 9) at the wide-angle end position (W);

FIG. 36C is a distortion diagram of the variable magnification optical system (Example 9) at the wide-angle end position (W);

FIG. 37A is a spherical aberration diagram of the variable magnification optical system (Example 9) at the middle focal length position (M);

FIG. 37B is an astigmatism diagram of the variable magnification optical system (Example 9) at the middle focal length position (M);

FIG. 37C is a distortion diagram of the variable magnification optical system (Example 9) at the middle focal length position (M);

FIG. 38A is a spherical aberration diagram of the variable magnification optical system (Example 9) at the telephoto end position (T);

FIG. 38B is an astigmatism diagram of the variable magnification optical system (Example 9) at the telephoto end position (T);

FIG. 38C is a distortion diagram of the variable magnification optical system (Example 9) at the telephoto end position (T);

FIG. 40A is a spherical aberration diagram of the variable magnification optical system (Example 10) at the wide-angle end position (W);

FIG. 40B is an astigmatism diagram of the variable magnification optical system (Example 10) at the wide-angle end position (W);

FIG. 40C is a distortion diagram of the variable magnification optical system (Example 10) at the wide-angle end position (W);

FIG. 41A is a spherical aberration diagram of the variable magnification optical system (Example 10) at the middle focal length position (M);

FIG. 41B is an astigmatism diagram of the variable magnification optical system (Example 10) at the middle focal length position (M);

FIG. 41C is a distortion diagram of the variable magnification optical system (Example 10) at the middle focal length position (M);

FIG. 42A is a spherical aberration diagram of the variable magnification optical system (Example 10) at the telephoto end position (T);

FIG. 42B is an astigmatism diagram of the variable magnification optical system (Example 10) at the telephoto end position (T);

FIG. 42C is a distortion diagram of the variable magnification optical system (Example 10) at the telephoto end position (T);

FIG. 43 is a lens construction diagram of an optical unit including a variable magnification optical system of Example 11;

FIG. 44A is a spherical aberration diagram of the variable magnification optical system (Example 11) at the wide-angle end position (W);

FIG. 44B is an astigmatism diagram of the variable magnification optical system (Example 11) at the wide-angle end position (W);

FIG. 44C is a distortion diagram of the variable magnification optical system (Example 11) at the wide-angle end position (W);

FIG. 45A is a spherical aberration diagram of the variable magnification optical system (Example 11) at the middle focal length position (M);

FIG. 45B is an astigmatism diagram of the variable magnification optical system (Example 11) at the middle focal length position (M);

FIG. 45C is a distortion diagram of the variable magnification optical system (Example 11) at the middle focal length position (M);

FIG. 46A is a spherical aberration diagram of the variable magnification optical system (Example 11) at the telephoto end position (T);

FIG. 46B is an astigmatism diagram of the variable magnification optical system (Example 11) at the telephoto end position (T); and FIG. 46C is a distortion diagram of the variable magnification optical system (Example 11) at the telephoto end position (T).

DETAILED DESCRIPTION OF THE PREFERRED EMBODIMENTS

First Embodiment

The embodiment of the present invention will be described with reference to the accompanying drawings.

1. Digital Camera

Figure 5:
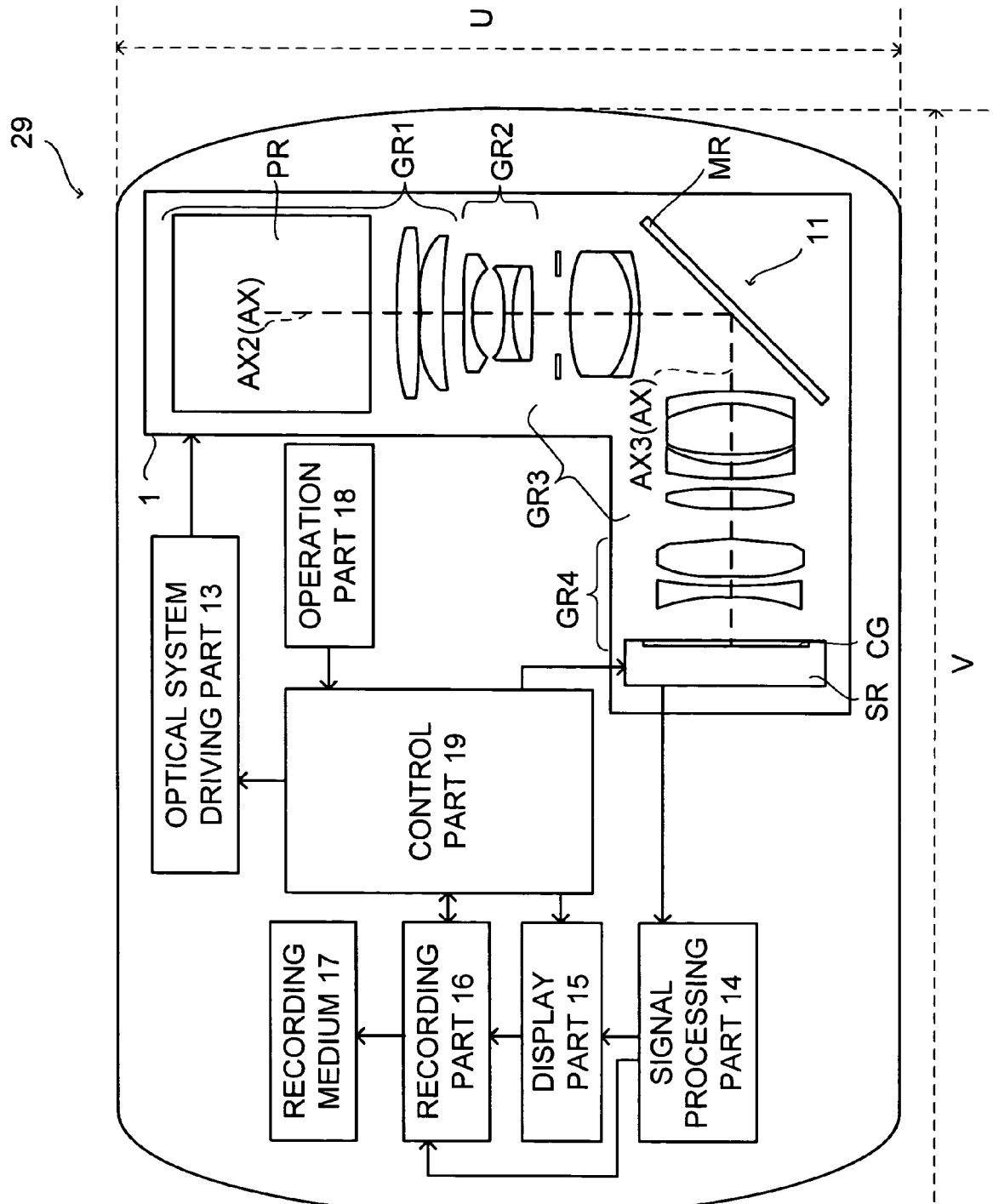
FIG. 5 is a schematic block diagram of a digital camera of each embodiment as viewed from behind.
Figure 6:
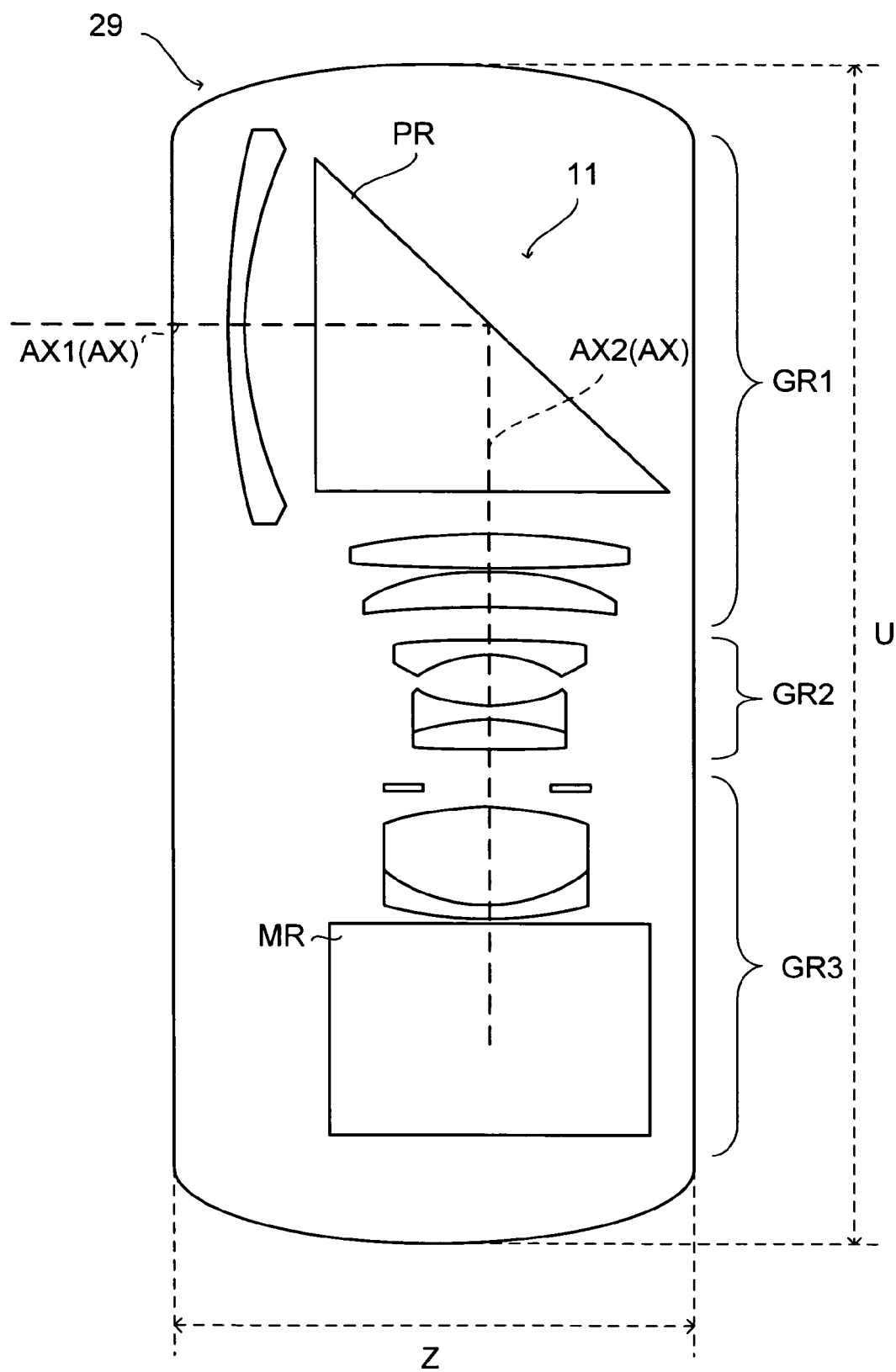
FIG. 6 is a schematic block diagram of the digital camera of each embodiment as viewed from the side.

FIGS. 5 and 6 are schematic block diagrams of a digital camera 29 as one example of an image taking apparatus. FIG. 5 shows the internal block construction of each part and an optical unit 1 (including a variable magnification optical system 11 and an image sensor SR) built in the digital camera 29. FIG. 6 shows the side of the digital camera 29, indicating, in particular, one example of the variable magnification optical system 11 included in the optical unit 1.

As shown in FIG. 5, the digital camera 29 includes the variable magnification optical system 11, an optical system driving part 13, the image sensor SR, a signal processing part 14, a display part 15, a recording part 16, a recording medium 17, an operation part 18, and a control part 19.

The variable magnification optical system 11 is an optical system that directs light from a photographing subject to the image sensor SR and also focuses this light on the light-receiving surface (image surface) of the image sensor SR. Therefore, the variable magnification optical system 11 may be expressed as a focusing optical system or a photographing optical system. The details of the variable magnification optical system 11 will be described later.

The optical system driving part 13 has several driving motors (optical system driving motors), not shown, and a transferring mechanism (a transferring mechanism for an optical system), not shown, for transferring driving force of these driving motors to lens units included in the variable magnification optical system 11. The optical system driving part 13 sets the focal length and focal position of the variable magnification optical system 11 by using the driving motors and the transferring mechanism. More specifically, the optical system driving part 13 sets the focal length and the focal position in accordance with directions provided from the control part 19.

The image sensor SR corresponds to, for example, an area sensor of a CCD (Charge Coupled Device), a CMOS (Complementary Metal Oxide Semiconductor) sensor, or the like, and receives a ray of light that has traveled via the variable magnification optical system 11 and then converts it into an electrical signal (sensed data). Then, the image sensor SR outputs this sensed data to the signal processing part 14.

The signal processing part 14 processes electronic data (sensed data) outputted from the image sensor SR to thereby generate sensed image data based on the sensed data. This signal processing part 14 turns on and off processing operation in accordance with directions provided from the control part 19. In addition, in accordance with directions provided from the control part 19, the signal processing part 14 outputs sensed image data to the display part 15 and the recording part 16.

The display part 15 includes, for example, a liquid crystal panel, and displays sensed image data and the like outputted from the signal processing part 14, the usage condition of the digital camera 29, and the like.

The recording part 16 records sensed image data generated by the signal processing part 14 onto the recording medium 17 in accordance with directions provided from the control part 19. The recording part 16 also reads sensed image data from the recording medium 17 in accordance with directions provided from the control part 19 in response to operation made by the operation part 18 or the like.

The recording medium 17 may be, for example, incorporated inside the digital camera 29, or may be a detachable memory card, such as a flash memory or the like. Thus, the recording medium 17 may be any medium, such as an optical disc, a semiconductor memory, or the like, that is capable of recording sensed image data and the like.

The operation part 18 outputs to the control part 19 various operation directions given by the user or the like, and includes, for example, a shutter release button, an operation dial, and the like.

The control part 19 is a center portion that performs control of operation of the entire digital camera 29 and the like, and organically controls driving of each member of the digital camera 29 to thereby achieve integrated control.

[2. Optical Unit]

Now, the optical unit 1 including the variable magnification optical system 11 and the image sensor SR will be described with reference to FIGS. 1, 5, and 6. The optical unit 1 shown as an example in FIGS. 5 and 6 is stored inside the digital camera 29. The optical unit 1 bends a ray of light with an optical prism PR and a reflective mirror MR.

Note that the optical unit 1 is not limited to such a lens system (bending optical system) that bends a ray, that is, the optical prism PR and the reflective mirror MR in FIGS. 5 and 6 need not be provided. Thus, in FIG. 1 showing the optical unit 1 shown in FIGS. 5 and 6 with the optical path shown in a row (lens construction diagram), the reflective mirror MR is omitted for convenience. In addition, the optical axes in this optical unit 1 are expressed as AXs (AX1 to AX3, see FIGS. 5 and 6).

Figure 1:
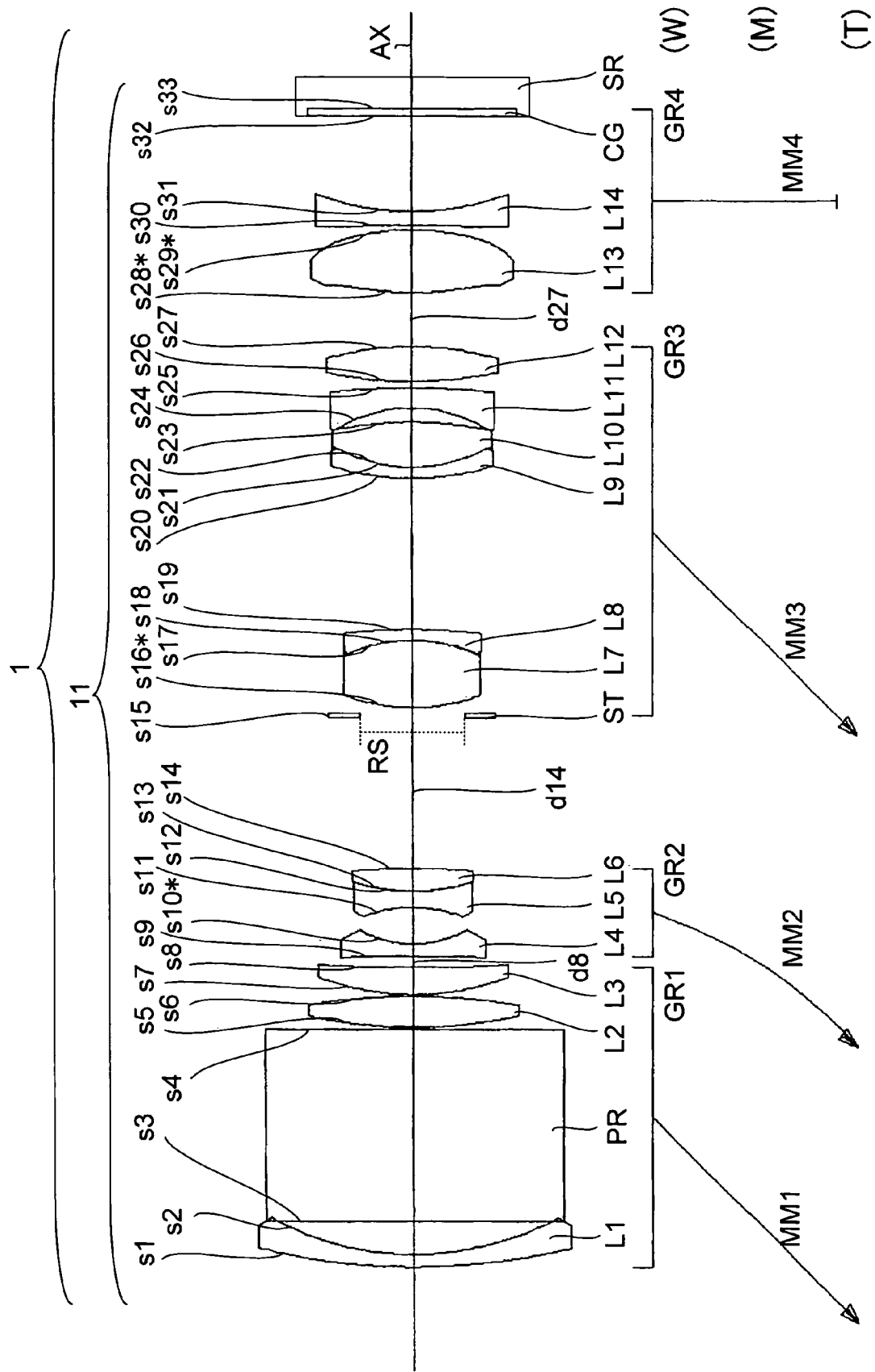
FIG. 1 is a lens construction diagram of an optical unit including a variable magnification optical system of Example 1.

Symbol "GRi" in this FIG. 1 denotes a lens unit, and symbol "Li" denotes a lens element. Further, symbol "si" denotes a surface (transmission surface or the like). Numerals (i) suffixed to "GRi", "Li", and "si" denote the order of position from the object side to the image side. In addition, an aspherical surface is suffixed with "*" (asterisk). The variable magnification optical system 11 (and thus the optical unit 1) shown in this FIG. 1 is represented as Example 1.

[2-1. Optical Unit (Example 1)]

The variable magnification optical system 11 of the optical unit 1 includes, in order from the photographing subject (object side), a first lens unit GR1, a second lens unit GR2, a third lens unit GR3, and a fourth lens unit GR4.

[First Lens Unit GR1]

The first lens unit GR1 includes from the object side, a first lens element L1, the optical prism PR, a second lens element L2, and a third lens element L3. This first lens unit GR1 has, as a whole, a "positive "optical power (refractive power). The optical power is defined by the reciprocal of the focal length.

The first lens element (front lens element) L1 is a negative meniscus lens element convex on the object side.

An optical prism (optical axis changing element) PR is a prism (for example, a right angle prism) capable of bending a ray from the object side at a right angle or the like. In the optical prism PR, s3 is an entrance surface for a ray, and s4 is an exit surface for a ray.

The second lens element L2 is a positive lens element (biconvex lens element) convex on both sides. The third lens element L3 is a positive meniscus lens element convex on the object side.

[Second Lens Unit]

The second lens unit GR2 includes in order from the object side, a fourth lens element L4, a fifth lens element L5, and a sixth lens element L6. This second lens unit GR2 has, as a whole, a "negative" optical power.

The fourth lens element L4 is a negative lens element (biconcave lens element) concave on both sides. In this fourth lens element L4, s10 is an aspherical surface (refractive optical surface in an aspherical shape, a surface having a refractive capability equivalent to that of an aspherical surface, or the like).

The fifth lens element L5 is a negative lens element concave on both sides. The sixth lens element L6 is a positive lens element convex on both sides. The fifth lens element L5 and the sixth lens element L6 compose a cemented lens element formed by cementing s12 and s13 together. Methods of cementing them together include, for example, cementing with a bonding agent (methods of cementing for cemented lens elements to be described later also include cementing with a bonding agent or the like).

[Third Lens Unit]

The third lens unit GR3 includes from the object side, an optical aperture stop ST, a seventh lens element L7, an eighth lens element L8, a ninth lens element L9, a tenth lens element L10, an eleventh lens element L11, and a twelfth lens element L12. This third lens unit GR3 has, as a whole, a positive optical power.

The optical aperture stop ST is an aperture stop with a variable aperture diameter RS. This optical aperture stop ST is integrated with the third lens unit GR3. In FIG. 1, this optical aperture stop ST itself is represented by s15 for convenience.

The seventh lens element (the most object side lens element of the third lens unit) L7 is a positive lens element convex on both sides. The surface s16 (the object side surface) of this seventh lens element L7 forms an aspherical surface. The eighth lens element L8 is a negative meniscus lens element concave on the object side. The seventh lens element L7 and the eighth lens element L8 compose a cemented lens element formed by cementing s17 and s18 together.

The ninth lens element L9 is a negative meniscus lens element convex on the object side. The tenth lens element L10 is a positive lens element convex on both sides. The ninth lens element L9 and the tenth lens element L10 compose a cemented lens element formed by cementing s21 and s22 together.

The eleventh lens element L11 is a negative meniscus lens element concave on the object side. The twelfth lens element L12 is a positive lens element convex on both sides.

[Fourth Lens Unit]

The fourth lens unit GR4 includes in order from the object side, a thirteenth lens element L13, a fourteenth lens element L14, and a cover glass CG. This fourth lens unit GR4 has, as a whole, a "positive" optical power.

The thirteenth lens element L13 is a positive lens element convex on both sides. The surfaces s28 and s29 each form an aspherical surface. The fourteenth lens element L14 is a negative lens element concave on both sides.

The cover glass CG is a glass formed of two surfaces (s32, s33) for protecting the light-receiving surface of the image sensor SR. Therefore, the surface s33 of the cover glass CG and the light-receiving surface of the image sensor SR are so disposed as to be extremely close to each other. This cover glass CG may serve as an optical filter (for example, infrared cut filter) having a predetermined cutoff frequency characteristic determined by the pixel pitch of the image sensor SR.

[Image Sensor]

The image sensor SR in the optical unit 1 of Example 1 is so arranged as to be fixed (immobile).

[2-2. Construction Data for the Variable Magnification Optical System (Example 1)]

Next, construction data for the variable magnification optical system 11 of Example 1 will be described with reference to Tables 1 and 2.

Symbol ri in this Table 1 denotes a radius of curvature (in mm) of each surface (si). An aspherical surface is suffixed with an asterisk (*). Symbol di denotes an axial surface distance (in mm) between the i-th surface (si) and the (i+1)-th surface (si+1). In a case where the axial surface distance varies by zooming, di at the wide-angle end position (W), di at the intermediate focal length position (M), and di at the telephoto end position (T) are indicated in this order.

Symbols Ni and υi denote the refractive index (Nd) and Abbe number (vd) possessed by a medium at the axial surface distance (di). The refractive index (Nd) and the Abbe number (vd) are provided for a d-line (wavelength 587.56 nm).

The "focal length position" implies the wide-angle end position (W; shortest focal length position) to the intermediate focal length position (M) to the telephoto end position (T; longest focal length position). Numerals f and FNO denote the focal length (in mm) and f-number, respectively, of the entire system corresponding to the respective focal length positions (W), (M), and (T).

The aspherical surface described above is defined by formula below (definitional equation 1):

$$X(H) = C_0 \cdot H^2 / (1 + \sqrt{1 - \epsilon \cdot C_0^2 \cdot H^2}) + \Sigma A_j \cdot H^j \quad \text{(Definitional equation 1)},$$

where
H represents the height in the direction perpendicular to the optical axis AX;
X (H) represents the displacement in the direction of the optical axis AX at the height H;
$C_0$ represents the paraxial curvature (=1/ri);
$\epsilon$ represents the quadric surface parameter;
j represents the order of the aspherical surface; and
$A_j$ represents the aspherical surface coefficient of order j.

Table 2 shows data on the aspherical surfaces (aspherical surface data). Here, it should be noted that the coefficient of any term that does not appear in the tables equals zero, and that, for all the data, E−n stands for ×10$^{-n}$.

[2-3. Movement of Each Lens Unit in the Optical Unit]

[2-3-1. Zooming]

Now, the movement of each of the lens units (GR1 to GR4) will be described with reference to FIG. 1. The optical unit 1 usually varies gaps between the lens units along the optical axis AX in zooming, such as magnification variation or the like. For example, the optical unit 1 of FIG. 1 moves part of the lens units (the first lens unit GR1 to the third lens unit GR3) in zooming.

In such zooming, the distance between the lens units (inter-unit distance) varies. In FIG. 1, only an axial surface distances (di) that vary during the zooming are numbered. More specifically, d8, d14, and d27 are shown in the figure. Arrows MMi in the figure schematically shows the movement loci of the lens unit from the wide-angle end position (W) to the intermediate focal length position (M) and further from the intermediate focal length position (M) to the telephoto end position (T). The letter i in MMi denotes the place in order from the object side to the image side; therefore, this letter corresponds to the place of a respective lens unit.

FIGS. 2A to 4C show aberration occurring with the variable magnification optical system 11 in zooming. More specifically, FIGS. 2A to 2C show the aberration at the wide-angle end position (W), FIGS. 3A to 3C show the aberration at the intermediate focal length position (M), and FIGS. 4A to 4C show the aberration at the telephoto end position (T).

FIGS. 2A, 3A, and 4A show the spherical aberration and sine conditions. In the figures, a line d represents the spherical aberration (in mm) for the d-line, and a broken line SC represents a deviation (in mm) from the sine condition. In these figures, FNOs (f-numbers) are also represented.

FIGS. 2B, 3B, and 4B show the astigmatism. A broken line DM indicates the astigmatism (in mm) for the d-line on the meridional surface. A line DS indicates the astigmatism (in mm) for the d-line on the sagittal surface. In each of these figures, the maximum image height on the light-receiving surface of the image sensor SR (the distance from the optical axis AX), Y' (in mm), is also represented.

FIGS. 2C, 3C, and 4C show the distortion. In the figures, a solid line indicates the distortion (in %) for the d-line. In each of these figures, Y' is also represented.

[3. One Example of Various Features]

As described above, the optical unit 1 (the optical unit 1 of Example 1) includes the variable magnification optical system 11 including a plurality of lens units (GR1 to GR4) and the image sensor SR for receiving light that has traveled via this variable magnification optical system 11. These plurality of lens units (GR1 to GR4) include at least, from the object side toward the image side, the first lens unit GR1 having a positive optical power, the second lens unit GR2 having a negative optical power, the third lens unit GR3 having a positive optical power, and the fourth lens unit GR4 having a positive optical power.

Such an optical unit 1 moves at least the first lens unit GR1 from the image side to the object side to vary at least one gap between the lens units in zooming (magnification variation) from the wide-angle end position (W) to the telephoto end position (T). In addition, the optical unit, in particular, satisfies conditional formula (A) (conditional formula (1)) below.

This conditional formula (A) is indicated as follows (no sign is provided to TL3 and Y' in the figure for convenience):

$$3 < TL3/Y' < 8 \quad \text{conditional formula (A),}$$

where

TL3 represents the axial thickness (in mm) of the third lens unit GR3, and

Y' represents the height of the image surface of the image sensor SR from the optical axis (maximum image height: half the diagonal length of the light-receiving surface of the image sensor SR (light-receiving part)).

The image height (maximum image height Y') is determined in accordance with the size of the image sensor SR (for example, 1.8-size image sensor SR).

This conditional formula (A) relates to the axial thickness (thickness on the optical axis) of the third lens unit GR3. This conditional formula (A) defines the range for achieving good balance between the downsizing of the optical unit (for example, reduction in the full length of the optical unit) and performance enhancement in aberration correction based on the axial thickness of the third lens unit GR3.

It can be said that, when the ratio of the axial thickness TL3 of the third lens unit GR3 with respect to the maximum image height Y' is equal to or larger than the upper limit value of the conditional formula (A), the axial thickness TL3 of the third lens unit GR3 is relatively thicker. In this case, favorable aberration correction can be performed by use of the thickness of the third lens unit GR3. For example, appropriately designing the thickness of the third lens unit GR3 permits favorable aberration correction to be performed by efficiently utilizing image height difference occurring inside this third lens unit GR3.

However, it can be said that the relatively large axial thickness TL3 of the third lens unit GR3 results in excessive upsizing of the third lens unit GR3 itself. Thus, when the ratio of the axial thickness TL3 of the third lens unit GR3 with respect to the maximum image height Y' is equal to or larger than the upper limit value of the conditional formula (A), the optical unit 1 performs favorable aberration correction although it is relatively upsized.

On the other hand, it can be said that, when the ratio of the axial thickness TL3 of the third lens unit GR3 with respect to the maximum image height Y' is equal to or smaller than the lower limit value of the conditional formula (A), the axial thickness TL3 of the third lens unit GR3 is relatively thin (and thus the third lens unit GR3 itself is relatively downsized).

However, the relatively thin axial thickness TL3 of the third lens unit GR3 results in, for example, failure to appropriately design the thickness of the third lens unit GR3 and thus failure to efficiently utilize the image height difference occurring in this third lens unit GR3, thus making it difficult to achieve favorable aberration correction. Thus, when the ratio of the axial thickness TL3 of the third lens unit GR3 with respect to the maximum image height Y' is equal to or smaller than the lower limit value of the conditional formula (A), the optical unit 1 achieves relative downsizing although suffering from difficulty in performing advanced (favorable) aberration correction.

As described above, when the ratio of the axial thickness TL3 of the third lens unit GR3 with respect to the maximum image height Y' is not larger than the upper limit value of the conditional formula (1), excessive downsizing of the optical unit 1 is suppressed. On the other hand, when the ratio of the axial thickness TL3 of the third lens unit GR3 with respect to the maximum image height Y' is not smaller than the lower limit value of the conditional formula (1), favorable aberration correction can be performed. Thus, within the range of the conditional formula (A), the optical unit 1 can be achieved which has the function of performing favorable aberration correction (which provides higher performance) despite of its compact size.

The conditional formula (A) for the optical unit 1 of Example 1 is as shown below (see also Table. 23 to be described below):

$$TL3/Y' \text{ at the optical unit 1 of Example 1} = 5.20$$

To permit even more favorable aberration correction, the object side surface (s16 of the seventh lens element L7) of the most object side lens element included in the third lens unit GR3 and located on the most object side (the seventh lens element L7 in the variable magnification optical system 1 of Example 1) may form an aspherical surface.

In the optical unit 1 having optical power arrangement of positive, negative, positive, and positive, the third lens unit GR3 is required to converge light diverging from the second lens unit GR2 (diverging light). Especially light (ray) immediately after diverging needs to be converged; therefore, the third lens unit GR3 is required to have a relatively strong positive optical power. The light diverging from the lens unit having such a strong positive optical power is relatively likely to induce spherical aberration or the like.

Thus, the optical unit 1 effectively correct spherical aberration or the like by forming into an aspherical shape the surface s16 (object side surface) of the seventh lens element L7 where the light traveling via the second lens unit GR2 first reaches.

Further, the object side surface of the most object side lens element included in the third lens unit GR3 and located on the most object side may satisfy conditional formula (B) below.

$$-30 < (|X|-|Xo|) \times 1000/\{Co \times (N'-N) \times f3\} < -2 \quad \text{Conditional formula (B),}$$

where
- X represents the shape of the aspherical surface [the value of X (H) in the definitional formula (1)],
- Xo represents the shape of the aspherical reference surface [the value of $Co \times H^2/\{1+\sqrt{(1-\epsilon, Co^2, H^2)}\}$ in the definitional formula (1)]
- Co represents the curvature of the aspherical reference surface (paraxial curvature)
- N represents the refractive power of a medium on the object side of the aspherical surface
- N' represents the refractive power of a medium on the image side of the aspherical surface; and
- f3 represents the focal length (in mm) of the third lens unit.

This conditional formula (B) relates to the aspherical shape of the third lens unit GR3 required for adjustment of a positive optical power. That is, this conditional formula (B) represents the permitted range of the aspherical shape required for aberration correction (correction of spherical aberration or the like).

In this conditional formula (B), when spherical aberration or the like attributable to a relatively strong positive optical power of the third lens unit GR3 cannot be successfully corrected (when undercorrected), the value of the conditional formula (B) becomes equal to or larger than the upper limit value. On the other hand, when spherical aberration or the like is excessively corrected (when overcorrected), the value of the conditional formula (B) becomes equal to or lower than the lower limit value.

Accordingly, within the range of the conditional formula (B), the optical unit 1 is achieved which has the function of performing even more favorable aberration correction. In the optical unit 1 in particular, this conditional formula (B) is satisfied with seven tenths of the maximum effective optical path diameter in the aspherical surface (s16) of the seventh lens element L7.

The values X, Xo, Co, N, N', and f3 in the conditional formulae of Example 1 are as follow (see also Table. 25 to be described later):
X is equal to 0.279600,
Xo is equal to 0.283451,
Co is equal to 0.0835073,
N is equal to 1.00000,
N' is equal to 1.69350, and
f3 is equal to 15.784.

The conditional formula (B) for the optical unit 1 including the variable magnification optical system 11 of Example 1 is as follows.

$$(|X|-|Xo|) \text{ of Example } 1 \times 1000/\{Co \times (N'-N) \times f3\} = -4.21$$
(see Table 23 to be described later).

In terms of chromatic aberration correction, in the optical unit 1, the most object side lens in the third lens unit GR3 (seventh lens element L7 in Example 1) may be cemented with the lens element adjacent thereto on the image side (eighth lens element L8) to form a cemented lens element (referred to as a cemented lens element L78).

As described above, the third lens unit GR3 needs to converge light diverging from the second lens unit GR2, and thus has a relatively strong positive optical power. The positive optical power of the seventh lens element L7, in particular, where light traveling via the second lens unit GR2 first reaches tends to become larger. As a result, relatively strong chromatic aberration attributable to this seventh lens element L7 tends to occur.

Accordingly, the optical unit 1 effectively corrects chromatic aberration by, for example, bonding the image side surface (s17: convex surface) of the seventh lens element L7 (a positive lens element convex on both sides) and the object side surface (s18: concave surface) of the eighth lens element L8 (negative meniscus lens element concave on the object side) of a different type (different surface) from the type of the seventh lens element L7.

To achieve further chromatic aberration correction, another cemented lens element (cemented lens element L910 formed of the ninth lens element L9 and the tenth lens element L10) may be located on the image side of the cemented lens element (L78) in the third lens unit GR3 (That is, a plurality of cemented lens elements may be disposed in the third lens unit GR3).

With the characteristics provided as described above, the optical unit 1 can effectively correct various aberration while being excellent in compactness. Moreover, the variable magnification optical system 11 included in the optical unit 1 can also be bendable.

For example, a reflective mirror MR or the like (see FIGS. 5 and 6) that changes the direction of the optical axis by reflecting it may be included in the third lens unit GR3. This can locate the variable magnification optical system 11 (the optical unit 1) at an appropriate position within the limited housing of the digital camera 29, thereby controlling, for example, the height direction U of the digital camera 29.

Providing such a reflective mirror MR or the like (optical axis changing element) in the optical unit 1 requires some space. However, excessively large space, on the other hand, leads to upsizing of the optical unit 1 (thus the digital camera 29). Thus, it is preferable that the optical unit 1 satisfy conditional formula (C) [conditional formula (2)] described below.

This conditional formula (C) is provided as follows (for convenience, no sign is provided for the symbol $TL3_M$ in the figure):

$$1 < TL3_M/RS < 2 \quad \text{Conditional formula (C),}$$

where
- $TL3_M$ represents the maximum air-spacing (in mm) between the lens elements included in the third lens unit GR3, and
- RS represents the maximum aperture stop diameter (in mm) of the optical aperture stop.

This conditional formula (C) defines the maximum spacing (air-spacing on the optical axis AX; $TL3_M$) in the third lens unit GR3 by the maximum aperture stop diameter RS of the optical aperture stop.

When the ratio of the air-spacing $TL3_M$ with respect to the maximum aperture stop diameter RS is equal to or larger than the upper limit value of the conditional formula (C), the full length of the third lens unit GR3 becomes relatively longer. In this case, the optical axis changing element, such as the reflective mirror MR or the like, can be appropriately disposed by using the air spacing. As a result, for example, the reflective mirror MR or the like can be disposed so that interference of light (a ray) does not occur when the optical path (optical axis) is bent.

However, the long full length of the third lens unit GR3 results in relatively longer full length of the variable magnification optical system 11 (and thus the optical unit 1). Thus, when the ratio of the air-spacing $TL3_M$ with respect to the maximum aperture stop diameter RS is equal to or larger than the upper limit value of the conditional formula (C), the optical unit 1 can favorably dispose the reflective mirror MR or the like although the variable magnification optical system 11 becomes relatively larger.

On the other hand, when the ratio of the air-spacing $TL3_M$ with respect to the maximum aperture stop diameter RS is equal to or lower than the lower limit value of the conditional formula (C), the full length of the third lens unit GR3 becomes relatively shorter. In this case, the variable magnification optical system 11 includes the shortened third lens unit GR3; therefore, this variable magnification optical system 11 (optical unit 1) is appropriately arranged inside the housing of the digital camera 29.

However, the relatively shorter full length of the third lens unit GR3 may possibly provide extremely narrow space for arranging the reflective mirror MR or the like. Thus, for example, upon the bending of the reflective mirror MR or the like, such a condition that causes interference of light (beam of light) may occur. Thus, when the ratio of the air-spacing $TL3_M$ with respect to the maximum aperture stop diameter RS is equal to or smaller than the lower limit value of the conditional formula (C); the optical unit 1 is downsized although suffering from difficulty in disposing the reflective mirror MR or the like at an appropriate position.

In conclusion, when the ratio of the air-spacing $TL3_M$ with respect to the maximum aperture stop diameter RS is not larger than the upper limit value of the conditional formula (C), excessive upsizing of the optical unit 1 can be suppressed, while, when the ratio of the air-spacing $TL3_M$ with respect to the maximum aperture stop diameter RS is not smaller than the lower limit value of the conditional formula (C), the reflective mirror MR or the like can be disposed favorably. Thus, within the range of the conditional formula (C), the optical unit 1 can be compact as well as can have the optical axis changing element favorably disposed (for example, so as to prevent the interference of the optical path).

The conditional formula (C) for the optical unit 1 including the variable magnification optical system 11 of Example 1 is as follows (also see Table. 23 to be described later):

$TL3_M/RS$ of Example 1=1.43.

The optical unit 1 can perform zooming by moving the first lens unit GR1 to the third lens unit GR3 as shown in FIG. 1. In zooming with the variable magnification optical system 11 having optical power arrangement of positive, negative, positive, and positive, the load of zooming is, in many cases, imposed on the second lens unit GR2 having a negative optical power.

However, the optical unit 1 reduces the load of magnification variation imposed on the second lens unit GR2 by also moving the third lens unit GR3 or the like. That is, this optical unit 1 reduces the amount of space variation in front of and behind the second lens unit GR2 which is required for zooming.

It is preferable that such an optical unit 1 satisfy conditional formula (D) [conditional formula (3)] below.

$1.5<\beta 3t/\beta 3w<3.5$      Conditional formula (D), where $\beta 3t$ represents the lateral magnification of the third lens unit GR3 at the telephoto end position; and $\beta 3w$ represents the lateral magnification of the third lens unit GR3 at the wide-angle end.

This conditional formula (D) defines an appropriate range of the magnification variation ratio of the third lens unit GR3. When the ratio of lateral magnification $\beta 3t$ with respect to the lateral magnification $\beta 3w$ is equal to or larger than the upper limit value of the conditional formula (D), the load of magnification variation imposed on the third lens unit GR3 becomes large, thus resulting in a larger change in space in front of and behind the third lens unit GR3. On the other hand, when the ratio of lateral magnification $\beta 3t$ with respect to the lateral magnification $\beta 3w$ is equal to or smaller than the lower limit value of the conditional formula (D), the load of magnification variation imposed on the second lens unit GR2 becomes large, thus resulting in a larger change in space in front of and behind the second lens unit GR2.

In this manner, excessive load of magnification variation imposed on either of the second lens unit GR2 and the third lens unit GR3 is likely to result in an excessively large change in space in front of and behind only either one of them. Thus, it can be said that the moving distance of either one of lens unit is likely to become long. The longer moving distance of only either one of the lens units as described above causes an increase in the space near this lens unit.

Accordingly, the lens units cannot be appropriately stored in the limited space inside the housing of the digital camera 29, thus resulting in an increase in, for example, the vertical direction U of the digital camera 29 (when the second lens unit GR2 is long) or the horizontal direction V (when the third lens unit GR3 is long) (see FIGS. 5 and 6).

Excessive load of magnification variation imposed on either one of the second lens unit GR2 and the third lens unit GR3 raises a problem that various aberration increases in the lens unit on which the load is imposed. Also in terms of this point, the optical unit 1 appropriately allocates the load of magnification variation to the second lens unit GR2 and the third lens unit GR3.

Based on the above, within the range of the conditional formula (D), the optical unit 1 can be provided which appropriately stores the lens units in the limited space inside the housing of the digital camera 29 (high degree of freedom in arrangement) while suppressing the occurrence of various aberration.

The conditional formula (D) for the optical unit including the variable magnification optical system 11 of Example 1 is as follows (also see Table. 23 to be described later):

$\beta 3t/\beta 3w$ of Example 1=2.28

The optical unit 1 may have invariable interunit distance between the first lens unit GR1 and the third lens unit GR3 when moving the both (the first lens unit GR1 and the third lens unit GR3) during zooming. For example, the optical unit 1 may have both the first lens unit GR1 and the third lens unit GR3 moved integrally via a lens frame, not shown.

Such a state in which the first lens unit GR1 and the third lens unit GR3 are coupled together (linked) permits the both lens units GR1 and GR3 to be stored in the same lens barrel, not shown, so that the lens barrel tends to become relatively compact.

Moreover, no movement power source (motor or the like) is required for each of the first lens unit GR1 and the third lens unit GR3. That is, the two lens units, i.e., the first lens unit GR1 and the third lens unit GR3, can be moved only by a single power source.

Zooming may be performed with the fourth lens unit GR4 immobilized. In this case, the fixed arrangement of this fourth lens unit GR4 itself permits simpler lens barrel configuration and also requires no moving power source for the fourth lens unit GR4.

Moreover, to achieve even higher degree of freedom in the arrangement, the optical unit 1 may have the first lens unit GR1 including the optical prism PR (see FIGS. 1, 5, 6). Providing the optical prism PR in the first lens unit GR1 in this manner provides, as is the case described above, the optical unit 1 capable of appropriately storing the lens units in the limited space inside the housing of the digital camera 29 (high degree of freedom in the arrangement). A depth direction Z of the digital camera 29 in particular can be relatively short, as shown in FIG. 6.

[4. Other Examples]

The optical unit 1 is not limited to the one including the variable magnification optical system 11 of Example 1 described above. Thus, an optical unit 1 including another variable magnification optical system 11 (Example 2) which exerts the effect described above will be described below.

[Variable Magnification Optical System of Example 2]

Figure 7:
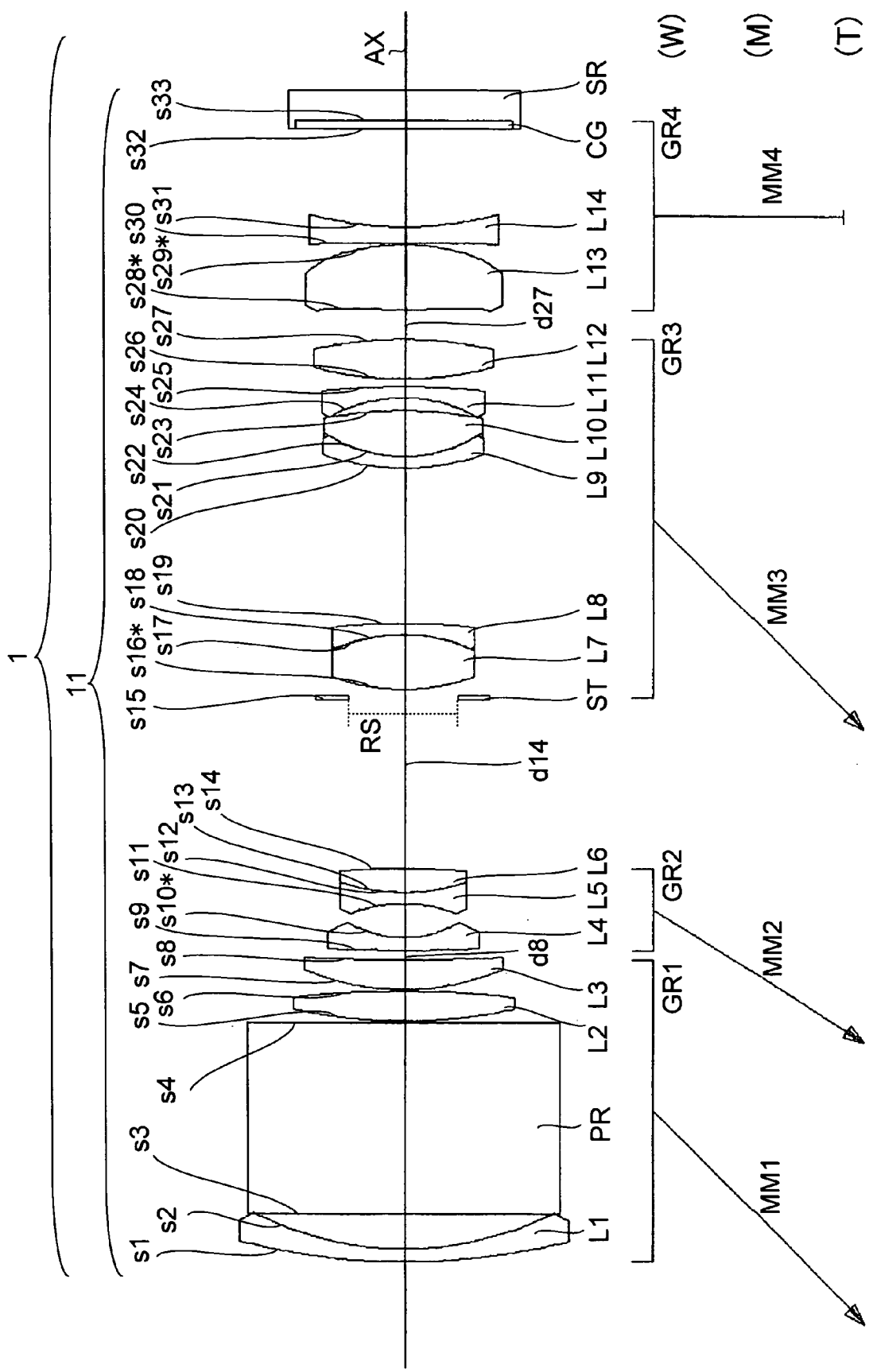
FIG. 7 is a lens construction diagram of an optical unit including a variable magnification optical system of Example 2.

As is the case with Example 1, the variable magnification optical system 11 (and thus the optical unit 1) of Example 2 shown in FIG. 7 includes: in order from a photographing subject, a first lens unit GR1, a second lens unit GR2, a third lens unit GR3, and a fourth lens unit GR4, having optical power arrangement of positive, negative, positive, and positive. To a cover glass CG included in the fourth lens unit GR4, an image sensor SR is fixed.

[First Lens Unit GR1]

The first lens unit GR1 includes: in order from the object side, a first lens element L1, an optical prism PR, a second lens element L2, and a third lens element L3, respectively having the following properties:

First lens element L1: a negative meniscus lens element convex on the object side;

Second lens element L2: a positive lens element convex on both sides; and

Third lens element L3: a positive meniscus lens element convex on the object side.

[Second Lens Unit]

The second lens unit GR2 includes: in order from the object side, a fourth lens element L4, a fifth lens element L5, and a sixth lens element L6, respectively having the following properties.

Fourth lens element L4: a negative meniscus lens element convex on the object side (s10 is aspherical);

Fifth lens element L5: a negative lens element concave on both sides; and

Sixth lens element L6: a positive lens element convex on both sides.

The fifth lens element L5 and the sixth lens element L6 compose a cemented lens element formed by cementing s12 and s13 together.

[Third Lens Unit]

The third lens unit GR3 includes: in order from the object side, an optical aperture stop (also indicated as s15, integrated with the third lens unit GR3), a seventh lens element (most object side lens element) L7, an eighth lens element L8, a ninth lens element L9, a tenth lens element L10, an eleventh lens element L11, and a twelfth lens element L12, respectively having the following properties:

Seventh lens element L7: a positive lens element convex on both sides [s16 (object side surface) is aspherical];

Eighth lens element L8: a negative meniscus lens element concave on the object side;

Ninth lens element L9: a negative meniscus lens element convex on the object side;

Tenth lens element L10: a positive lens element convex on both sides;

Eleventh lens element L11: a negative meniscus lens element concave on the object side; and Twelfth lens element L12: a positive lens element convex on both sides.

The seventh lens element L7 and the eighth lens element L8 compose cemented lens element by cementing s17 and s18 together. The ninth lens element L9 and the tenth lens element L10 compose a cemented lens element formed by cementing s21 and s22 together.

[Fourth Lens Unit]

The fourth lens unit GR4 includes: in order from the object side, a thirteenth lens element L13, a fourteenth lens element L14, and a cover glass CG (glass formed of two surfaces having s32 and s33), respectively having the following properties:

Thirteenth lens element L13: a positive lens element convex on both sides (s28 and s29 are aspherical); and Fourteenth lens element L14: a negative lens element concave on both sides.

[Construction Data of the Variable Magnification Optical System (Example 2)]

Construction data of the variable magnification optical system 11 of Example 2 will be described with reference to Tables. 3 and 4. These Tables. 3 and 4 are expressed in the same manner as Tables. 1 and 2.

[Movement of Each Lens Unit in the Optical Unit]

[Zooming]

The variable magnification optical system 11 of Example 2 moves toward the object side at least part of the lens units (the first lens unit GR1 to the third lens unit GR3) during zooming as shown in FIG. 7. Thus, in FIG. 7, only an axial space distance (di) that fluctuates following the zooming is numbered. More specifically, d8, d14, and d27 are shown in the figure.

FIGS. 8 to 10 show aberration occurring in the variable magnification optical system 11 of Example 2 during zooming. These FIGS. 8A to 8C through FIGS. 10A to 10C are expressed in the same manner as FIGS. 2A to 2C through FIGS. 4A to 4C.

Second Embodiment

The second embodiment will be described. Members having the same function as those used in the first embodiment are provided with the same numerals and thus omitted from the description.

The optical unit 1 of the first embodiment has been described, referring to the one whose object side surface of the most object side lens element (L7) in the third lens unit GR3 is aspherical (s16), although the optical unit 1 is not limited thereto.

[1. Optical Unit Including Various Variable Magnification Optical Systems]

For example, the most image side lens element (Li) in the third lens unit GR3 may have an aspherical surface. Thus, the optical units 1 including such a variable magnification optical system 11 (Examples 3 to 7) will be described.

As is the case with Examples 1 and 2, lens units (GR1 to GR4) of the variable magnification optical systems 11 of Examples 3 to 7 described below also include: in order from a photographing subject, a first lens unit GR1, a second lens unit GR2, a third lens unit GR3, and a fourth lens unit GR4, having arrangement optical power of positive, negative, positive, and positive. To a cover glass CG included in the fourth lens unit GR4, an image sensor SR is fixed (the image sensor SR and the fourth lens unit GR4 are immobilized during magnification variation).

[Variable Magnification Optical System of Example 3 (see FIG. 11)]

[First Lens Unit GR1]

The first lens unit GR1 includes: in order from the object side, a first lens element L1, an optical prism PR, a second lens element L2, and a third lens element L3, respectively having the following properties:

First lens element L1: a negative meniscus lens element convex on the object side;
Second lens element L2: a positive lens element convex on both sides; and
Third lens element L3: a positive meniscus lens element convex on the object side.

[Second Lens Unit]

The second lens unit GR2 includes: in order from the object side, a fourth lens element L4, a fifth lens element L5, and a sixth lens element L6, respectively having the following properties:

Fourth lens element L4: a negative lens element concave on both sides (s10 is aspherical);
Fifth lens element L5: a negative lens element concave on both sides; and
Sixth lens element L6: a positive lens element convex on both sides.

The fifth lens element L5 and the sixth lens element L6 compose a cemented lens element formed by cementing s12 and s13 together.

[Third Lens Unit]

The third lens unit GR3 includes: in order from the object side, an optical aperture stop (also indicated as s15, integrated with the third lens unit GR3), a seventh lens element (the most object side lens element) L7, an eighth lens element L8, a ninth lens element L9, a tenth lens element L10, and an eleventh lens element (the most image side lens element) L11, respectively having the following properties:

Seventh lens element L7: a positive lens element convex on both sides [s16 (the object side surface) is aspherical];
Eighth lens element L8: a negative meniscus lens element concave on the object side;
Ninth lens element L9: a negative meniscus lens element convex on the object side;
Tenth lens element L10: a positive meniscus lens element convex on the object side; and
Eleventh lens element L11: a positive meniscus lens element convex on the object side (s24 and s25 are aspherical).

The seventh lens element L7 and the eighth lens element L8 compose a cemented lens element formed by cementing s17 and s18 together. The ninth lens element L9 and the tenth lens element L10 compose a cemented lens element formed by cementing s21 and s22 together.

[Fourth Lens Unit]

The fourth lens unit GR4 includes: in order from the object side, a twelfth lens element L12 and a cover glass CG (glass formed of two surfaces having s28 and s29), and the twelfth lens element L12 has the following property:

Twelfth lens element L12: a positive lens element convex on the object side (s26 and s27 are aspherical).

[Construction Data of Variable Magnification Optical System (Example 3)]

Construction data of the variable magnification optical system 11 of Example 3 will be described with reference to Tables. 5 and 6. These Tables. 5 and 6 are expressed in the same manner as Tables. 1 and 2.

[Movement of Each Lens Unit in the Optical Unit]

[Zooming]

Figure 11:
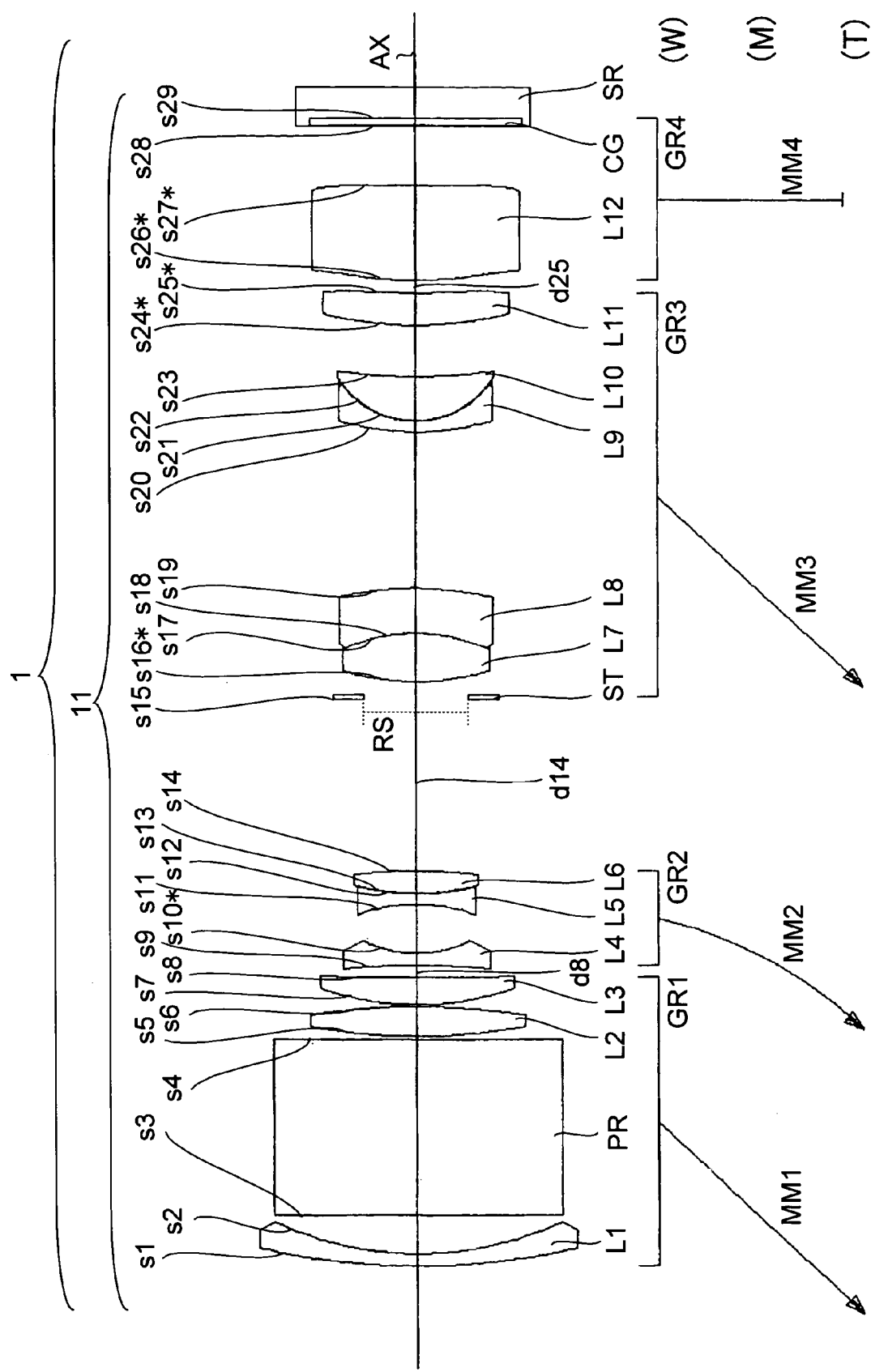
FIG. 11 is a lens construction diagram of an optical unit including a variable magnification optical system of Example 3.

The variable magnification optical system 11 of Example 3 moves toward the object side at least part of the lens units (first lens unit GR1 to third lens unit GR3) during zooming, as shown in FIG. 11. Thus, in FIG. 11, only an axial surface distance (di) that fluctuates following zooming is numbered. More specifically, d8, d14, and d25 are shown.

FIGS. 12A to 12C through FIGS. 14A to 14C show aberration occurring in the variable magnification optical system 11 of Example 3 during zooming. These FIGS. 12A to 12C through FIGS. 14A to 14C are expressed in the same manner as FIGS. 2A to 2C through FIGS. 4A to 4C.

[Variable Magnification Optical System of Example 4 (see FIG. 15)]

[First Lens Unit GR1]

The first lens unit GR1 includes: in order from the object side, a first lens element L1, an optical prism PR, a second lens element L2, and a third lens element L3, respectively having the following properties:

The first lens element L1: a negative meniscus lens element convex on the object side;

The second lens element L2: a positive lens element convex on both sides; and

The third lens element L3: a positive lens element convex on both sides.

[Second Lens Unit]

The second lens unit GR2 includes: in order from the object side, a fourth lens element L4, a fifth lens element L5, and a sixth lens element L6, respectively having the following properties:

The fourth lens element L4: a negative lens element concave on both sides (s10 is aspherical);

The fifth lens element L5: a negative lens element concave on both sides; and

The sixth lens element L6: a positive lens element convex on both sides.

The fifth lens element L5 and the sixth lens element L6 compose a cemented lens element formed by cementing s12 and s13 together.

[Third Lens Unit]

The third lens unit GR3 includes: in order from the object side, an optical aperture stop (also indicated as s15, integrated with the third lens unit GR3), a seventh lens element (the most object side lens element) L7, an eighth lens element L8, a ninth lens element L9, a tenth lens element L10, and an eleventh lens (the most image side lens element) L11, respectively having the following properties:

The seventh lens element L7: a positive lens element convex on both sides [s16 (the object side surface) is aspherical];

The eighth lens element L8: a negative meniscus lens element concave on the object side;

The ninth lens element L9: a negative meniscus lens element convex on the object side;

The tenth lens element L10: a positive meniscus lens element convex on the object side; and The eleventh lens element L11: a positive lens element convex on both sides (s24 and s25 are aspherical).

The seventh lens element L7 and the eighth lens element L8 compose a cemented lens element formed by cementing s17 and s18 together. The ninth lens element L9 and the tenth lens element L10 compose a cemented lens element formed by cementing s21 and s22 together.

[Fourth Lens Unit]

The fourth lens unit GR4 includes: in order from the object side, a twelfth lens element L12, a thirteenth lens element L13, and a cover glass CG (glass formed of two surfaces having s30 and s31), respectively having the following properties:

The twelfth lens element L12: a positive lens element convex on both sides (s26 and s27 are aspherical); and The thirteenth lens element L13: a negative lens element concave on both sides

[Construction Data of Variable Magnification Optical System (Example 4)]

Construction data of the variable magnification optical system 11 of Example 4 will be described with reference to Tables. 7 and 8. These Tables. 7 and 8 are expressed in the same manner as Tables. 1 and 2.

[Movement of Each Lens Unit in the Optical Unit]

[Zooming]

The variable magnification optical system 11 of Example 4 moves toward the object side at least part of the lens units (the first lens unit GR1 to the third lens unit GR3) during zooming as shown in FIG. 15. Thus, in FIG. 15, only an axial space distance (di) that fluctuates following the zooming is numbered. More specifically, d8, d14, and d25 are shown in the figure.

FIGS. 16A to 16C through FIGS. 18A to 18C show aberration occurring in the variable magnification optical system 11 of Example 4 during zooming. These FIGS. 16A to 16C through FIGS. 18A to 18C are expressed in the same manner as FIGS. 2A to 2C through FIGS. 4A to 4C.

[Variable Magnification Optical System of Example 5 (see FIG. 19)]

[First Lens Unit GR1]

The first lens unit GR1 includes: in order from the object side, a first lens element L1, an optical prism PR, a second lens element L2, and a third lens element L3, respectively having the following properties:

The first lens element L1: a negative meniscus lens element convex on the object side;

The second lens element L2: a positive lens element convex on both sides; and

The third lens element L3: a positive lens element convex on both sides.

[Second Lens Unit]

The second lens unit GR2 includes: in order from the object side, a fourth lens element L4, a fifth lens element L5, and a sixth lens element L6, respectively having the following properties:

The fourth lens element L4: a negative lens element concave on both sides (s10 is aspherical);

The fifth lens element L5: a negative lens element concave on both sides; and

The sixth lens element L6: a positive lens element convex on both sides.

The fifth lens element L5 and the sixth lens element L6 compose a cemented lens element formed by cementing s12 and s13 together.

[Third Lens Unit]

The third lens unit GR3 includes: in order from the object side, an optical aperture stop (also indicated as s15, integrated with the third lens unit GR3), a seventh lens element (the most object side lens element) L7, an eighth lens element L8, a ninth lens element L9, a tenth lens element L10, and an eleventh lens (the most image side lens element) L11, respectively having the following properties:

The seventh lens element L7: a positive lens element convex on both sides [s16 (the object side surface) is aspherical];

The eighth lens element L8: a negative meniscus lens element concave on the object side;

The ninth lens element L9: a negative meniscus lens element convex on the object side;

The tenth lens element L10: a positive meniscus lens element convex on the object side; and The eleventh lens element L11: positive meniscus lens element convex on the object side (s24 and s25 are aspherical).

The seventh lens element L7 and the eighth lens element L8 compose a cemented lens element formed by cementing s17 and s18 together. The ninth lens element L9 and the tenth lens element L10 compose a cemented lens element formed by cementing s21 and s22 together.

[Fourth Lens Unit]

The fourth lens unit GR4 includes: in order from the object side, a twelfth lens element L12, a thirteenth lens element L13, and a cover glass CG (glass formed of two surfaces having s30 and s31), respectively having the following properties:

The twelfth lens element L12: a positive lens element convex on both sides (s26 and s27 are aspherical); and The thirteenth lens element L13: a negative lens element concave on both sides.

[Construction Data of Variable Magnification Optical System (Example 5)]

Construction data of the variable magnification optical system 11 of Example 5 will be described with reference to Tables. 9 and 10. These Tables. 9 and 10 are expressed in the same manner as Tables. 1 and 2.

[Movement of Each Lens Unit in the Optical Unit]

[Zooming]

Figure 19:
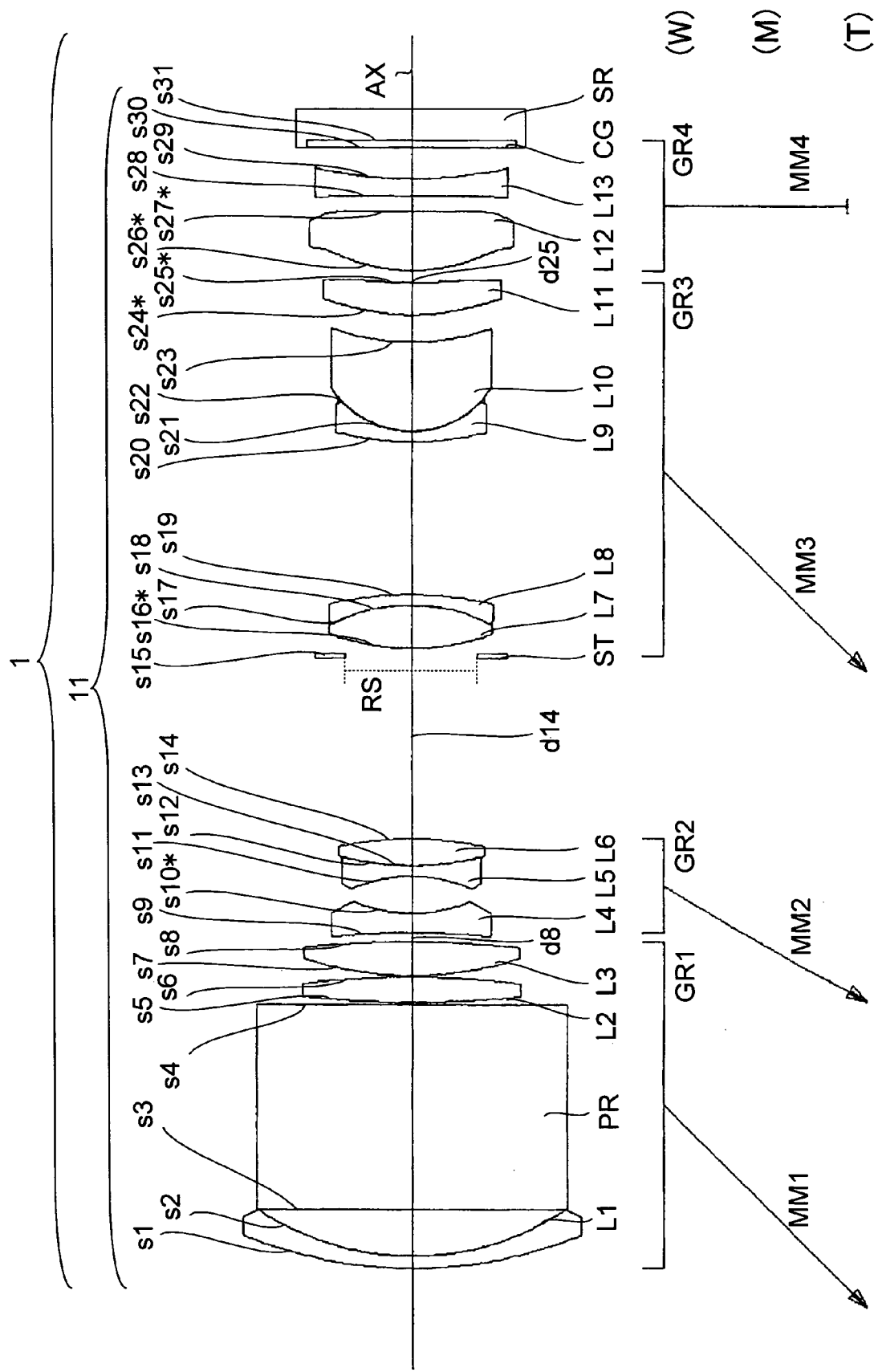
FIG. 19 is a lens construction diagram of an optical unit including a variable magnification optical system of Example 5.

The variable magnification optical system 11 of Example 5 moves toward the object side at least part of the lens units (the first lens unit GR1 to the third lens unit GR3) during zooming as shown in FIG. 19. Thus, in FIG. 19, only an axial space distance (di) that fluctuates following the zooming is numbered. More specifically, d8, d14, and d25 are shown in the figure.

FIGS. 20A to 20C through FIGS. 22A to 22C show aberration occurring in the variable magnification optical system 11 of Example 5 during zooming. These FIGS. 20A to 20C through FIGS. 22A to 22C are expressed in the same manner as FIGS. 2A to 2C through FIGS. 4A to 4C.

[Variable Magnification Optical System of Example 6 (see FIG. 23)]

[First Lens Unit GR1]

The first lens unit GR1 includes: in order from the object side, a first lens element L1, an optical prism PR, a second lens element L2, and a third lens element L3, respectively having the following properties:

The first lens element L1: a negative meniscus lens element convex on the object side;

The second lens element L2: a positive lens element convex on both sides; and

The third lens element L3: a positive meniscus lens element convex on the object side.

[Second Lens Unit]

The second lens unit GR2 includes: in order from the object side, a fourth lens element L4, a fifth lens element L5, and a sixth lens element L6, respectively having the following properties:

The fourth lens element L4: a negative meniscus lens element convex on the object side (s10 is aspherical);

The fifth lens element L5: a negative lens element concave on both sides; and

The sixth lens element L6: a positive lens element convex on both sides.

The fifth lens element L5 and the sixth lens element L6 compose a cemented lens element formed by cementing s12 and s13 together.

[Third Lens Unit]

The third lens unit GR3 includes: in order from the object side, an optical aperture stop (also indicated as s15, integrated with the third lens unit GR3), a seventh lens element (the most object side lens element) L7, an eighth lens element L8, a ninth lens element L9, a tenth lens element L10, and an eleventh lens element (the most image side lens element) L11, respectively having the following properties:

The seventh lens element L7: a positive lens element convex on both sides [s16 (the object side surface) is aspherical];

The eighth lens element L8: a negative meniscus lens element concave on the object side;

The ninth lens element L9: a negative meniscus lens element convex on the object side;

The tenth lens element L10: a positive meniscus lens element convex on the object side; and The eleventh lens element L11: a positive meniscus lens element convex on the object side (s24 and s25 are aspherical).

The seventh lens element L7 and the eighth lens element L8 compose a cemented lens element formed by cementing s17 and s18 together. The ninth lens element L9 and the tenth lens element L10 compose a cemented lens element formed by cementing s21 and s22 together.

[Fourth Lens Unit]

The fourth lens unit GR4 includes: in order from the object side, a twelfth lens element L12, a thirteenth lens element L13, and a cover glass CG (glass formed of two surfaces having s30 and s31), respectively having the following properties:

The twelfth lens element L12: a positive lens element convex on both sides (s26 and s27 are aspherical); and The thirteenth lens element L13: a negative meniscus lens element concave on the object side

[Construction Data of Variable Magnification Optical System (Example 6)]

Construction data of the variable magnification optical system 11 of Example 6 will be described with reference to Tables. 11 and 12. These Tables. 11 and 12 are expressed in the same manner as Tables. 1 and 2.

[Movement of Each Lens Unit in the Optical Unit]

[Zooming]

The variable magnification optical system 11 of Example 6 moves toward the object side at least part of the lens units (the first lens unit GR1 to the third lens unit GR3) during zooming as shown in FIG. 23. Thus, in FIG. 23, only an axial space distance (di) that fluctuates following the zooming is numbered. More specifically, d8, d14, and d25 are shown in the figure.

FIGS. 24A to 24C through FIGS. 26A to 26C show aberration occurring in the variable magnification optical system 11 of Example 6 during zooming. These FIGS. 24A to 24C through FIGS. 26A to 26C are expressed in the same manner as FIGS. 2A to 2C through FIGS. 4A to 4C.

[Variable Magnification Optical System of Example 7 (see FIG. 27)]

[First Lens Unit GR1]

The first lens unit GR1 includes: in order from the object side, a first lens element L1, an optical prism PR, a second lens element L2, and a third lens element L3, respectively having the following properties:

The first lens element L1: a negative meniscus lens element convex on the object side;

The second lens element L2: a positive lens element convex on both sides; and

The third lens element L3: a positive meniscus lens element convex on the object side.

[Second Lens Unit]

The second lens unit GR2 includes: in order from the object side, a fourth lens element L4, a fifth lens element L5, and a sixth lens element L6, respectively having the following properties:

The fourth lens element L4: a negative lens element concave on both sides (s10 is aspherical);

The fifth lens element L5: a negative lens element concave on both sides; and

The sixth lens element L6: a positive lens element convex on both sides.

The fifth lens element L5 and the sixth lens element L6 compose a cemented lens element formed by cementing s12 and s13 together.

[Third Lens Unit]

The third lens unit GR3 includes: in order from the object side, an optical aperture stop (also indicated as s15, integrated with the third lens unit GR3), a seventh lens element (the most object side lens element) L7, an eighth lens element L8, a ninth lens element L9, a tenth lens element L10, and an eleventh lens (the most image side lens element) L11, respectively having the following properties:

The seventh lens element L7: a positive lens element convex on both sides [s16 (the object side surface) is aspherical];

The eighth lens element L8: a negative meniscus lens element concave on the object side;

The ninth lens element L9: a positive lens element convex on both sides;

The tenth lens element L10: a negative lens element concave on both sides; and

The eleventh lens element L11: a negative meniscus lens element concave on the object side (s24 and s25 are aspherical).

The seventh lens element L7 and the eighth lens element L8 compose a cemented lens element formed by cementing s17 and s18 together. The ninth lens element L9 and the tenth lens element L10 compose a cemented lens element formed by cementing s21 and s22 together.

[Fourth Lens Unit]

The fourth lens unit GR4 includes: in order from the object side, a twelfth lens element L12 and a cover glass CG (glass formed of two surfaces having s28 and s29), the twelfth lens element L12 having the following property:

The twelfth lens element L12: a positive meniscus lens element convex on the object side (s26 and s27 are aspherical).

[Construction Data of Variable Magnification Optical System (Example 7)]

Construction data of the variable magnification optical system 11 of Example 7 will be described with reference to Tables. 13 and 14. These Tables. 13 and 14 are expressed in the same manner as Tables. 1 and 2.

[Movement of Each Lens Unit in the Optical Unit]

[Zooming]

Figure 27:
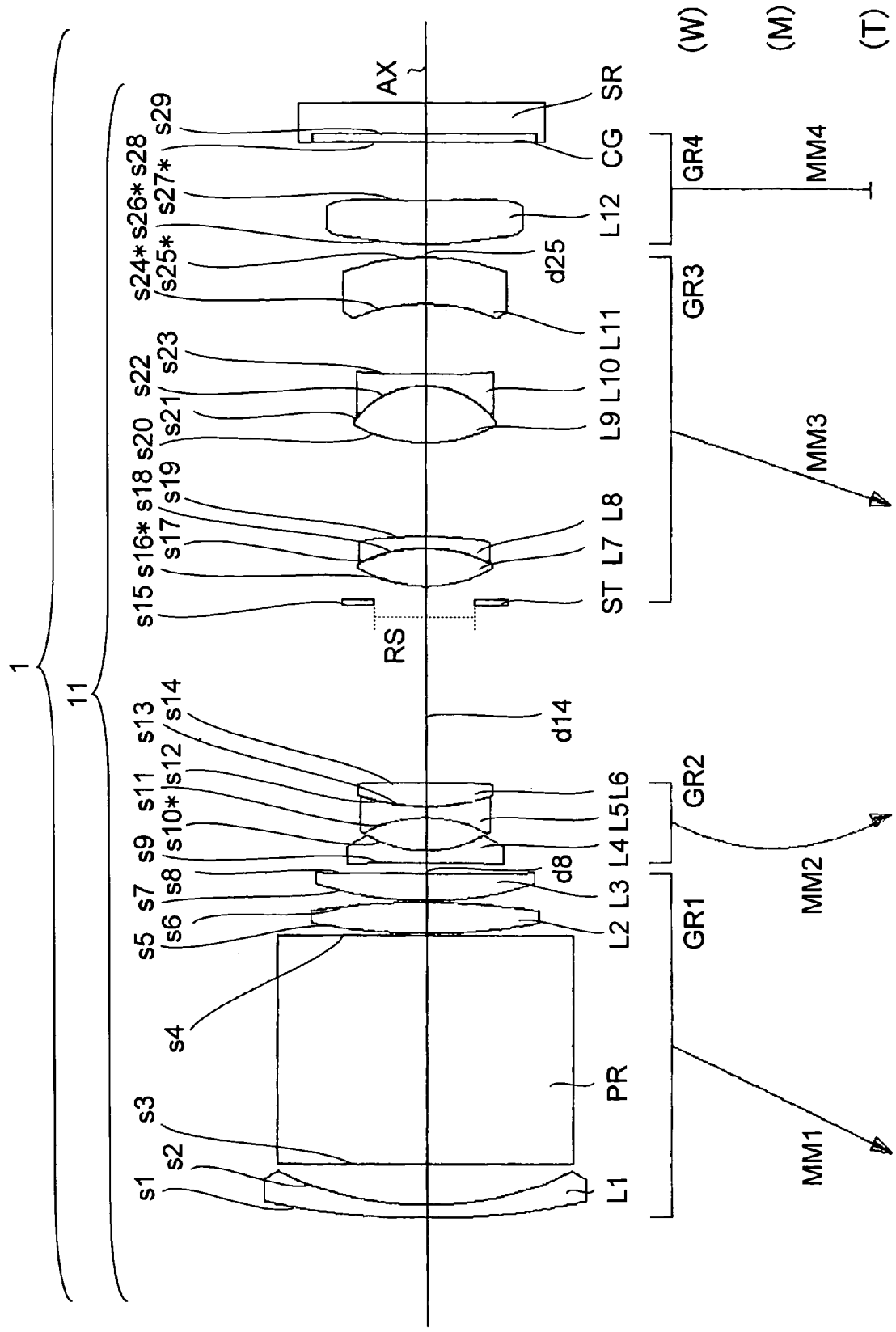
FIG. 27 is a lens construction diagram of an optical unit including a variable magnification optical system of Example 7.

The variable magnification optical system 11 of Example 7 moves toward the object side at least part of the lens units during zooming as shown in FIG. 27. More specifically, the first lens unit GR1 to the third lens unit GR3 move toward the object side (note that the second lens unit GR2 moves backward toward the image side after traveling toward the object side). Thus, in FIG. 27, only an axial space distance (di) that fluctuates following the zooming is numbered. More specifically, d8, d14, and d25 are shown in the figure.

FIGS. 28A to 28C through FIGS. 30A to 30C show aberration occurring in the variable magnification optical system 11 of Example 7 during zooming. These FIGS. 28A to 28C through FIGS. 30A to 30C are expressed in the same manner as FIGS. 2A to 2C through FIGS. 4A to 4C.

[2. One Example of Various Characteristics]

The optical units 1 including the variable magnification optical systems 11 of Examples 3 to 7 are similar to the first embodiment in that the most image side lens element (Li) in the third lens unit GR3 is aspherical. Therefore, it is needless to say that such an optical unit 1 exerts the effect described in the first embodiment.

Moreover, in the optical unit 1 in this second embodiment, at least one of surfaces (s24, s25) of the lens element (eleventh lens element 11) included in the third lens unit GR3 and located at the most image side is aspherical.

For example, astigmatism, distortion, and the like (off-axis aberration) tend to occur based on a ray outside the optical axis AX (off-axis ray). Then, it is said that it is effective to use a lens surface located close to the image side to correct such aberration. Thus, the optical unit 1 forms into an aspherical shape at least one lens surface of the lens element located at the most image side lens in the third lens unit to thereby achieve correction of off-axis aberration by Embodiment 3

The third embodiment will be described. Members having the same function as those used in the first and second embodiments are provided with the same numerals and thus omitted from the description.

The first and second embodiments have been described, referring to, as an example, the optical unit 1 that performs zooming while the fourth lens unit GR4 is immobilized, although the optical unit 1 is not limited thereto.

[1. Optical Units Including Various Variable Magnification Optical Systems]

For example, the optical unit 1 may be the one that performs zooming while the fourth lens unit GR4 is movable. Thus, the optical units 1 including such a variable magnification optical system 11 (Examples 8 to 10) will be described.

As is the case with Examples 1 and 2, the variable magnification optical systems 11 of Examples 8 to 10 described below also include: in order from a photographing subject, a first lens unit GR1, a second lens unit GR2, a third lens unit GR3, and a fourth lens unit GR4, having optical power arrangement of positive, negative, positive, and positive. Further, on the image side of the fourth lens unit GR4, an image sensor unit SU including a cover glass CG and an immobile image sensor SR is arranged. This image sensor unit SU is located at the fifth position counted from the object side, and thus may hereinafter be expressed as SU5.

[Variable Magnification Optical System of Example 8 (see FIG. 31)]

[First Lens Unit GR1]

The first lens unit GR1 includes: in order from the object side, a first lens element L1, an optical prism PR, a second lens element L2, and a third lens element L3, respectively having the following properties:
- The first lens element L1: a negative meniscus lens element convex on the object side;
- The second lens element L2: a positive lens element convex on both sides; and
- The third lens element L3: a positive lens element convex on both sides.

[Second Lens Unit]

The second lens unit GR2 includes: in order from the object side, a fourth lens element L4, a fifth lens element L5, and a sixth lens element L6, respectively having the following properties:
- The fourth lens element L4: a negative lens element concave on both sides (s9 is aspherical);
- The fifth lens element L5: a negative lens element concave on both sides; and
- The sixth lens element L6: a positive lens element convex on both sides.

The fifth lens element L5 and the sixth lens element L6 compose a cemented lens element formed by cementing s12 and s13 together.

[Third Lens Unit]

The third lens unit GR3 includes: in order from the object side, an optical aperture stop (also indicated as s15, integrated with the third lens unit GR3), a seventh lens element (the most object side lens element) L7, an eighth lens element L8, a ninth lens element L9, and a tenth lens element L10, respectively having the following properties:
- The seventh lens element L7: a positive lens element convex on both sides [s16 (the object side surface) is aspherical];
- The eighth lens element L8: a negative meniscus lens element concave on the object side
- The ninth lens element L9: a positive lens element convex on both sides (s20 is aspherical); and
- The tenth lens element L10: a negative meniscus lens element concave on the object side.

The seventh lens element L7 and the eighth lens element L8 compose a cemented lens element formed by cementing s17 and s18 together. The ninth lens element L9 and the tenth lens element L10 compose a cemented lens element formed by cementing s21 and s22 together.

[Fourth Lens Unit]

The fourth lens unit GR4 includes: in order from the object side, an eleventh lens element L11 and a twelfth lens element L12, respectively having the following properties:
- The eleventh lens element L11: a negative meniscus lens element concave on the object side; and
- The twelfth lens element L12: a positive lens element convex on both sides (s26 and s27 are aspherical).

[Image Sensor Unit]

The cover glass CG of the image sensor unit SU5 is a glass formed of two surfaces (s28, s29) for protecting the light-receiving surface of the image sensor SR.

[Construction Data of Variable Magnification Optical System (Example 8)]

Construction data of the variable magnification optical system 11 of Example 8 will be described with reference to Tables. 15 and 16. These Tables. 15 and 16 are expressed in the same manner as Tables. 1 and 2.

[Movement of Each Lens Unit in the Optical Unit]

[Zooming]

The variable magnification optical system 11 of Example 8 moves toward the object side at least part of the lens units (the first lens unit GR1 to the third lens unit GR3) while moving the remaining lens unit (the fourth lens unit) toward the image side during zooming as shown in FIG. 31. Thus, in FIG. 31, only an axial space distance (di) that fluctuates following the zooming is numbered. More specifically, d8, d14, d23, and d27 are shown in the figure.

FIGS. 32A to 32C through FIGS. 34A to 34C show aberration occurring in the variable magnification optical system 11 of Example 8 during zooming. These FIGS. 32A to 32C through FIGS. 34A to 34C are expressed in the same manner as FIGS. 2A to 2C through FIGS. 4A to 4C.

[Variable Magnification Optical System of Example 9 (see FIG. 35)]

[First Lens Unit GR1]

The first lens unit GR1 includes: in order from the object side, a first lens element L1, an optical prism PR, a second lens element L2, and a third lens element L3, respectively having the following properties:
- The first lens element L1: a negative meniscus lens element convex on the object side;
- The second lens element L2: a positive lens element convex on both sides; and
- The third lens element L3: a positive lens element convex on both sides.

[Second Lens Unit]

The second lens unit GR2 includes: in order from the object side, a fourth lens element L4, a fifth lens element L5, and a sixth lens element L6, respectively having the following properties:
- The fourth lens element L4: a negative lens element concave on both sides (s9 is aspherical);
- The fifth lens element L5: a negative lens element concave on both sides; and
- The sixth lens element L6: a positive lens element convex on both sides.

The fifth lens element L5 and the sixth lens element L6 compose a cemented lens element formed by cementing s12 and s13 together.

[Third Lens Unit]

The third lens unit GR3 includes: in order from the object side, an optical aperture stop (also indicated as s15, integrated with the third lens unit GR3), a seventh lens element (the most object side lens element) L7, an eighth lens element L8, a ninth lens element L9, and a tenth lens element L10, respectively having the following properties:

The seventh lens element L7: a positive lens element convex on both sides [s16 (the object side surface) is aspherical];

The eighth lens element L8: a negative meniscus lens element concave on the object side The ninth lens element L9: a positive lens element convex on both sides (s20 is aspherical); and The tenth lens element L10: a negative meniscus lens element concave on the object side.

The seventh lens element L7 and the eighth lens element L8 compose a cemented lens element formed by cementing s17 and s18 together. The ninth lens element L9 and the tenth lens element L10 compose a cemented lens element formed by cementing s21 and s22 together.

[Fourth Lens Unit]

The fourth lens unit GR4 includes only an eleventh lens element L11 having the following property:

The eleventh lens element L11: a positive lens element convex on both sides (s24 and s25 are aspherical).

[Image Sensor Unit]

The cover glass CG of the image sensor unit SU5 is a glass formed of two surfaces (s26, s27) for protecting the light-receiving surface of the image sensor SR.

[Construction Data of Variable Magnification Optical System (Example 9)]

Construction data of the variable magnification optical system 11 of Example 9 will be described with reference to Tables. 17 and 18. These Tables. 17 and 18 are expressed in the same manner as Tables. 1 and 2.

[Movement of Each Lens Unit in the Optical Unit]

[Zooming]

Figure 35:
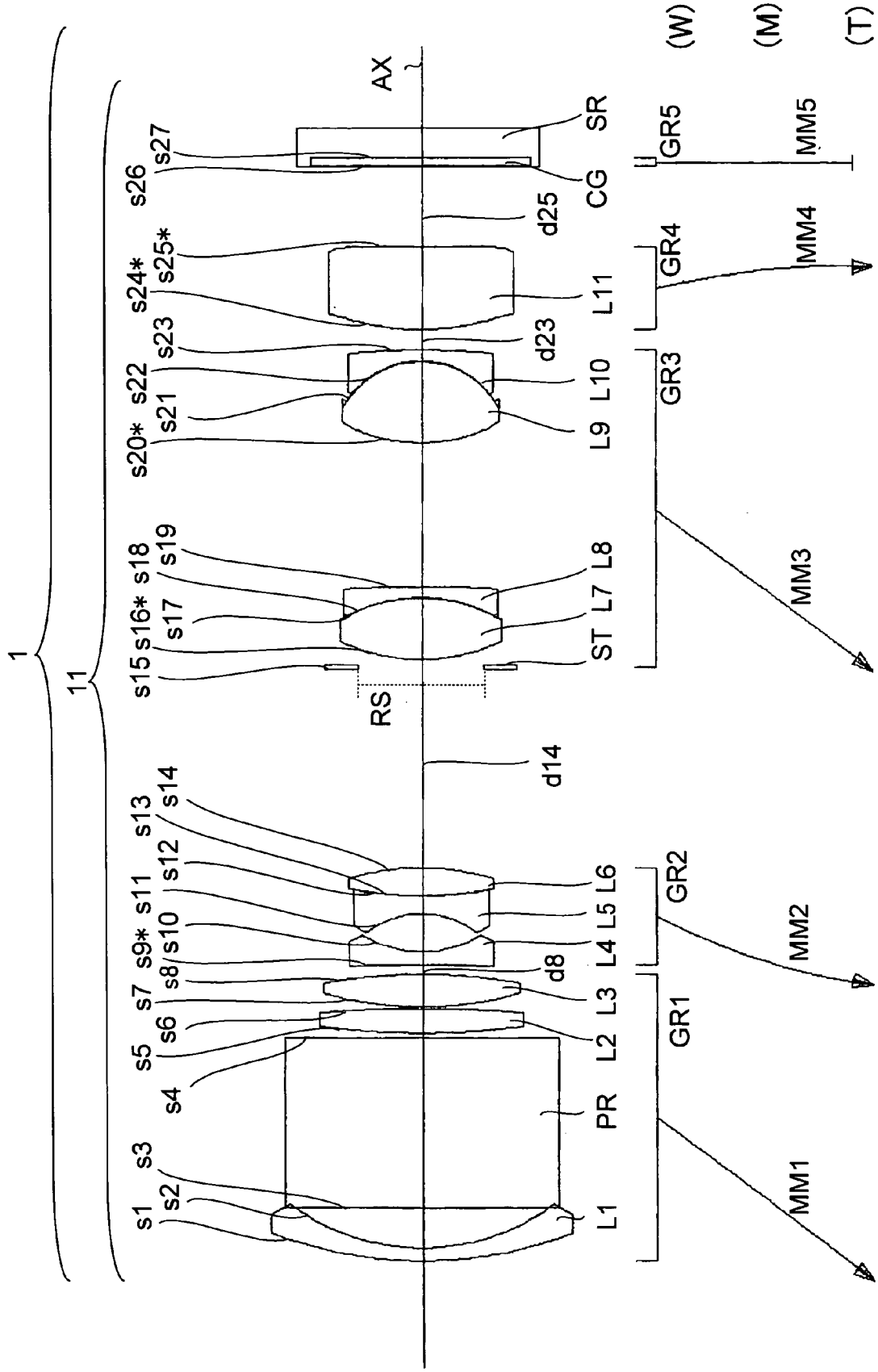
FIG. 35 is a lens construction diagram of an optical unit including a variable magnification optical system of Example 9.

The variable magnification optical system 11 of Example 9 moves toward the object side at least part of the lens units (the first lens unit GR1 to the third lens unit GR3) while moving the remaining lens unit (the fourth lens unit) toward the image side during zooming as shown in FIG. 35. Thus, in FIG. 35, only an axial space distance (di) that fluctuates following the zooming is numbered. More specifically, d8, d14, d23, and d25 are shown in the figure.

FIGS. 36A to 36C through FIGS. 38A to 38C show aberration occurring in the variable magnification optical system 11 of Example 9 during zooming. These FIGS. 36A to 36C through FIGS. 38A to 38C are expressed in the same manner as FIGS. 2A to 2C through FIGS. 4A to 4C.

[Variable Magnification Optical System of Example 10 (see FIG. 39)]

[First Lens Unit GR1]

The first lens unit GR1 includes: in order from the object side, a first lens element L1, an optical prism PR, a second lens element L2, and a third lens element L3, respectively having the following properties:

The first lens element L1: a negative meniscus lens element convex on the object side;

The second lens element L2: a positive lens element convex on both sides; and

The third lens element L3: a positive lens element convex on both sides.

[Second Lens Unit]

The second lens unit GR2 includes: in order from the object side, a fourth lens element L4, a fifth lens element L5, and a sixth lens element L6, respectively having the following properties:

The fourth lens element L4: a negative lens element concave on both sides (s9 is aspherical);

The fifth lens element L5: a negative lens element concave on both sides; and

The sixth lens element L6: a positive lens element convex on both sides.

The fifth lens element L5 and the sixth lens element L6 compose a cemented lens element formed by cementing s12 and s13 together.

[Third Lens Unit]

The third lens unit GR3 includes: in order from the object side, an optical aperture stop (also indicated as s15, integrated with the third lens unit GR3), a seventh lens element (the most object side lens element) L7, an eighth lens element L8, a ninth lens element L9, a tenth lens element L10, and an eleventh lens element L11, respectively having the following properties:

The seventh lens element L7: a positive lens element convex on both sides [s16 (the object side surface) is aspherical];

The eighth lens element L8: a negative meniscus lens element concave on the object side The ninth lens element L9: a positive lens element convex on both sides (s20 is aspherical);

The tenth lens element L10: a positive lens element convex on both sides; and

The eleventh lens element L11: a negative meniscus lens element concave on the object side.

The seventh lens element L7 and the eighth lens element L8 compose a cemented lens element formed by cementing s17 and s18 together. The tenth lens element L10 and the eleventh lens element L11 compose a cemented lens element formed by cementing s23 and s24 together.

[Fourth Lens Unit]

The fourth lens unit GR4 includes only a twelfth lens element L12 having the following a property:

The twelfth lens element L12: a positive meniscus lens element convex on the object side (s26 is aspherical).

[Image Sensor Unit]

The cover glass CG of the image sensor unit SU5 is a glass formed of two surfaces (s28, s29) for protecting the light-receiving surface of the image sensor SR.

[Construction Data of Variable Magnification Optical System (Example 10)]

Construction data of the variable magnification optical system 11 of Example 10 will be described with reference to Tables. 19 and 20. These Tables. 19 and 20 are expressed in the same manner as Tables. 1 and 2.

[Movement of Each Lens Unit in the Optical Unit]

[Zooming]

Figure 39:
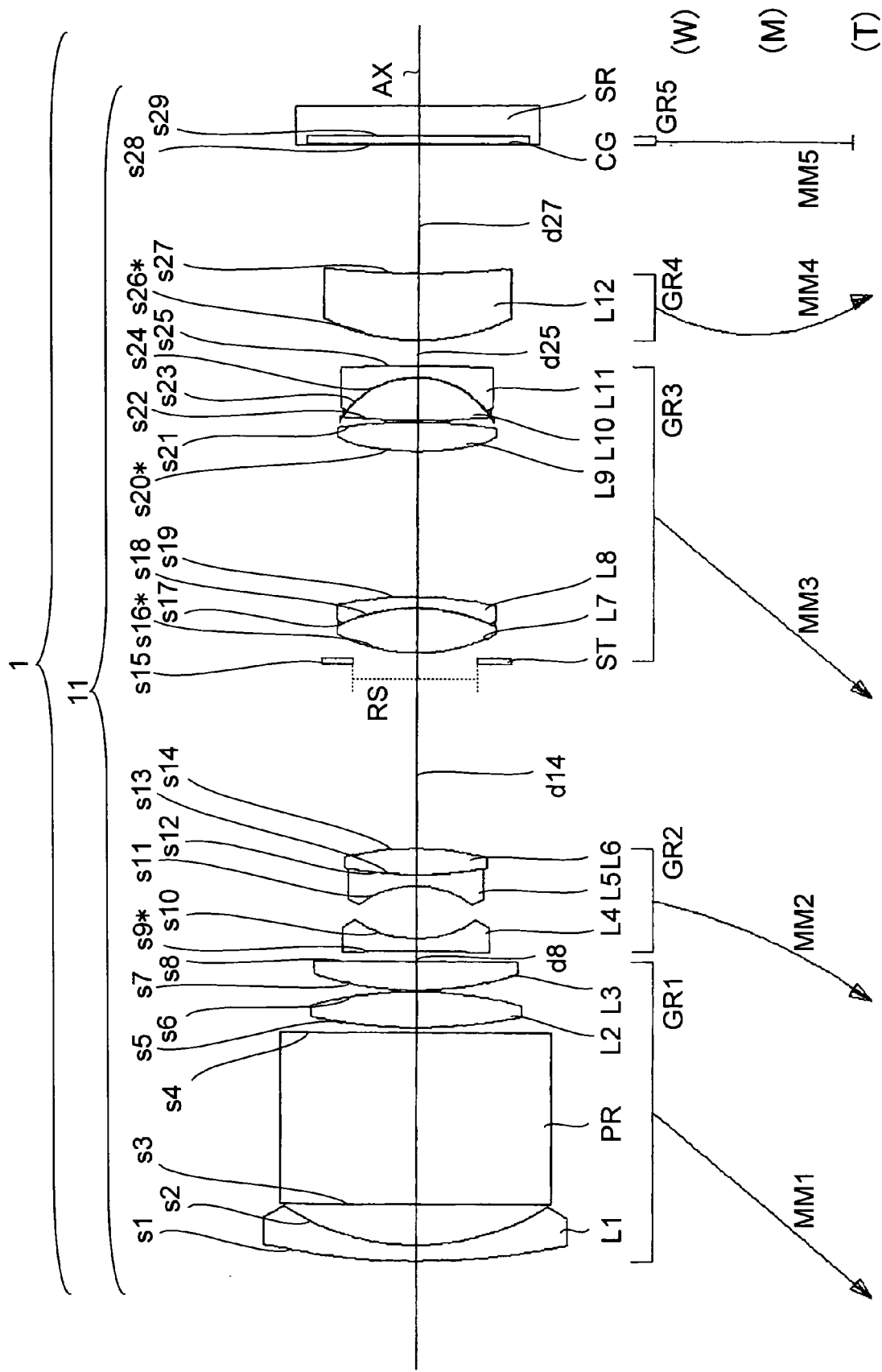
FIG. 39 is a lens construction diagram of an optical unit including a variable magnification optical system of Example 10.

The variable magnification optical system 11 of Example 10 moves toward the object side all lens units (the first lens unit GR1 to the fourth lens unit GR4) (note that the fourth lens unit GR4 moves backward toward the image side after traveling toward the object side) during zooming as shown in FIG. 39. Thus, in FIG. 39, only an axial space distance (di) that fluctuates following the zooming is numbered. More specifically, d8, d14, d25, and d27 are shown in the figure.

FIGS. 40A to 40C through FIGS. 42A to 42C show aberration occurring in the variable magnification optical system 11 of Example 10 during zooming. These FIGS. 40A to 40C through FIGS. 42A to 42C are expressed in the same manner as FIGS. 2A to 2C through FIGS. 4A to 4C.

[2. One Example of Various Characteristics]

The optical units 1 including the variable magnification optical systems 11 of Examples 8 to 10 differ from the optical unit 1 of the first and second embodiments in that it performs zooming while the fourth lens unit GR4 is movable. However, others are similar to that of the first embodiment. Therefore, it is needless to say that such an optical unit 1 exerts the effect corresponding to the characteristics of the embodiments described above.

Embodiment 4

The fourth embodiment will be described. Members having the same function as those used in the first embodiment are provided with the same numerals and thus omitted from the description.

[1. Optical Units Including Various Variable Magnification Optical Systems]

The optical unit 1 may include a variable magnification optical system that can bend the optical axis AX (that is, may be a bending optical system; see FIGS. 5 and 6), or may include a straight-type variable magnification optical system 11 whose components are arranged in row. However, a member for bending the optical axis AX is not limited to a reflective mirror MR.

For example, an optical prism PR' (second optical prism 2) may be provided. Thus, a variable magnification optical system 11 (Example 11) having the optical prism PR' will be described below. In Example 11 described below, as is the case with Examples 8 to 10, lens unit (GR1 to GR4) and an image sensor unit SU5 are disposed. The lens units (GR1 to GR4) also have optical power arrangement of positive, negative, positive, and positive.

[Variable Magnification Optical System of Example 11 (see FIG. 43)]

[First Lens Unit GR1]

The first lens unit GR1 includes: in order from the object side, a first lens element L1, an optical prism PR (first optical prism), a second lens element L2, and a third lens element L3, respectively having the following properties:

The first lens element L1: a negative meniscus lens element convex on the object side;
The second lens element L2: a positive lens element convex on both sides; and
The third lens element L3: a positive meniscus lens element convex on the object side.

[Second Lens Unit]

The second lens unit GR2 includes: in order from the object side, a fourth lens element L4, a fifth lens element L5, and a sixth lens element L6, respectively having the following properties:

The fourth lens element L4: a negative meniscus lens element convex on the object side (s10 is aspherical);
The fifth lens element L5: a negative lens element concave on both sides; and
The sixth lens element L6: a positive lens element convex on both sides.

The fifth lens element L5 and the sixth lens element L6 compose a cemented lens element formed by cementing s12 and s13 together.

[Third Lens Unit]

The third lens unit GR3 includes: in order from the object side, an optical aperture stop (also indicated as s15, integrated with the third lens unit GR3), a seventh lens element (the most object side lens element) L7, an optical prism (second optical prism) PR', an eighth lens element L8, a ninth lens element L9, a tenth lens element L10, and an eleventh lens element (the most image side lens element) L11, respectively having the following properties:

The seventh lens element L7: a plane convex lens element convex on the object side [s16 (the object side surface) is aspherical];
The optical prism PR': an optical prism similar to the first optical prism PR;
The eighth lens element L8: a positive lens element convex on both sides;
The ninth lens element L9: a negative lens element concave on both sides;
The tenth lens element L10: a negative lens element concave on both sides; and
The eleventh lens element L11: a positive meniscus lens element convex on the object side (s26 and s27 are aspherical).

The seventh lens element L7 and the optical prism PR' are cemented together via s17 and s18. The eighth lens element L8 and the ninth lens element L9 compose a cemented lens element formed by cementing s21 and s22 together.

[Fourth Lens Unit]

The fourth lens unit GR4 includes a twelfth lens element L12 and a thirteenth lens element L13, respectively having the following properties:

The twelfth lens element L12: a positive lens element convex on both sides (s28 and s29 are aspherical); and
The thirteenth lens element L13: a negative meniscus lens element concave on the object side.

[Image Sensor Unit]

The cover glass CG of the image sensor unit SU5 is a glass formed of two surfaces (s32, s33) for protecting the light-receiving surface of the image sensor SR.

[Construction Data of Variable Magnification Optical System (Example 11)]

Construction data of the variable magnification optical system 11 of Example 11 will be described with reference to Tables. 21 and 22. These Tables. 21 and 22 are expressed in the same manner as Tables. 1 and 2.

[Movement of Each Lens Unit in the Optical Unit]

[Zooming]

The variable magnification optical system 11 of Example 11 moves at least part of the lens units during zooming as shown in FIG. 43. Thus, the first lens unit GR1 to the fourth lens unit GR4 (that is, all the lens units) move toward the object side (note that the second lens unit GR2 moves backward toward the image side after traveling toward the object side). Thus, in FIG. 43, only an axial space distance (di) that fluctuates following the zooming is numbered. More specifically, d8, d14, d27, and d31 are shown in the figure.

FIGS. 44A to 44C through FIGS. 46A to 46C show aberration occurring in the variable magnification optical system 11 of Example 11 during zooming. These FIGS. 44A to 44C through FIGS. 46A to 46C are expressed in the same manner as FIGS. 2A to 2C through FIGS. 4A to 4C.

[2. One Example of Various Characteristics]

The optical unit 1 including the variable magnification optical system 11 of Example 11 differs from other embodiments in that it includes the optical prism PR' in the third lens unit GR3. However, the variable magnification optical system 11 (and thus the optical unit 1) of this embodiment includes the characteristics of the first embodiment (although the third lens unit GR3 does not include a plurality of lens elements cemented together) and also the characteristics of the second embodiment (for example, the most image side lens element of the third lens unit GR3 has an aspherical surface). Therefore, the optical unit 1 of this embodiment exerts the effect corresponding to the characteristics of the embodiments described above.

Other Embodiments

The present invention is not limited to the embodiments described above, and thus various modifications can be made without departing from the sprit of the invention. For example, the zooming ratio (magnification variation ratio) in the optical unit 1 is not specifically limited, but it is preferable that conditional formula (E) [conditional formula (4)] below be satisfied.

The conditional formula (E) is as follows:

$$4.7 < ft/fw,$$

where
ft represents the focal length of the entire variable magnification optical system at the telephoto end position (T); and
fw represents the focal length of the entire variable magnification optical system at the wide-angle end position (W).

The conditional formula (E) represents the zooming ratio of the variable magnification optical system 11 (and thus the optical unit 1). Accordingly, satisfying this conditional formula (E) results in a much higher zooming ratio than the zooming ratio (for example, approximately 3×) of a conventional digital camera 29. That is, the optical unit 1 can be achieved which exerts the effect described above while having a high zooming ratio. As a result, the significance of the zooming performance (magnification variation performance) in the variable magnification optical system 11 becomes larger, thus providing user benefits.

In the description above, the conditional formula (A) to the conditional formula (E) have been described. Thus, values of the conditional formula (A) to the conditional formula (E) are shown in correspondence with Examples 1 to 11 in Table. 23. Table. 24 shows values of TL3, Y', TL3$_M$, RS, β3t, β3w, ft, and fw required for obtaining the values of the conditional formula (A), (C), (D), or (E), while Table. 25 shows values of X, Xo, Co, N, N', and f3 required for obtaining the value of the conditional formula (B). As shown in this Table. 23, the variable magnification optical systems 11 (optical unit 1) of Examples 1 to 11 are configured to satisfy all the conditional formula (A) to the conditional formula (E).

A compact optical unit 1 is used for various image taking apparatuses (silver halide photographic cameras, digital still cameras, and the like) and digital input appliances (for example, digital appliances including an image taking apparatus). Therefore, an image taking apparatus or the like using the optical unit 1 becomes compact. In addition, the portion of the optical unit 1 occupying the limited capacity inside the housing of an image taking and the like becomes relatively small. Thus, various components (electronic components and the like) can be arranged in the housing of the image taking apparatus or the like with sufficient space (permitting effective use of the capacity of the housing). Therefore, an image taking apparatus can be achieved which includes various components and which exhibits high performance.

The image taking apparatus 29 as shown in FIGS. 5 and 6 may perform zooming and the like by fixing the image sensor SR while moving the first lens unit GR1 and the third lens unit GR3 including the optical axis changing element (the optical prism PR or the reflective mirror MR). Moreover, the image taking apparatus 29 may perform zooming and the like by fixing the first lens unit GR1 and the third lens unit GR3 including the optical axis changing element while moving the image sensor SR.

[Review]

As described above, it is preferable that various characteristics be provided to achieve a compact optical unit with high performance.

For example, in the optical unit, the object side lens surface of the most object side lens element included in the third lens unit and located at the most object side may be aspherical. In this case, the lens surface which light traveling via the second lens unit first reaches is aspherical. Therefore, such an optical unit can effectively correct spherical aberration or the like by use of this aspherical shape.

The most object side lens element in the third lens unit may form a cemented lens element by being cemented with a different lens element adjacent thereto on the image side. In this case, chromatic aberration can be effectively corrected. To further achieve correction of chromatic aberration, in third lens unit, a different cemented lens element may be located closer to the image side than the aforementioned cemented lens element.

In the optical unit, at least one of lens surfaces of the most image side lens elements included in third lens unit and located at the most image side may be aspherical, because, for example, with a lens surface (aspherical lens surface) relatively separated from the position of the optical aperture stop, astigmatism, distortion, or the like (off-axis aberration) can be effectively corrected.

To further downsize the optical unit, an optical axis changing element (first optical axis changing element) may be included in the third lens unit. Further, to appropriately arrange this optical axis changing element, it is preferable that conditional formula (2) below be satisfied.

$1 < TL3_M/RS < 2$   Conditional formula (2), where
$TL3_M$ represents the maximum air spacing between the lens elements included in the third lens unit, and
RS represents the maximum aperture stop diameter of the optical aperture stop.

This conditional formula (2) defines the maximum space (air-spacing on the optical axis) in the third lens unit ($TL3_M$) by the maximum aperture stop diameter of the optical aperture stop (RS). This conditional formula (2) defines, based on the maximum space in third lens unit, the range for achieving favorable balance between downsizing of the optical unit and ensuring of appropriate space for the arrangement of the optical axis changing element (for example, such arrangement of the optical axis changing element that does not cause interference with the optical path).

More specifically, when the ratio of the air-spacing $TL3_M$ with respect to the maximum aperture stop diameter RS is not larger than the upper limit value of the conditional formula (2), excessive upsizing of the optical unit is suppressed. On the other hand, when the ratio of the air-spacing $TL3_M$ with respect to the maximum aperture stop diameter RS is not smaller than the lower limit value of the conditional formula (2), the optical axis changing element can be favorably disposed (in a manner such that, for example, interference with the optical path does not occur).

It is preferable that the optical unit satisfy conditional formula (3) below:

$1.5 < (\beta 3t/\beta 3w) < 3.5$   Conditional formula (3), where
$\beta 3t$ represents the lateral magnification of the third lens unit at the telephoto end position; and
$\beta 3w$ represents the lateral magnification of the third lens unit at the wide-angle end.

This conditional formula (3) defines an appropriate range of the magnification variation ratio of the third lens unit.

Excessive load of magnification variation imposed on either of the second lens unit and the third lens unit is likely to result in an excessively large change in space in front of and behind one of the lens units. However, if it is within the range of the conditional formula (3), the load of magnification variation can be appropriately allocated, thus permitting the moving distance of the lens units at the time of magnification variation to be set at their respective appropriate ranges. Accordingly, due to an excessively large moving distance of the lens unit, conditions such as where the optical unit is upsized can be suppressed.

In the optical unit, to perform magnification variation, the interlens distance between the first lens unit and the third lens unit may be invariable when the first lens unit and the third lens unit move. For example, the first lens unit and the third lens unit may be coupled together so as to move simultaneously at the time of magnification variation. In this case, both of these lens units can be stored, for example, in the same lens barrel in the optical unit, thus permitting the lens barrel to be relatively downsized.

Moreover, in the optical unit, the fourth lens unit may be immobilized during magnification variation, because, in this case, the fourth lens unit can be fixed, thereby simplifying the configuration of the lens barrel.

Moreover, in the optical unit, an optical axis changing element (second optical axis changing element) may also be included in, other than the third lens unit, the first lens unit GR1, in which case the optical axis is bent, thereby leading to further downsizing.

It is preferable to provide an optical unit which satisfies conditional formula (4) below and which has a high magnification variation ratio.

$4.7 < ft/fw$   Conditional formula (4), where
ft represents the focal length of the entire variable magnification optical system at the telephoto end position; and
fw represents the focal length of the entire variable magnification optical system at the wide-angle end.

The detailed embodiments, examples, and the like described above clarify contents of art provided by the present invention. Therefore, it should be noted that the present invention is not narrowly interpreted by being only limited to the detailed examples and thus various modifications can be made within the scope of the appended claims.

TABLE 1

| Example 1 | | Focal Length Position F[mm] FNO | | | (W)~(M)~(T) 7.98~17.55~37.74 3.31~4.13~5.20 | | |
|---|---|---|---|---|---|---|---|
| i | ri[mm] | i | di[mm] | i | Ni | vi | Element |
| 1 | 43.419 | 1 | 0.800 | 1 | 1.92286 | 20.88 | L1   GR1 |
| 2 | 19.667 | 2 | 2.150 | | | | |
| 3 | ∞ | 3 | 12.349 | 2 | 1.88300 | 40.79 | PR |
| 4 | ∞ | 4 | 0.100 | | | | |
| 5 | 30.532 | 5 | 2.016 | 3 | 1.58913 | 61.25 | L2 |
| 6 | −40.926 | 6 | 0.100 | | | | |
| 7 | 16.808 | 7 | 1.757 | 4 | 1.49700 | 81.61 | L3 |

TABLE 1-continued

| | | | | | | | | |
|---|---|---|---|---|---|---|---|---|
| 8 | 99.776 | | 8 | 0.745~5.910~9.810 | | | | |
| 9 | −124.542 | | 9 | 0.800 | 5 | 1.77250 | 49.77 | L4 GR2 |
| 10 | 7.058 | * | 10 | 2.378 | | | | |
| 11 | −9.524 | | 11 | 1.038 | 6 | 1.72916 | 54.67 | L5 |
| 12 | 12.650 | | 12 | 0.010 | 7 | 1.51400 | 42.83 | |
| 13 | 12.650 | | 13 | 1.476 | 8 | 1.92286 | 20.88 | L6 |
| 14 | −48.404 | | 14 | 10.048~4.883~0.984 | | | | |
| 15 | ∞ | | 15 | 0.500 | | | | ST GR3 |
| 16 | 11.975 | * | 16 | 4.379 | 9 | 1.69350 | 53.39 | L7 |
| 17 | −10.341 | | 17 | 0.010 | 10 | 1.51400 | 42.83 | |
| 18 | −10.341 | | 18 | 0.700 | 11 | 1.80518 | 25.46 | L8 |
| 19 | −43.772 | | 19 | 9.841 | | | | |
| 20 | 18.390 | | 20 | 0.700 | 12 | 1.88300 | 40.79 | L9 |
| 21 | 10.262 | | 21 | 0.010 | 13 | 1.51400 | 42.83 | |
| 22 | 10.262 | | 22 | 2.935 | 14 | 1.58144 | 40.89 | L10 |
| 23 | −23.748 | | 23 | 0.903 | | | | |
| 24 | −9.495 | | 24 | 1.271 | 15 | 1.80610 | 33.27 | L11 |
| 25 | −55.610 | | 25 | 0.432 | | | | |
| 26 | 26.936 | | 26 | 2.227 | 16 | 1.49700 | 81.61 | L12 |
| 27 | −19.736 | | 27 | 3.413~14.807~29.913 | | | | |
| 28 | 19.346 | * | 28 | 4.000 | 17 | 1.53048 | 55.72 | L13 GR4 |
| 29 | −16.159 | * | 29 | 0.270 | | | | |
| 30 | −200.000 | | 30 | 0.893 | 18 | 1.84666 | 23.78 | L14 |
| 31 | 18.290 | | 31 | 6.000 | | | | |
| 32 | ∞ | | 32 | 0.500 | 19 | 1.51680 | 64.20 | CG |
| 33 | ∞ | | | | | | | |

TABLE 2

Example 1

Aspherical Surface Data of Surface 10(i = 10)

| | |
|---|---|
| ϵ | 1.0000 |
| A4 | −0.10197203E−03 |
| A6 | −0.59864948E−05 |
| A8 | 0.63239314E−06 |
| A10 | −0.22955553E−07 |

Aspherical Surface Data of Surface 16(i = 16)

| | |
|---|---|
| ϵ | 1.0000 |
| A4 | −0.90047005E−04 |
| A6 | 0.10298751E−05 |
| A8 | −0.67772055E−07 |
| A10 | 0.20176346E−08 |

TABLE 2-continued

Example 1

Aspherical Surface Data of Surface 28(i = 28)

| | |
|---|---|
| ϵ | 1.0000 |
| A4 | −0.15307901E−04 |
| A6 | −0.16093656E−04 |
| A8 | 0.50352433E−06 |
| A10 | −0.11138404E−07 |

Aspherical Surface Data of Surface 29(i = 29)

| | |
|---|---|
| ϵ | 1.0000 |
| A4 | 0.19494141E−03 |
| A6 | −0.12810081E−04 |
| A8 | 0.18629352E−06 |
| A10 | −0.38610777E−08 |

TABLE 3

| Example 2 | | Focal Length Position F[mm] FNO | | | (W)~(M)~(T) 7.83~24.24~44.26 3.32~4.59~5.50 | | |
|---|---|---|---|---|---|---|---|
| i | ri[mm] | i | di[mm] | i | Ni | vi | Element |
| 1 | 41.341 | 1 | 0.800 | 1 | 1.92286 | 20.88 | L1 GR1 |
| 2 | 20.309 | 2 | 2.150 | | | | |
| 3 | ∞ | 3 | 12.000 | 2 | 1.88300 | 40.79 | PR |
| 4 | ∞ | 4 | 0.100 | | | | |
| 5 | 32.423 | 5 | 1.862 | 3 | 1.58913 | 61.25 | L2 |
| 6 | −57.490 | 6 | 0.100 | | | | |
| 7 | 15.686 | 7 | 1.857 | 4 | 1.49700 | 81.61 | L3 |
| 8 | 122.827 | 8 | 0.608~7.691~10.573 | | | | |

TABLE 3-continued

| | | | | | | | | |
|---|---|---|---|---|---|---|---|---|
| 9 | 105.786 | | 9 | 0.800 | 5 | 1.77250 | 49.77 | L4 | GR2 |
| 10 | 6.480 | * | 10 | 2.162 | | | | |
| 11 | −8.696 | | 11 | 0.700 | 6 | 1.72916 | 54.67 | L5 |
| 12 | 12.191 | | 12 | 0.010 | 7 | 1.51400 | 42.83 | |
| 13 | 12.191 | | 13 | 1.481 | 8 | 1.92286 | 20.88 | L6 |
| 14 | −46.939 | | 14 | 10.872~3.789~0.907 | | | | |
| 15 | ∞ | | 15 | 0.500 | | | ST | GR3 |
| 16 | 11.433 | * | 16 | 3.481 | 9 | 1.69350 | 53.39 | L7 |
| 17 | −10.070 | | 17 | 0.010 | 10 | 1.51400 | 42.83 | |
| 18 | −10.070 | | 18 | 0.700 | 11 | 1.80518 | 25.46 | L8 |
| 19 | −42.498 | | 19 | 9.840 | | | | |
| 20 | 15.469 | | 20 | 0.700 | 12 | 1.88300 | 40.79 | L9 |
| 21 | 8.807 | | 21 | 0.010 | 13 | 1.51400 | 42.83 | |
| 22 | 8.807 | | 22 | 2.839 | 14 | 1.58144 | 40.89 | L10 |
| 23 | −28.176 | | 23 | 0.828 | | | | |
| 24 | −9.309 | | 24 | 0.700 | 15 | 1.80610 | 33.27 | L11 |
| 25 | −45.550 | | 25 | 0.486 | | | | |
| 26 | 20.950 | | 26 | 2.449 | 16 | 1.49700 | 81.61 | L12 |
| 27 | −25.746 | | 27 | 1.839~17.111~28.339 | | | | |
| 28 | 47.082 | * | 28 | 4.000 | 17 | 1.53048 | 55.72 | L13 | GR4 |
| 29 | −13.563 | * | 29 | 0.122 | | | | |
| 30 | −200.000 | | 30 | 1.000 | 18 | 1.84666 | 23.78 | L14 |
| 31 | 22.980 | | 31 | 6.000 | | | | |
| 32 | ∞ | | 32 | 0.500 | 19 | 1.51680 | 64.20 | CG |
| 33 | ∞ | | | | | | | |

TABLE 4

Example 2

Aspherical Surface Data of Surface 10(i = 10)

| | |
|---|---|
| ϵ | 1.0000 |
| A4 | −0.99302225E−04 |
| A6 | −0.70030523E−05 |
| A8 | 0.67791112E−06 |
| A10 | −0.22461986E−07 |

Aspherical Surface Data of Surface 16(i = 16)

| | |
|---|---|
| ϵ | 1.0000 |
| A4 | −0.94093498E−04 |
| A6 | 0.90824359E−06 |
| A8 | −0.75884840E−07 |
| A10 | 0.25367720E−08 |

TABLE 4-continued

Example 2

Aspherical Surface Data of Surface 28(i = 28)

| | |
|---|---|
| ϵ | 1.0000 |
| A4 | −0.87972213E−04 |
| A6 | −0.18945029E−04 |
| A8 | 0.64601763E−06 |
| A10 | −0.15667561E−07 |

Aspherical Surface Data of Surface 29(i = 29)

| | |
|---|---|
| ϵ | 1.0000 |
| A4 | 0.21761696E−03 |
| A6 | −0.16245656E−04 |
| A8 | 0.30350491E−06 |
| A10 | −0.57410322E−08 |

TABLE 5

| Example 3 | | | Focal Length Position F[mm] FNO | | | (W)~(M)~(T) 7.99~19.17~45.16 3.35~4.42~5.93 | | |
|---|---|---|---|---|---|---|---|---|
| i | ri[mm] | i | di[mm] | i | Ni | vi | Element | |
| 1 | 44.704 | 1 | 0.800 | 1 | 1.92286 | 20.88 | L1 | GR1 |
| 2 | 21.386 | 2 | 2.450 | | | | | |
| 3 | ∞ | 3 | 11.400 | 2 | 1.88300 | 40.79 | PR | |
| 4 | ∞ | 4 | 0.195 | | | | | |
| 5 | 36.489 | 5 | 1.918 | 3 | 1.58913 | 61.25 | L2 | |
| 6 | −44.135 | 6 | 0.129 | | | | | |
| 7 | 18.219 | 7 | 1.757 | 4 | 1.49700 | 81.61 | L3 | |
| 8 | 214.691 | 8 | 0.801~6.709~11.275 | | | | | |
| 9 | −48.164 | 9 | 0.800 | 5 | 1.77250 | 49.77 | L4 | GR2 |

TABLE 5-continued

| i | ri[mm] |   | i | di[mm] | i | Ni | vi | Element |   |
|---|---|---|---|---|---|---|---|---|---|
| 10 | 7.688 | * | 10 | 3.181 |   |   |   |   |   |
| 11 | −10.526 |   | 11 | 0.700 | 6 | 1.72916 | 54.67 | L5 |   |
| 12 | 15.314 |   | 12 | 0.010 | 7 | 1.51400 | 42.83 |   |   |
| 13 | 15.314 |   | 13 | 1.471 | 8 | 1.92286 | 20.88 | L6 |   |
| 14 | −33.140 |   | 14 | 11.424~5.516~0.950 |   |   |   |   |   |
| 15 | ∞ |   | 15 | 1.000 |   |   |   | ST | GR3 |
| 16 | 14.709 | * | 16 | 3.157 | 9 | 1.69350 | 53.39 | L7 |   |
| 17 | −11.220 |   | 17 | 0.010 | 10 | 1.51400 | 42.83 |   |   |
| 18 | −11.220 |   | 18 | 2.948 | 11 | 1.80518 | 25.46 | L8 |   |
| 19 | −21.569 |   | 19 | 10.200 |   |   |   |   |   |
| 20 | 16.714 |   | 20 | 0.700 | 12 | 1.80518 | 25.46 | L9 |   |
| 21 | 5.882 |   | 21 | 0.010 | 13 | 1.51400 | 42.83 |   |   |
| 22 | 5.882 |   | 22 | 2.854 | 14 | 1.48749 | 70.44 | L10 |   |
| 23 | 36.212 |   | 23 | 3.282 |   |   |   |   |   |
| 24 | 20.118 | * | 24 | 2.054 | 15 | 1.60700 | 27.00 | L11 |   |
| 25 | 37.298 | * | 25 | 0.800~11.677~25.629 |   |   |   |   |   |
| 26 | 22.688 | * | 26 | 6.000 | 16 | 1.53048 | 55.72 | L12 | GR4 |
| 27 | ∞ | * | 27 | 3.797 |   |   |   |   |   |
| 28 | ∞ |   | 28 | 0.500 | 17 | 1.51680 | 64.20 | CG |   |
| 29 | ∞ |   |   |   |   |   |   |   |   |

TABLE 6

Example 3

Aspherical Surface Data of Surface 10(i = 10)

| ε | 1.0000 |
|---|---|
| A4 | −0.15663490E−03 |
| A6 | −0.17225086E−05 |
| A8 | 0.13760168E−07 |
| A10 | −0.19099660E−08 |

Aspherical Surface Data of Surface 16(i = 16)

| ε | 1.0000 |
|---|---|
| A4 | −0.10403172E−03 |
| A6 | 0.29726559E−06 |
| A8 | −0.15823879E−07 |
| A10 | 0.39989178E−09 |

Aspherical Surface Data of Surface 24(i = 24)

| ε | 1.0000 |
|---|---|
| A4 | −0.27390750E−03 |
| A6 | −0.15628240E−05 |
| A8 | 0.19691831E−06 |
| A10 | −0.74042374E−09 |

TABLE 6-continued

Example 3

Aspherical Surface Data of Surface 25(i = 25)

| ε | 1.0000 |
|---|---|
| A4 | −0.41777597E−03 |
| A6 | −0.19349262E−05 |
| A8 | 0.15808145E−06 |
| A10 | −0.91796432E−09 |

Aspherical Surface Data of Surface 26(i = 26)

| ε | 1.0000 |
|---|---|
| A4 | −0.85892111E−04 |
| A6 | 0.42881465E−05 |
| A8 | −0.38774715E−06 |
| A10 | 0.57234103E−08 |

Aspherical Surface Data of Surface 27(i = 27)

| ε | 1.0000 |
|---|---|
| A4 | 0.75585543E−04 |
| A6 | 0.13968653E−04 |
| A8 | −0.12010832E−05 |
| A10 | 0.19260161E−07 |

TABLE 7

| Example 4 | Focal Length Position F[mm] FNO |   | (W)~(M)~(T) 7.99~24.73~52.67 3.19~4.69~5.78 |   |   |   |
|---|---|---|---|---|---|---|
| i | ri[mm] | i | di[mm] | i | Ni vi | Element |
| 1 | 39.700 | 1 | 0.800 | 1 | 1.92286 20.88 | L1   GR1 |
| 2 | 20.903 | 2 | 2.150 |   |   |   |

TABLE 7-continued

| | | | | | | | |
|---|---|---|---|---|---|---|---|
| 3 | ∞ | 3 | 12.000 | 2 | 1.88300 | 40.79 | PR |
| 4 | ∞ | 4 | 0.149 | | | | |
| 5 | 44.432 | 5 | 1.768 | 3 | 1.58913 | 61.25 | L2 |
| 6 | −45.713 | 6 | 0.100 | | | | |
| 7 | 17.910 | 7 | 1.839 | 4 | 1.49700 | 81.61 | L3 |
| 8 | −2118.420 | 8 | 0.697~7.698~11.717 | | | | |
| 9 | −73.605 | 9 | 0.800 | 5 | 1.77250 | 49.77 | L4 GR2 |
| 10 | 7.922 * | 10 | 2.473 | | | | |
| 11 | −10.526 | 11 | 0.700 | 6 | 1.72916 | 54.67 | L5 |
| 12 | 13.422 | 12 | 0.010 | 7 | 1.51400 | 42.83 | |
| 13 | 13.422 | 13 | 1.496 | 8 | 1.92286 | 20.88 | L6 |
| 14 | −47.090 | 14 | 11.820~4.819~0.800 | | | | |
| 15 | ∞ | 15 | 0.500 | | | | ST GR3 |
| 16 | 13.501 * | 16 | 3.007 | 9 | 1.69350 | 53.39 | L7 |
| 17 | −11.543 | 17 | 0.010 | 10 | 1.51400 | 42.83 | |
| 18 | −11.543 | 18 | 1.205 | 11 | 1.80518 | 25.46 | L8 |
| 19 | −24.338 | 19 | 9.311 | | | | |
| 20 | 13.513 | 20 | 0.700 | 12 | 1.80518 | 25.46 | L9 |
| 21 | 6.079 | 21 | 0.010 | 13 | 1.51400 | 42.83 | |
| 22 | 6.079 | 22 | 2.618 | 14 | 1.48749 | 70.44 | L10 |
| 23 | 21.534 | 23 | 4.284 | | | | |
| 24 | 60.095 * | 24 | 3.000 | 15 | 1.60700 | 27.00 | L11 |
| 25 | −1816.893 * | 25 | 0.800~16.148~27.300 | | | | |
| 26 | 13.759 * | 26 | 5.034 | 16 | 1.53048 | 55.72 | L12 GR4 |
| 27 | −88.521 * | 27 | 1.000 | | | | |
| 28 | −200.000 | 28 | 1.206 | 17 | 1.84666 | 23.78 | L13 |
| 29 | 44.381 | 29 | 1.502 | | | | |
| 30 | ∞ | 30 | 0.500 | 18 | 1.51680 | 64.20 | CG |
| 31 | ∞ | | | | | | |

TABLE 8

Example 4

Aspherical Surface Data of Surface 10(i = 10)

| | |
|---|---|
| ϵ | 1.0000 |
| A4 | −0.10347630E−03 |
| A6 | 0.10571704E−07 |
| A8 | −0.10147936E−06 |
| A10 | 0.40490268E−08 |

Aspherical Surface Data of Surface 16(i = 16)

| | |
|---|---|
| ϵ | 1.0000 |
| A4 | −0.10745558E−03 |
| A6 | 0.94049800E−07 |
| A8 | −0.72034064E−08 |
| A10 | 0.24899348E−09 |

Aspherical Surface Data of Surface 24(i = 24)

| | |
|---|---|
| ϵ | 1.0000 |
| A4 | −0.48200103E−03 |
| A6 | 0.23899796E−06 |
| A8 | −0.14206418E−06 |
| A10 | 0.27280903E−08 |

TABLE 8-continued

Example 4

Aspherical Surface Data of Surface 25(i = 25)

| | |
|---|---|
| ϵ | 1.0000 |
| A4 | −0.52970460E−03 |
| A6 | 0.17563218E−06 |
| A8 | −0.61275210E−07 |
| A10 | 0.86383888E−09 |

Aspherical Surface Data of Surface 26(i = 26)

| | |
|---|---|
| ϵ | 1.0000 |
| A4 | 0.82635382E−04 |
| A6 | −0.37172310E−05 |
| A8 | −0.29629917E−07 |
| A10 | −0.19532084E−08 |

Aspherical Surface Data of Surface 27(i = 27)

| | |
|---|---|
| ϵ | 1.0000 |
| A4 | 0.46636778E−03 |
| A6 | 0.33804543E−05 |
| A8 | −0.10852266E−05 |
| A10 | 0.15300655E−07 |

TABLE 9

| Example 5 | | Focal Length Position F[mm] FNO | | (W)~(M)~(T) 8.10~25.10~53.45 2.71~4.11~5.15 | | | |
|---|---|---|---|---|---|---|---|
| i | ri[mm] | i | di[mm] | i | Ni | νi | Element |
| 1 | 28.794 | 1 | 0.800 | 1 | 1.92286 | 20.88 | L1 GR1 |
| 2 | 17.862 | 2 | 3.024 | | | | |
| 3 | ∞ | 3 | 13.400 | 2 | 1.72916 | 54.67 | PR |
| 4 | ∞ | 4 | 0.200 | | | | |

TABLE 9-continued

| i | ri[mm] | | i | di[mm] | i | Ni | νi | Element | |
|---|---|---|---|---|---|---|---|---|---|
| 5 | 66.289 | | 5 | 1.652 | 3 | 1.62041 | 60.34 | L2 | |
| 6 | −56.704 | | 6 | 0.100 | | | | | |
| 7 | 21.375 | | 7 | 2.221 | 4 | 1.49700 | 81.61 | L3 | |
| 8 | −65.593 | | 8 | 0.600~7.765~11.935 | | | | | |
| 9 | −52.828 | | 9 | 1.281 | 5 | 1.77250 | 49.77 | L4 | GR2 |
| 10 | 9.133 | * | 10 | 2.444 | | | | | |
| 11 | −9.616 | | 11 | 0.700 | 6 | 1.83481 | 42.72 | L5 | |
| 12 | 16.877 | | 12 | 0.010 | 7 | 1.51400 | 42.83 | | |
| 13 | 16.877 | | 13 | 1.790 | 8 | 1.92286 | 20.88 | L6 | |
| 14 | −21.804 | | 14 | 12.135~4.970~0.800 | | | | | |
| 15 | ∞ | | 15 | 0.500 | | | | ST | GR3 |
| 16 | 13.775 | * | 16 | 2.868 | 9 | 1.69350 | 53.39 | L7 | |
| 17 | −11.093 | | 17 | 0.010 | 10 | 1.51400 | 42.83 | | |
| 18 | −11.093 | | 18 | 0.700 | 11 | 1.80518 | 25.46 | L8 | |
| 19 | −22.342 | | 19 | 10.082 | | | | | |
| 20 | 19.314 | | 20 | 0.700 | 12 | 1.80518 | 25.46 | L9 | |
| 21 | 6.173 | | 21 | 0.010 | 13 | 1.51400 | 42.83 | | |
| 22 | 6.173 | | 22 | 5.801 | 14 | 1.48749 | 70.44 | L10 | |
| 23 | 15.109 | | 23 | 1.734 | | | | | |
| 24 | 12.411 | * | 24 | 2.092 | 15 | 1.60700 | 27.00 | L11 | |
| 25 | 26.761 | * | 25 | 0.800~15.919~27.300 | | | | | |
| 26 | 12.442 | * | 26 | 3.808 | 16 | 1.53048 | 55.72 | L12 | GR4 |
| 27 | −43.564 | * | 27 | 0.999 | | | | | |
| 28 | −200.000 | | 28 | 1.090 | 17 | 1.84666 | 23.78 | L13 | |
| 29 | 29.288 | | 29 | 1.955 | | | | | |
| 30 | ∞ | | 30 | 0.500 | 18 | 1.51680 | 64.20 | CG | |
| 31 | ∞ | | | | | | | | |

TABLE 10

Example 5

Aspherical Surface Data of Surface 10(i = 10)

| ε | 1.0000 |
|---|---|
| A4 | −0.11251572E−03 |
| A6 | 0.81065978E−06 |
| A8 | −0.20573522E−06 |
| A10 | 0.89121016E−08 |

Aspherical Surface Data of Surface 16(i = 16)

| ε | 1.0000 |
|---|---|
| A4 | −0.11389588E−03 |
| A6 | 0.30155805E−06 |
| A8 | −0.16602730E−07 |
| A10 | 0.33990965E−09 |

Aspherical Surface Data of Surface 24(i = 24)

| ε | 1.0000 |
|---|---|
| A4 | −0.32855269E−03 |
| A6 | −0.61225955E−05 |
| A8 | 0.20169935E−06 |
| A10 | −0.32385413E−09 |

TABLE 10-continued

Example 5

Aspherical Surface Data of Surface 25(i = 25)

| ε | 1.0000 |
|---|---|
| A4 | −0.38660182E−03 |
| A6 | −0.81368352E−05 |
| A8 | 0.28754443E−06 |
| A10 | −0.23391449E−08 |

Aspherical Surface Data of Surface 26(i = 26)

| ε | 1.0000 |
|---|---|
| A4 | 0.36504125E−03 |
| A6 | −0.74333710E−05 |
| A8 | −0.41127534E−07 |
| A10 | −0.34151284E−08 |

Aspherical Surface Data of Surface 27(i = 27)

| ε | 1.0000 |
|---|---|
| A4 | 0.98907401E−03 |
| A6 | −0.70237988E−05 |
| A8 | −0.12081571E−05 |
| A10 | 0.18264023E−07 |

TABLE 11

| Example 6 | Focal Length Position | (W)~(M)~(T) |
|---|---|---|
| | F[mm] | 6.30~19.52~41.57 |
| | FNO | 2.66~3.90~5.15 |

| i | ri[mm] | i | di[mm] | i | Ni | νi | Element | |
|---|---|---|---|---|---|---|---|---|
| 1 | 48.110 | 1 | 0.800 | 1 | 1.92286 | 20.88 | L1 | GR1 |
| 2 | 19.270 | 2 | 2.000 | | | | | |
| 3 | ∞ | 3 | 10.800 | 2 | 1.88300 | 40.79 | PR | |
| 4 | ∞ | 4 | 0.127 | | | | | |
| 5 | 40.997 | 5 | 1.901 | 3 | 1.58913 | 61.25 | L2 | |

TABLE 11-continued

| | | | | | | | | |
|---|---|---|---|---|---|---|---|---|
| 6 | −30.751 | | 6 | 0.100 | | | | |
| 7 | 15.739 | | 7 | 1.871 | 4 | 1.49700 | 81.61 | L3 |
| 8 | 170.924 | | 8 | 0.600~6.966~10.150 | | | | |
| 9 | 140.361 | | 9 | 0.800 | 5 | 1.77250 | 49.77 | L4 GR2 |
| 10 | 6.442 | * | 10 | 2.185 | | | | |
| 11 | −7.197 | | 11 | 0.700 | 6 | 1.72916 | 54.67 | L5 |
| 12 | 12.245 | | 12 | 0.010 | 7 | 1.51400 | 42.83 | |
| 13 | 12.245 | | 13 | 1.641 | 8 | 1.92286 | 20.88 | L6 |
| 14 | −30.167 | | 14 | 10.377~4.012~0.827 | | | | |
| 15 | ∞ | | 15 | 0.500 | | | ST | GR3 |
| 16 | 12.223 | * | 16 | 2.758 | 9 | 1.69350 | 53.39 | L7 |
| 17 | −10.946 | | 17 | 0.010 | 10 | 1.51400 | 42.83 | |
| 18 | −10.946 | | 18 | 0.988 | 11 | 1.80518 | 25.46 | L8 |
| 19 | −24.189 | | 19 | 9.009 | | | | |
| 20 | 10.533 | | 20 | 1.000 | 12 | 1.80518 | 25.46 | L9 |
| 21 | 4.830 | | 21 | 0.010 | 13 | 1.51400 | 42.83 | |
| 22 | 4.830 | | 22 | 3.677 | 14 | 1.48749 | 70.44 | L10 |
| 23 | 13.721 | | 23 | 1.000 | | | | |
| 24 | 15.633 | * | 24 | 2.433 | 15 | 1.60700 | 27.00 | L11 |
| 25 | 57.853 | * | 25 | 1.704~14.872~28.205 | | | | |
| 26 | 13.095 | * | 26 | 3.158 | 16 | 1.53048 | 55.72 | L12 GR4 |
| 27 | −16.163 | * | 27 | 0.781 | | | | |
| 28 | −11.990 | | 28 | 1.000 | 17 | 1.84666 | 23.78 | L13 |
| 29 | −45.718 | | 29 | 2.052 | | | | |
| 30 | ∞ | | 30 | 0.500 | 18 | 1.51680 | 64.20 | CG |
| 31 | ∞ | | | | | | | |

TABLE 12

Example 6

Aspherical Surface Data of Surface 10(i = 10)

| | |
|---|---|
| ε | 1.0000 |
| A4 | −0.10732497E−03 |
| A6 | 0.57313839E−06 |
| A8 | −0.42087595E−06 |
| A10 | 0.36617830E−07 |

Aspherical Surface Data of Surface 16(i = 16)

| | |
|---|---|
| ε | 1.0000 |
| A4 | −0.14050118E−03 |
| A6 | 0.15126826E−06 |
| A8 | −0.17592819E−07 |
| A10 | 0.61027539E−09 |

Aspherical Surface Data of Surface 24(i = 24)

| | |
|---|---|
| ε | 1.0000 |
| A4 | −0.39055016E−03 |
| A6 | −0.83755556E−05 |
| A8 | 0.34012017E−06 |
| A10 | 0.10816659E−08 |

TABLE 12-continued

Example 6

Aspherical Surface Data of Surface 25(i = 25)

| | |
|---|---|
| ε | 1.0000 |
| A4 | −0.56438517E−03 |
| A6 | −0.13991709E−04 |
| A8 | 0.48071072E−06 |
| A10 | −0.10628856E−07 |

Aspherical Surface Data of Surface 26(i = 26)

| | |
|---|---|
| ε | 1.0000 |
| A4 | 0.94933667E−04 |
| A6 | −0.20612676E−05 |
| A8 | −0.36313239E−06 |
| A10 | −0.18922759E−07 |

Aspherical Surface Data of Surface 27(i = 27)

| | |
|---|---|
| ε | 1.0000 |
| A4 | 0.18297925E−03 |
| A6 | 0.19313027E−04 |
| A8 | −0.34461882E−05 |
| A10 | 0.67376749E−07 |

TABLE 13

| Example 7 | | Focal Length Position F[mm] FNO | | | (W)~(M)~(T) 7.99~19.17~45.16 3.77~5.09~5.20 | | | |
|---|---|---|---|---|---|---|---|---|
| i | ri[mm] | i | di[mm] | i | Ni | νi | Element | |
| 1 | 47.775 | 1 | 0.800 | 1 | 1.92286 | 20.88 | L1 | GR1 |
| 2 | 20.558 | 2 | 2.450 | | | | | |
| 3 | ∞ | 3 | 14.000 | 2 | 1.88300 | 40.79 | PR | |
| 4 | ∞ | 4 | 0.100 | | | | | |
| 5 | 36.725 | 5 | 1.908 | 3 | 1.63854 | 55.45 | L2 | |

TABLE 13-continued

| | | | | | | | | |
|---|---|---|---|---|---|---|---|---|
| 6 | −42.803 | 6 | 0.100 | | | | | |
| 7 | 21.430 | 7 | 1.657 | 4 | 1.49700 | 81.61 | L3 | |
| 8 | 286.719 | 8 | 0.649~7.285~14.915 | | | | | |
| 9 | −382.266 | 9 | 0.800 | 5 | 1.77250 | 49.77 | L4 | GR2 |
| 10 | 7.035 * | 10 | 2.004 | | | | | |
| 11 | −7.645 | 11 | 0.700 | 6 | 1.51680 | 64.20 | L5 | |
| 12 | 12.557 | 12 | 0.010 | 7 | 1.51400 | 42.83 | | |
| 13 | 12.557 | 13 | 1.502 | 8 | 1.84666 | 23.78 | L6 | |
| 14 | −59.208 | 14 | 11.167~6.009~0.950 | | | | | |
| 15 | ∞ | 15 | 1.000 | | | | ST | GR3 |
| 16 | 7.807 * | 16 | 2.332 | 9 | 1.58913 | 61.25 | L7 | |
| 17 | −8.642 | 17 | 0.010 | 10 | 1.51400 | 42.83 | | |
| 18 | −8.642 | 18 | 0.700 | 11 | 1.83500 | 42.98 | L8 | |
| 19 | −24.972 | 19 | 5.765 | | | | | |
| 20 | 9.133 | 20 | 3.437 | 12 | 1.48749 | 70.44 | L9 | |
| 21 | −5.326 | 21 | 0.010 | 13 | 1.51400 | 42.83 | | |
| 22 | −5.326 | 22 | 0.700 | 14 | 1.80610 | 33.27 | L10 | |
| 23 | 54.405 | 23 | 4.240 | | | | | |
| 24 | −15.211 * | 24 | 2.803 | 15 | 1.60700 | 27.00 | L11 | |
| 25 | −18.730 * | 25 | 0.800~9.075~9.769 | | | | | |
| 26 | 19.006 * | 26 | 2.650 | 16 | 1.53048 | 55.72 | L12 | GR4 |
| 27 | 467.395 * | 27 | 3.471 | | | | | |
| 28 | ∞ | 28 | 0.500 | 17 | 1.51680 | 64.20 | CG | |
| 29 | ∞ | | | | | | | |

TABLE 14

Example 7

Aspherical Surface Data of Surface 10(i = 10)

| | |
|---|---|
| $\epsilon$ | 1.0000 |
| A4 | −0.67799158E−04 |
| A6 | 0.96058817E−06 |
| A8 | 0.41344081E−07 |
| A10 | −0.46262692E−08 |

Aspherical Surface Data of Surface 16(i = 16)

| | |
|---|---|
| $\epsilon$ | 1.0000 |
| A4 | −0.12912082E−03 |
| A6 | 0.91847279E−06 |
| A8 | −0.72780971E−07 |
| A10 | 0.30673980E−08 |

Aspherical Surface Data of Surface 24(i = 24)

| | |
|---|---|
| $\epsilon$ | 1.0000 |
| A4 | −0.13966519E−02 |
| A6 | 0.13278370E−04 |
| A8 | 0.12272916E−05 |
| A10 | 0.21670247E−07 |

TABLE 14-continued

Example 7

Aspherical Surface Data of Surface 25(i = 25)

| | |
|---|---|
| $\epsilon$ | 1.0000 |
| A4 | −0.97032523E−03 |
| A6 | 0.16497548E−04 |
| A8 | 0.34413689E−07 |
| A10 | 0.17182245E−07 |

Aspherical Surface Data of Surface 26(i = 26)

| | |
|---|---|
| $\epsilon$ | 1.0000 |
| A4 | −0.37757354E−04 |
| A6 | 0.89018556E−05 |
| A8 | −0.19277655E−05 |
| A10 | 0.47192370E−07 |

Aspherical Surface Data of Surface 27(i = 27)

| | |
|---|---|
| $\epsilon$ | 1.0000 |
| A4 | 0.29913138E−03 |
| A6 | 0.10639857E−04 |
| A8 | −0.27271667E−05 |
| A10 | 0.62761401E−07 |

TABLE 15

| Example 8 | | Focal Length Position F[mm] FNO | | (W)~(M)~(T) 6.42~19.90~42.37 2.87~4.54~5.15 | | |
|---|---|---|---|---|---|---|
| i | ri[mm] | i | di[mm] | i | Ni vi | Element |
| 1 | 25.845 | 1 | 0.800 | 1 | 1.84666 23.78 | L1 GR1 |
| 2 | 13.592 | 2 | 2.500 | | | |
| 3 | ∞ | 3 | 10.500 | 2 | 1.84666 23.78 | PR |
| 4 | ∞ | 4 | 0.300 | | | |
| 5 | 40.234 | 5 | 1.518 | 3 | 1.62162 52.18 | L2 |
| 6 | −79.125 | 6 | 0.100 | | | |
| 7 | 19.655 | 7 | 2.044 | 4 | 1.49393 68.98 | L3 |

TABLE 15-continued

| | | | | | | | | |
|---|---|---|---|---|---|---|---|---|
| 8 | −37.690 | | 8 | 0.600~7.401~12.233 | | | | |
| 9 | −39.951 | * | 9 | 0.800 | 5 | 1.86550 | 30.54 | L4 GR2 |
| 10 | 6.849 | | 10 | 2.919 | | | | |
| 11 | −5.372 | | 11 | 0.700 | 6 | 1.48750 | 70.00 | L5 |
| 12 | 26.191 | | 12 | 0.010 | 7 | 1.51400 | 42.83 | |
| 13 | 26.191 | | 13 | 1.703 | 8 | 1.84666 | 23.78 | L6 |
| 14 | −13.441 | | 14 | 12.433~5.632~0.800 | | | | |
| 15 | ∞ | | 15 | 0.500 | | | | ST GR3 |
| 16 | 10.075 | * | 16 | 2.864 | 9 | 1.68238 | 46.68 | L7 |
| 17 | −10.343 | | 17 | 0.010 | 10 | 1.51400 | 42.83 | |
| 18 | −10.343 | | 18 | 0.700 | 11 | 1.79879 | 31.79 | L8 |
| 19 | −1367.035 | | 19 | 9.000 | | | | |
| 20 | 11.366 | * | 20 | 4.388 | 12 | 1.48749 | 70.44 | L9 |
| 21 | −5.803 | | 21 | 0.010 | 13 | 1.51400 | 42.83 | |
| 22 | −5.803 | | 22 | 0.700 | 14 | 1.87344 | 34.53 | L10 |
| 23 | −27.680 | | 23 | 1.340~19.690~25.105 | | | | |
| 24 | −25.520 | | 24 | 0.800 | 15 | 1.86683 | 31.14 | L11 GR4 |
| 25 | −123.336 | | 25 | 0.100 | | | | |
| 26 | 15.311 | * | 26 | 3.000 | 16 | 1.53048 | 55.72 | L12 |
| 27 | −29.644 | * | 27 | 8.521~2.600~3.114 | | | | |
| 28 | ∞ | | 28 | 0.500 | 17 | 1.51680 | 64.20 | CG SU5 |
| 29 | ∞ | | | | | | | |

TABLE 16

Example 8

Aspherical Surface Data of Surface 9(i = 9)

| | |
|---|---|
| $\epsilon$ | −57.2352 |
| A4 | 0.15882965E−03 |
| A6 | −0.20931606E−05 |
| A8 | 0.91486827E−08 |
| A10 | −0.61919454E−09 |

Aspherical Surface Data of Surface 16(i = 16)

| | |
|---|---|
| $\epsilon$ | 1.0000 |
| A4 | −0.59577286E−04 |
| A6 | −0.17872322E−06 |
| A8 | 0.99574761E−08 |
| A10 | −0.10774847E−09 |

Aspherical Surface Data of Surface 20(i = 20)

| | |
|---|---|
| $\epsilon$ | 1.0000 |
| A4 | 0.24168919E−04 |
| A6 | 0.50164245E−05 |
| A8 | −0.50460778E−07 |
| A10 | 0.10596959E−07 |

TABLE 16-continued

Example 8

Aspherical Surface Data of Surface 26(i = 26)

| | |
|---|---|
| $\epsilon$ | 1.0000 |
| A4 | 0.17474167E−03 |
| A6 | 0.45181466E−05 |
| A8 | −0.99350042E−07 |
| A10 | −0.13011353E−08 |

Aspherical Surface Data of Surface 27(i = 27)

| | |
|---|---|
| $\epsilon$ | 1.0000 |
| A4 | 0.29000283E−03 |
| A6 | 0.42202831E−05 |
| A8 | −0.36866613E−07 |
| A10 | −0.51991943E−08 |

TABLE 17

| Example 9 | | Focal Length Position F[mm] FNO | | (W)~(M)~(T) 6.42~19.89~42.36 2.74~4.30~5.24 | | | |
|---|---|---|---|---|---|---|---|
| i | ri[mm] | i | di[mm] | i | Ni | vi | Element |
| 1 | 25.626 | 1 | 0.800 | 1 | 1.84666 | 23.78 | L1 GR1 |
| 2 | 13.501 | 2 | 2.500 | | | | |
| 3 | ∞ | 3 | 10.500 | 2 | 1.84666 | 23.78 | PR |
| 4 | ∞ | 4 | 0.300 | | | | |
| 5 | 45.796 | 5 | 1.515 | 3 | 1.64959 | 50.15 | L2 |
| 6 | −77.773 | 6 | 0.100 | | | | |
| 7 | 21.317 | 7 | 2.037 | 4 | 1.49098 | 69.64 | L3 |
| 8 | −33.075 | 8 | 0.600~7.807~12.362 | | | | |
| 9 | −54.932 | * 9 | 0.800 | 5 | 1.86327 | 29.57 | L4 GR2 |
| 10 | 6.826 | 10 | 2.351 | | | | |
| 11 | −5.382 | 11 | 1.122 | 6 | 1.48750 | 70.00 | L5 |

TABLE 17-continued

| | | | | | | | | |
|---|---|---|---|---|---|---|---|---|
| 12 | 21.534 | | 12 | 0.010 | 7 | 1.51400 | 42.83 | |
| 13 | 21.534 | | 13 | 1.748 | 8 | 1.84666 | 23.78 | L6 |
| 14 | −14.655 | | 14 | 12.562~5.355~0.800 | | | | |
| 15 | ∞ | | 15 | 0.500 | | | ST | GR3 |
| 16 | 10.875 | * | 16 | 3.845 | 9 | 1.68970 | 47.74 | L7 |
| 17 | −9.571 | | 17 | 0.010 | 10 | 1.51400 | 42.83 | |
| 18 | −9.571 | | 18 | 0.700 | 11 | 1.81695 | 29.81 | L8 |
| 19 | −70.155 | | 19 | 9.000 | | | | |
| 20 | 11.002 | * | 20 | 5.000 | 12 | 1.48749 | 70.44 | L9 |
| 21 | −5.356 | | 21 | 0.010 | 13 | 1.51400 | 42.83 | |
| 22 | −5.356 | | 22 | 0.700 | 14 | 1.87537 | 35.64 | L10 |
| 23 | −41.330 | | 23 | 1.251~16.433~24.224 | | | | |
| 24 | 16.044 | * | 24 | 5.000 | 15 | 1.48749 | 70.44 | L11 GR4 |
| 25 | −267.212 | * | 25 | 4.899~2.629~2.200 | | | | |
| 26 | ∞ | | 26 | 0.500 | 16 | 1.51680 | 64.20 | CG SU5 |
| 27 | ∞ | | | | | | | |

TABLE 18

Example 9

Aspherical Surface Data of Surface 9(i = 9)

| | |
|---|---|
| ε | −46.8957 |
| A4 | 0.16612137E−03 |
| A6 | −0.30195691E−05 |
| A8 | 0.10294541E−06 |
| A10 | −0.58985283E−08 |

Aspherical Surface Data of Surface 16(i = 16)

| | |
|---|---|
| ε | 1.0000 |
| A4 | −0.60435282E−04 |
| A6 | −0.14662407E−06 |
| A8 | 0.89430287E−08 |
| A10 | −0.57567701E−010 |

Aspherical Surface Data of Surface 20(i = 20)

| | |
|---|---|
| ε | 1.0000 |
| A4 | 0.99687280E−04 |
| A6 | 0.79377958E−05 |
| A8 | −0.13714060E−06 |
| A10 | 0.18930633E−07 |

TABLE 18-continued

Example 9

Aspherical Surface Data of Surface 24(i = 24)

| | |
|---|---|
| ε | 1.0000 |
| A4 | 0.34828366E−04 |
| A6 | 0.26647497E−05 |
| A8 | −0.24037181E−06 |
| A10 | 0.31168919E−08 |

Aspherical Surface Data of Surface 25(i = 25)

| | |
|---|---|
| ε | 1.0000 |
| A4 | 0.11578483E−03 |
| A6 | 0.10989257E−04 |
| A8 | −0.11450034E−05 |
| A10 | 0.21945455E−07 |

TABLE 19

| Example 10 | | | Focal Length Position F[mm] FNO | | | (W)~(M)~(T) 6.20~19.22~40.92 2.95~3.89~5.15 | | |
|---|---|---|---|---|---|---|---|---|
| i | ri[mm] | | i | di[mm] | i | Ni | vi | Element |
| 1 | 43.945 | | 1 | 1.000 | 1 | 1.84666 | 23.78 | L1 GR1 |
| 2 | 14.738 | | 2 | 2.500 | | | | |
| 3 | ∞ | | 3 | 10.500 | 2 | 1.84666 | 23.78 | PR |
| 4 | ∞ | | 4 | 0.300 | | | | |
| 5 | 29.047 | | 5 | 2.211 | 3 | 1.50361 | 66.96 | L2 |
| 6 | −23.867 | | 6 | 0.100 | | | | |
| 7 | 19.166 | | 7 | 1.792 | 4 | 1.59788 | 54.21 | L3 |
| 8 | −1103.887 | | 8 | 0.618~8.058~11.141 | | | | |
| 9 | −92.087 | * | 9 | 0.800 | 5 | 1.88300 | 40.80 | L4 GR2 |
| 10 | 6.538 | | 10 | 3.258 | | | | |
| 11 | −5.464 | | 11 | 0.700 | 6 | 1.48749 | 70.44 | L5 |
| 12 | 21.910 | | 12 | 0.010 | 7 | 1.51400 | 42.83 | |
| 13 | 21.910 | | 13 | 1.616 | 8 | 1.84666 | 23.78 | L6 |
| 14 | −16.381 | | 14 | 11.723~4.283~1.200 | | | | |

TABLE 19-continued

| | | | | | | | | | |
|---|---|---|---|---|---|---|---|---|---|
| 15 | ∞ | | 15 | 0.500 | | | | ST | GR3 |
| 16 | 9.712 | * | 16 | 2.795 | 9 | 1.51965 | 53.34 | L7 | |
| 17 | −10.625 | | 17 | 0.010 | 10 | 1.51400 | 42.83 | | |
| 18 | −10.625 | | 18 | 0.700 | 11 | 1.84849 | 27.07 | L8 | |
| 19 | −21.963 | | 19 | 9.000 | | | | | |
| 20 | 18.366 | * | 20 | 1.801 | 12 | 1.48750 | 70.00 | L9 | |
| 21 | −29.054 | | 21 | 0.100 | | | | | |
| 22 | 46.731 | | 22 | 2.620 | 13 | 1.49700 | 81.61 | L10 | |
| 23 | −5.291 | | 23 | 0.010 | 14 | 1.51400 | 42.83 | | |
| 24 | −5.291 | | 24 | 0.700 | 15 | 1.86028 | 38.20 | L11 | |
| 25 | −110.496 | | 25 | 1.546~10.431~25.999 | | | | | |
| 26 | 12.244 | * | 26 | 4.068 | 16 | 1.48749 | 70.44 | L12 | GR4 |
| 27 | 52.879 | | 27 | 7.807~10.947~6.070 | | | | | |
| 28 | ∞ | | 28 | 0.500 | 17 | 1.51680 | 64.20 | CG | SU5 |
| 29 | ∞ | | | | | | | | |

TABLE 20

Example 10

| Aspherical Surface Data of Surface 9(i = 9) | | Aspherical Surface Data of Surface 20(i = 20) | |
|---|---|---|---|
| ϵ | −371.38 | ϵ | 1.0000 |
| A4 | 0.13198863E−03 | A4 | 0.21611656E−03 |
| A6 | −0.16010305E−05 | A6 | 0.95781187E−05 |
| A8 | −0.62426729E−07 | A8 | −0.21006691E−06 |
| A10 | 0.18494727E−08 | A10 | 0.19977665E−07 |

TABLE 20-continued

Example 10

| Aspherical Surface Data of Surface 16(i = 16) | | Aspherical Surface Data of Surface 26(i = 26) | |
|---|---|---|---|
| ϵ | 1.0000 | ϵ | 1.0000 |
| A4 | −0.11924623E−03 | A4 | −0.26101522E−04 |
| A6 | −0.48997232E−06 | A6 | 0.13312555E−06 |
| A8 | 0.17242597E−07 | A8 | −0.58207864E−08 |
| A10 | −0.48425913E−09 | A10 | −0.83031131E−10 |

TABLE 21

| Example 11 | | | Focal Length Position F[mm] FNO | | | | (W)~(M)~(T) 8.10~25.10~53.45 3.15~4.88~5.15 | | |
|---|---|---|---|---|---|---|---|---|---|
| i | ri[mm] | | i | di[mm] | | i | Ni | vi | Element |
| 1 | 50.950 | | 1 | 0.800 | | 1 | 1.84666 | 23.82 | L1 GR1 |
| 2 | 21.173 | | 2 | 2.500 | | | | | |
| 3 | ∞ | | 3 | 14.000 | | 2 | 1.84666 | 23.78 | PR |
| 4 | ∞ | | 4 | 0.300 | | | | | |
| 5 | 58.530 | | 5 | 2.142 | | 3 | 1.53437 | 61.67 | L2 |
| 6 | −31.696 | | 6 | 0.100 | | | | | |
| 7 | 18.750 | | 7 | 2.190 | | 4 | 1.49700 | 81.61 | L3 |
| 8 | 451.038 | | 8 | 0.601~8.131~13.990 | | | | | |
| 9 | 397.251 | | 9 | 0.800 | | 5 | 1.77250 | 49.77 | L4 GR2 |
| 10 | 7.579 | * | 10 | 2.875 | | | | | |
| 11 | −8.879 | | 11 | 0.700 | | 6 | 1.48749 | 70.44 | L5 |
| 12 | 13.313 | | 12 | 0.010 | | 7 | 1.51400 | 42.83 | |
| 13 | 13.313 | | 13 | 1.696 | | 8 | 1.84668 | 23.83 | L6 |
| 14 | −152.442 | | 14 | 14.189~6.660~0.800 | | | | | |
| 15 | ∞ | | 15 | 0.500 | | | | | ST GR3 |
| 16 | 8.643 | * | 16 | 2.567 | | 9 | 1.69350 | 53.39 | L7 |
| 17 | ∞ | | 17 | 0.010 | | 10 | 1.51400 | 42.83 | |
| 18 | ∞ | | 18 | 10.000 | | 11 | 1.84666 | 23.78 | PR |
| 19 | ∞ | | 19 | 0.380 | | | | | |
| 20 | 12.454 | | 20 | 2.480 | | 12 | 1.48767 | 70.40 | L8 |
| 21 | −6.038 | | 21 | 0.010 | | 13 | 1.51400 | 42.83 | |
| 22 | −6.038 | | 22 | 0.700 | | 14 | 1.85011 | 24.89 | L9 |
| 23 | 216.003 | | 23 | 0.453 | | | | | |
| 24 | −24.235 | | 24 | 0.800 | | 15 | 1.87594 | 35.98 | L10 |
| 25 | 47.926 | | 25 | 3.324 | | | | | |
| 26 | 12.460 | * | 26 | 2.031 | | 16 | 1.62017 | 24.01 | L11 |
| 27 | 42.795 | * | 27 | 1.468~17.723~20.079 | | | | | |
| 28 | 12.815 | * | 28 | 3.749 | | 17 | 1.53048 | 55.72 | L12 GR4 |

TABLE 21-continued

| 29 | −21.925 | * | 29 | 1.000 | | | | |
|---|---|---|---|---|---|---|---|---|
| 30 | −19.794 | | 30 | 1.000 | 18 | 1.84666 | 23.82 | L13 |
| 31 | −235.550 | | 31 | 2.229~1.565~2.704 | | | | |
| 32 | ∞ | | 32 | 0.500 | 19 | 1.51680 | 64.20 | CG SU5 |
| 33 | ∞ | | | | | | | |

TABLE 22

Example 11

| Aspherical Surface Data of Surface 10(i = 10) | | Aspherical Surface Data of Surface 27(i = 27) | |
|---|---|---|---|
| ϵ | 1.0000 | ϵ | 1.0000 |
| A4 | −0.41219237E−04 | A4 | −0.38494478E−03 |
| A6 | −0.13871421E−05 | A6 | −0.14104688E−04 |
| A8 | 0.26102532E−07 | A8 | 0.15157903E−06 |
| A10 | 0.38454974E−08 | A10 | −0.57939620E−08 |

| Aspherical Surface Data of Surface 16(i = 16) | | Aspherical Surface Data of Surface 28(i = 28) | |
|---|---|---|---|
| ϵ | 1.0000 | ϵ | 1.0000 |
| A4 | −0.99341543E−04 | A4 | 0.24897817E−05 |

TABLE 22-continued

Example 11

| A6 | −0.87994965E−06 | A6 | 0.83881297E−06 |
|---|---|---|---|
| A8 | 0.14095947E−07 | A8 | −0.14212718E−06 |
| A10 | −0.48483908E−09 | A10 | 0.18928651E−08 |

| Aspherical Surface Data of Surface 26(i = 26) | | Aspherical Surface Data of Surface 29(i = 29) | |
|---|---|---|---|
| ϵ | 1.0000 | ϵ | 1.0000 |
| A4 | −0.62593936E−03 | A4 | 0.10391893E−03 |
| A6 | −0.12198423E−04 | A6 | −0.45223886E−05 |
| A8 | 0.34700666E−07 | | |
| A10 | −0.78808573E−08 | | |

TABLE 23

| | Conditional formulae (A) | Conditional formulae (B) | Conditional formulae (C) | Conditional formulae (D) | Conditional formulae (E) |
|---|---|---|---|---|---|
| Example 1 | 5.20 | −4.21 | 1.43 | 2.28 | 4.73 |
| Example 2 | 4.90 | −4.39 | 1.45 | 2.52 | 5.65 |
| Example 3 | 5.60 | −7.15 | 1.48 | 2.44 | 5.65 |
| Example 4 | 5.37 | −6.77 | 1.33 | 2.52 | 6.59 |
| Example 5 | 5.33 | −16.71 | 1.19 | 2.60 | 6.60 |
| Example 6 | 5.99 | −13.65 | 1.26 | 2.88 | 6.60 |
| Example 7 | 4.44 | −3.95 | 0.95 | 1.66 | 5.65 |
| Example 8 | 5.05 | −4.30 | 1.18 | 1.99 | 6.60 |
| Example 9 | 5.50 | −5.99 | 1.15 | 2.21 | 6.60 |
| Example 10 | 5.07 | −16.58 | 1.20 | 1.99 | 6.60 |
| Example 11 | 5.06 | −7.44 | 1.31 | 2.13 | 6.60 |

TABLE 24

| | TL3 | Y' | TL3$_M$ | RS | β 3t | β 3w | ft | fw |
|---|---|---|---|---|---|---|---|---|
| Example 1 | 23.408 | 4.5 | 9.840 | 6.890 | −2.99302 | −1.3141 | 37.74 | 7.98 |
| Example 2 | 22.043 | 4.5 | 9.840 | 6.800 | −2.99831 | −1.1876 | 44.26 | 7.83 |
| Example 3 | 25.215 | 4.5 | 10.200 | 6.910 | −2.88812 | −1.1841 | 45.16 | 7.99 |
| Example 4 | 24.144 | 4.5 | 9.310 | 6.978 | −3.11540 | −1.2342 | 52.67 | 7.99 |
| Example 5 | 23.997 | 4.5 | 10.082 | 8.468 | −3.14106 | −1.2099 | 53.45 | 8.10 |
| Example 6 | 20.966 | 3.5 | 9.009 | 7.122 | −3.30653 | −1.1471 | 41.57 | 6.30 |
| Example 7 | 19.997 | 4.5 | 5.765 | 6.050 | −1.90332 | −1.1445 | 45.16 | 7.99 |
| Example 8 | 17.672 | 3.5 | 9.000 | 7.640 | −2.11183 | −1.0629 | 42.37 | 6.42 |
| Example 9 | 19.265 | 3.5 | 9.000 | 7.800 | −2.37844 | −1.0773 | 42.36 | 6.42 |
| Example 10 | 17.736 | 3.5 | 9.000 | 7.490 | −2.77548 | −1.3958 | 40.92 | 6.20 |
| Example 11 | 22.755 | 4.5 | 10.000 | 7.630 | −2.57085 | −1.2078 | 53.45 | 8.10 |

TABLE 25

|  | \|X\| | \|X₀\| | C₀ | N | N' | f3 |
|---|---|---|---|---|---|---|
| Example 1 | 0.279600 | 0.283451 | 0.0835073 | 1.00000 | 1.69350 | 15.78400 |
| Example 2 | 0.286406 | 0.290301 | 0.0874661 | 1.00000 | 1.69350 | 14.62903 |
| Example 3 | 0.232120 | 0.237029 | 0.0679856 | 1.00000 | 1.69350 | 14.56583 |
| Example 4 | 0.247826 | 0.252719 | 0.0740686 | 1.00000 | 1.69350 | 14.07649 |
| Example 5 | 0.361730 | 0.373276 | 0.0725953 | 1.00000 | 1.69350 | 13.72217 |
| Example 6 | 0.332203 | 0.341709 | 0.0818130 | 1.00000 | 1.69350 | 12.27168 |
| Example 7 | 0.342973 | 0.346495 | 0.1280902 | 1.00000 | 1.58913 | 11.80141 |
| Example 8 | 0.423577 | 0.427881 | 0.0992556 | 1.00000 | 1.68238 | 14.76728 |
| Example 9 | 0.390827 | 0.395176 | 0.0919540 | 1.00000 | 1.56870 | 13.87438 |
| Example 10 | 0.529408 | 0.542303 | 0.1029654 | 1.00000 | 1.51965 | 14.53528 |
| Example 11 | 0.528759 | 0.537383 | 0.1157006 | 1.00000 | 1.69350 | 14.43653 |

What is claimed is:

1. An optical unit including:
a variable magnification optical system having a plurality of lens units, and an image sensor for receiving light that has traveled via the variable magnification optical system, the plurality of lens units having at least: from an object side toward an image side, a first lens unit having a positive optical power, a second lens unit having a negative optical power, a third lens unit having a positive optical power, and a fourth lens unit having a positive optical power,
wherein, in a case of magnification variation from a wide-angle end position to a telephoto end position, at least the first lens unit moves from the image side to the object side to thereby change at least one gap between the lens units,
wherein conditional formula (1) below is satisfied:

$$3 < TL3/Y' < 8 \qquad \text{Conditional formula (1),}$$

where
TL3 represents an axial thickness of the third lens unit; and
Y' represents a height from an optical axis on an image surface of the image sensor;
wherein an object side surface of a most object side lens element included in the third lens unit and located at a most object side is aspherical; and
wherein the most object side lens element included in the third lens unit forms a cemented lens element by being cemented with another lens element adjacent thereto on the image side.

2. The optical unit of claim 1,
wherein, in the third lens unit, closer to the image side than the cemented lens element, another cemented lens element is located.

3. An optical unit including:
a variable magnification optical system having a plurality of lens units, and an image sensor for receiving light that has traveled via the variable magnification optical system, the plurality of lens units having at least: from an object side toward an image side, a first lens unit having a positive optical power, a second lens unit having a negative optical power, a third lens unit having a positive optical power, and a fourth lens unit having a positive optical power,
wherein, in a case of magnification variation from a wide-angle end position to a telephoto end position, at least the first lens unit moves from the image side to the object side to thereby change at least one gap between the lens units,
wherein conditional formula (1) below is satisfied:

$$3 < TL3/Y' < 8 \qquad \text{Conditional formula (1),}$$

where
TL3 represents an axial thickness of the third lens unit; and
Y' represents a height from an optical axis on an image surface of the image sensor; and
wherein at least one of lens surfaces of a most image side lens element included in the third lens unit and located at a most image side is aspherical.

4. An optical unit including:
a variable magnification optical system having a plurality of lens units, and an image sensor for receiving light that has traveled via the variable magnification optical system, the plurality of lens units having at least: from an object side toward an image side, a first lens unit having a positive optical power, a second lens unit having a negative optical power, a third lens unit having a positive optical power, and a fourth lens unit having a positive optical power,
wherein, in a case of magnification variation from a wide-angle end position to a telephoto end position, at least the first lens unit moves from the image side to the object side to thereby change at least one gap between the lens units,
wherein conditional formula (1) below is satisfied:

$$3 < TL3/Y' < 8 \qquad \text{Conditional formula (1),}$$

where
TL3 represents an axial thickness of the third lens unit; and
Y' represents a height from an optical axis on an image surface of the image sensor; and
wherein an optical axis changing element is included in the third lens unit.

5. An optical unit including:
a variable magnification optical system having a plurality of lens units, and an image sensor for receiving light that has traveled via the variable magnification optical system, the plurality of lens units having at least: from an object side toward an image side, a first lens unit having a positive optical power, a second lens unit having a negative optical power, a third lens unit having a positive optical power, and a fourth lens unit having a positive optical power,
wherein, in a case of magnification variation from a wide-angle end position to a telephoto end position, at least the first lens unit moves from the image side to the object side to thereby change at least one gap between the lens units, wherein conditional formula (1) below is satisfied:

$3 < TL3/Y' < 8$  Conditional formula (1), where

TL3 represents an axial thickness of the third lens unit; and

Y' represents a height from an optical axis on an image surface of the image sensor; and wherein an optical aperture stop for blocking part of light entering from the object side is provided, and wherein conditional formula (2) below is satisfied:

$1 < TL3_M/RS < 2$  Conditional formula (2), where $TL3_M$ represents maximum air spacing between lens elements included in the third lens unit; and RS represents a maximum aperture stop diameter of an optical aperture stop.

6. An optical unit including:

a variable magnification optical system having a plurality of lens units, and an image sensor for receiving light that has traveled via the variable magnification optical system, the plurality of lens units having at least: from an object side toward an image side, a first lens unit having a positive optical power, a second lens unit having a negative optical power, a third lens unit having a positive optical power, and a fourth lens unit having a positive optical power, wherein, in a case of magnification variation from a wide-angle end position to a telephoto end position, at least the first lens unit moves from the image side to the object side to thereby change at least one gap between the lens units, wherein conditional formula (1) below is satisfied:

$3 < TL3/Y' < 8$  Conditional formula (1), where

TL3 represents an axial thickness of the third lens unit; and

Y' represents a height from an optical axis on an image surface of the image sensor; and wherein conditional formula (3) below is satisfied:

$1.5 < (\beta 3t/\beta 3w) < 3.5$  Conditional formula (3), where

β3t represents a lateral magnification of the third lens unit at the telephoto end position; and β3w represents a lateral magnification of the third lens unit at the wide-angle end.

7. An optical unit including:

a variable magnification optical system having a plurality of lens units, and an image sensor for receiving light that has traveled via the variable magnification optical system, the plurality of lens units having at least: from an object side toward an image side, a first lens unit having a positive optical power, a second lens unit having a negative optical power, a third lens unit having a positive optical power, and a fourth lens unit having a positive optical power, wherein, in a case of magnification variation from a wide-angle end position to a telephoto end position, at least the first lens unit moves from the image side to the object side to thereby change at least one gap between the lens units, wherein conditional formula (1) below is satisfied:

$3 < TL3/Y' < 8$  Conditional formula (1), where

TL3 represents an axial thickness of the third lens unit; and

Y' represents a height from an optical axis on an image surface of the image sensor; and wherein, when the first lens unit and the third lens unit move for magnification variation, an interlens distance between the first lens unit and the third lens unit is invariable.

8. The optical unit of claim 7, wherein the first lens unit and the third lens unit are coupled together.

9. An optical unit including:

a variable magnification optical system having a plurality of lens units, and an image sensor for receiving light that has traveled via the variable magnification optical system, the plurality of lens units having at least: from an object side toward an image side, a first lens unit having a positive optical power, a second lens unit having a negative optical power, a third lens unit having a positive optical power, and a fourth lens unit having a positive optical power, wherein, in a case of magnification variation from a wide-angle end position to a telephoto end position, at least the first lens unit moves from the image side to the object side to thereby change at least one gap between the lens units, wherein conditional formula (1) below is satisfied:

$3 < TL3/Y' < 8$  Conditional formula (1), where

TL3 represents an axial thickness of the third lens unit; and

Y' represents a height from an optical axis on an image surface of the image sensor; and wherein the first lens unit includes an optical axis changing element.

* * * * *